US006963522B2

(12) United States Patent  
Katayama

(10) Patent No.: US 6,963,522 B2
(45) Date of Patent: Nov. 8, 2005

(54) OPTICAL HEAD APPARATUS AND OPTICAL INFORMATION RECORDING AND REPRODUCING APPARATUS

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 456 days.

(21) Appl. No.: 10/236,970

(22) Filed: Sep. 9, 2002

(65) Prior Publication Data

US 2003/0012092 A1    Jan. 16, 2003

Related U.S. Application Data

(63) Continuation-in-part of application No. 10/156,800, filed on May 30, 2002, now abandoned.

(30) Foreign Application Priority Data

May 31, 2001   (JP) ............................... 2001-164945

(51) Int. Cl.$^7$ ................................................ G11B 7/00
(52) U.S. Cl. .............................. 369/44.37; 369/44.41; 369/112.05
(58) Field of Search .................. 369/44.37, 44.38, 369/44.41, 44.32, 44.23, 112.04, 112.05, 369/112.07, 112.12, 112.23, 112.24

(56) References Cited

U.S. PATENT DOCUMENTS

| | | | | |
|---|---|---|---|---|
| 4,532,522 A | * | 7/1985 | Tsunoda et al. | .......... 369/44.38 |
| 5,090,004 A | * | 2/1992 | Ohsato et al. | ............ 369/44.37 |
| 5,708,636 A | * | 1/1998 | Takahashi et al. | ........ 369/44.41 |
| 5,892,744 A | * | 4/1999 | Ohba | ........................ 369/44.37 |
| 5,963,515 A | * | 10/1999 | Shindo | ...................... 369/44.23 |
| 6,781,930 B2 | * | 8/2004 | Fukumoto | ................ 369/44.41 |
| 6,829,205 B2 | * | 12/2004 | Fukumoto | ................ 369/44.37 |

FOREIGN PATENT DOCUMENTS

| | | |
|---|---|---|
| JP | 9-08 1942 | 3/1997 |
| JP | 10-149564 | 6/1998 |
| JP | 11-102526 | 4/1999 |
| JP | 11-296875 | 10/1999 |
| JP | 2000-08226 | 3/2000 |
| JP | 2000-090454 | 3/2000 |

OTHER PUBLICATIONS

Ryuichi Katayama et al., "Radial Tilt Detection Using 3-Beam Optical Head", *Proceedings of SPIE*, vol. 4090, (2000).

* cited by examiner

*Primary Examiner*—Thang V. Tran
(74) *Attorney, Agent, or Firm*—Young & Thompson

(57) ABSTRACT

Light emitted from a laser is separated into a main beam, first sub beams, and second sub beams. The distribution intensity of each first sub beams is the same as that of the main beam. The distribution intensity of each second sub beam is different from that of the main beam. The sum of the focusing error signals relating to the main beam and first sub beams is a final focusing error signal. The difference between the tracking error signal relating to the main beam and the tracking error signal of each first sub beam is a final tracking error signal. The deviation of the thickness of the substrate of the disk and the radial tilt thereof are detected on the basis of the deviation of the zero crossing points of the focusing error signal and the tracking error signal relating to the main beam and each second sub beam.

103 Claims, 36 Drawing Sheets

1 : SEMICONDUCTOR LASER
2 : COLLIMATOR LENS
3p : DIFFRACTIVE OPTICAL ELEMENT
6 : OBJECTIVE LENS
7 : DISK
8 : CYLINDRICAL LENS
10b : PHOTO DETECTOR
24 : BEAM SPLITTER

26a : FOCUSING ERROR SIGNAL
26b : FOCUSING ERROR SIGNAL

26d : FOCUSING ERROR SIGNAL
26c : FOCUSING ERROR SIGNAL

26e : FOCUSING ERROR SIGNAL

27a : TRACKING ERROR SIGNAL

27b : TRACKING ERROR SIGNAL

27c : TRACKING ERROR SIGNAL

27d : TRACKING ERROR SIGNAL

27e : TRACKING ERROR SIGNAL

29a : TRACKING ERROR SIGNAL

29c : TRACKING ERROR SIGNAL
29b : TRACKING ERROR SIGNAL

29d : TRACKING ERROR SIGNAL
29e : TRACKING ERROR SIGNAL

1 : SEMICONDUCTOR LASER
2 : COLLIMATOR LENS
3a : DIFFRACTIVE OPTICAL ELEMENT
4 : POLARIZING BEAM SPLITTER
5 : QUARTER-WAVE PLATE
6 : OBJECTIVE LENS
7 : DISK
8 : CYLINDRICAL LENS
9 : LENS
10a : PHOTO DETECTOR

3a : DIFFRACTIVE OPTICAL ELEMENT

11a : AREA

3a : DIFFRACTIVE OPTICAL ELEMENT

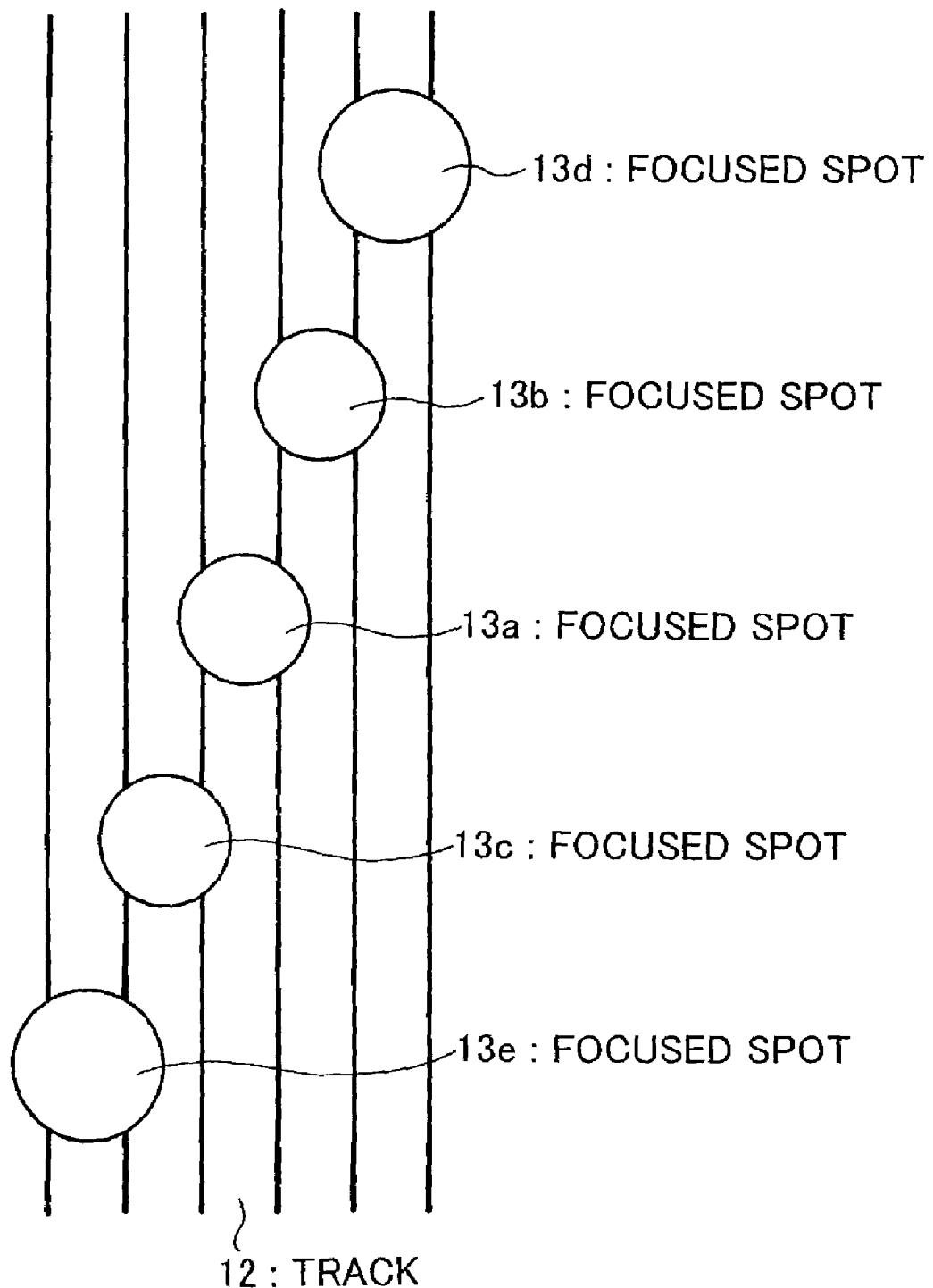

1 : SEMICONDUCTOR LASER
2 : COLLIMATOR LENS
3 : DIFFRACTIVE OPTICAL ELEMENT
4 : POLARIZIHG BEAM SPLITTER
5 : QUARTER-WAVE PLATE
6 : OBJECTIVE LENS
7 : DISK
8 : CYLINDRICAL LENS
9 : LENS
10a : PHOTO DETECTOR

1 : SEMICONDUCTOR LASER
2 : COLLIMATOR LENS
3 : DIFFRACTIVE OPTICAL ELEMENT
4 : POLARIZIHG BEAM SPLITTER
5 : QUARTER-WAVE PLATE
6 : OBJECTIVE LENS
7 : DISK
8 : CYLINDRICAL LENS
9 : LENS
10a : PHOTO DETECTOR

1 : SEMICONDUCTOR LASER
2 : COLLIMATOR LENS
3 : DIFFRACTIVE OPTICAL ELEMENT
4 : POLARIZING BEAM SPLITTER
5 : QUARTER-WAVE PLATE
6 : OBJECTIVE LENS
7 : DISK
8 : CYLINDRICAL LENS
9 : LENS
10a : PHOTO DETECTOR

1 : SEMICONDUCTOR LASER
2 : COLLIMATOR LENS
3 : DIFFRACTIVE OPTICAL ELEMENT
4 : POLARIZING BEAM SPLITTER
5 : QUARTER-WAVE PLATE
6 : OBJECTIVE LENS
7 : DISK
8 : CYLINDRICAL LENS
9 : LENS
10a : PHOTO DETECTOR
23 : LIQUID CRYSTAL OPTICAL DEVICE

OPTICAL HEAD APPARATUS AND OPTICAL INFORMATION RECORDING AND REPRODUCING APPARATUS

This application is a continuation in part of 10/156,800 filed May 30, 2002, now abandoned.

BACKGROUND OF THE INVENTION

1. Field of the Invention

The present invention relates to an optical head apparatus and an optical information recording and reproducing apparatus that record and reproduce information to and from an optical recording medium, in particular, to those that allow the deviation of the thickness of the substrate of an optical recording medium and the radial tilt thereof to be detected without offsets of a focusing error signal and a tracking error signal.

2. Description of the Related Art

On a write-once type optical recording medium and a rewritable optical recording medium on which an RF (Radio Frequency) signal has not been recorded, grooves have been formed as tracks. Generally, viewed from the incident light side of such an optical recording medium, a concave portion and a convex portion of a groove are referred to as land portion and groove portion, respectively. When a focusing error signal of a write-once type optical recording medium or a rewritable optical recording medium is detected, the signal level of the focusing error signal does not strictly accord with the defocus amount. In other words, at the position where the defocus amount is zero, the signal level of the focusing error signal is not strictly zero. Since grooves have been formed, theoretically, the sign of an offset of the focusing error signal detected at the land portion is reverse of that detected at the groove portion. The offset is referred to as groove traverse noise offset. When a tracking error signal is detected from a write-once type optical recording medium or a rewritable optical recording medium, push-pull method is normally used. However, in the push-pull method, when an objective lens of an optical head apparatus is shifted in the radial direction of an optical recording medium, the tracking error signal has an offset. This offset is referred to as lens shift offset. To prevent recording and reproduction characteristics from deteriorating due to such offsets, it is necessary for an optical head apparatus and an optical information recording and reproducing apparatus to provide a mechanism that allows the focusing error signal and the tracking error signal to have no offsets.

FIG. 1 shows the structure of a conventional optical head apparatus that allows the focusing error signal and the tracking error signal to have no offsets. The optical head apparatus has been disclosed as Japanese Patent Laid-Open Publication No. 2000-82226. Light emitted from a semiconductor laser 1 is separated into three pieces of 0-th order light and ±1st order diffracted light by a diffractive optical element 3p. Around 50% of these three pieces of light transmits a beam splitter 24. A collimator lens 2 collimates those pieces of light. An objective lens 6 focuses those pieces of light on a disk 7. Three pieces of light that are reflected from the disk 7 transmit the objective lens 6 and the collimator lens 2 in the reverse direction. The beam splitter 24 reflects around 50% of those piece of light. Those pieces of light transmit a cylindrical lens 8. A photo detector 10b receives those pieces of light. The photo detector 10b is disposed at the middle position of two focal lines of the collimator lens 2 and the cylindrical lens 8.

FIG. 2 shows the positions of focused spots on the disk 7. Focused spots 13a, 13t, and 13u correspond to 0-th order light, +1st order diffracted light, and −1st order diffracted light that are separated by the diffractive optical element 3p. The focused spot 13a is placed on a track 12 (land portion or groove portion). The focused spot 13t is placed on a right adjacent track (groove portion or land portion) of the track 12. The focused spot 13u is placed on a left adjacent track (groove portion or land portion) of the track 12.

FIG. 3 shows the pattern of a light receiving portion of the photo detector 10b and the positions of light spots on the photo detector 10b. A light spot 15a corresponds to 0-th order light separated by the diffractive optical element 3p. The 0-th order light is received by four light receiving portions 25a to 25d divided by a division line that passes through the optical axis and that parallels the tangential direction of the disk 7 and a division line that parallels the radial direction thereof. A light spot 15j corresponds to +1st order diffracted light separated by the diffractive optical element 3p. The light spot 15j is received by four light receiving portions 25e to 25h divided by a division line that passes through the optical axis and that parallels the tangential direction of the disk 7 and a division line that parallels the radial direction thereof. A light spot 15k corresponds to −1st order diffracted light separated by the diffractive optical element 3p. The light spot 15k is received by four light receiving portions 25i to 25l divided by a division line that passes through the optical axis and that parallels the tangential direction of the disk 7 and a division line that parallels the radial direction thereof. The focused spots 13a, 13t, and 13u are trained nearly in the tangential direction of the disk 7. In contrast, the light spots 15a, 15j, and 15k are trained nearly in the radial direction due to the operations of the collimator lens 2 and the cylindrical lens 8.

When outputs of the light receiving portions 25a to 25l are denoted by V25a to V25l, respectively, the focusing error signal can be obtained by differential astigmatism method as (V25a+V25d)−(V25b+V25c)+K{(V25e+V25h+v25i+V25l)−(V25f+V25g+V25j+V25k)} (where K is constant). On the other hand, the tracking error signal can be obtained by differential push-pull method as (V25a+V25b)−(V25c+V25d)−K{(V25e+V25f+V25i+V25j)−(V25g+V25h+V25k+V25l)}. In addition, an RF signal of the focused spot 13a can be obtained as V25a+V25b+V25c+V25d.

FIGS. 4A, 4B, and 4C show various types of focusing error signals. In FIGS. 4A to 4C, the horizontal axis represents the defocus amount of the disk 7, whereas the vertical axis represents each focusing error signal. A focusing error signal 26a shown in FIG. 4A is a focusing error signal of the focused spot 13a that is placed on a land portion. A focusing error signal 26b shown in FIG. 4A is a focusing error signal of the focused spot 13a placed on a groove portion. A focusing error signal 26c shown in FIG. 4B is a focusing error signal of the focused spots 13t and 13u in the case that the focused spot 13a is placed on a land portion. A focusing error signal 26d shown in FIG. 4B is a focusing error signal of the focused spots 13t and 13u in the case that the focused spot 13a is placed on a groove portion. The signal level of a focusing error signal is not strictly zero at the position where the defocus amount is zero. In FIG. 4A, a focusing error signal has a positive offset at a land portion, whereas it has a negative offset at a groove portion. In FIG. 4B, a focusing error signal has a negative offset at a land portion, whereas it has a positive offset at a groove portion. In contrast, a focusing error signal 26e shown in FIG. 4C is a final focusing error signal that is the sum of the focusing error signal of the focused spot 13a and the focusing error signals of the focused spots 13t and 13u in the case that the focused spot 13a is placed at a land portion and a groove portion. In FIG. 4C, the offsets of the focusing error signals shown in FIGS. 4A and 4B are cancelled each other. Thus, the focusing error signal 26e does not have an offset.

FIGS. 5A, 5B, and 5C show various types of tracking error signals. In FIGS. 5A, 5B, and 5C, the horizontal axis represents the off track amount of the disk 7, whereas the vertical axis represents each tracking error signal. A tracking error signal 27a shown in FIG. 5A is a tracking error signal of the focused spot 13a in the case that the objective lens 6 is outward shifted in the radial direction of the disk 7. A tracking error signal 27b shown in FIG. 5A is a tracking error signal of each of the focused spots 13t and 13u in the case that the objective lens 6 is outward shifted in the radial direction of the disk 7. A tracking error signal 27c shown in FIG. 5B is a tracking error signal of the focused spot 13a in the case that the objective lens 6 is inward shifted in the radial direction of the disk 7. A tracking error signal 27d shown in FIG. 5B is a tracking error signal of each of the focused spots 13t and 13u in the case that the objective lens 6 is inward shifted in the radial direction of the disk 7. The polarity of the tracking error signal of the focused spot 13a is the reverse of the polarity of the tracking error signal of each of the focused spots 13t and 13u. However, when the objective lens 6 is shifted in the radial direction of the disk 7, the sign of the offset of the tracking error signal of the focused spot 13a is the same as the sign of the offset of the tracking error signal of each of the focused spots 13t and 13u. In FIG. 5A, the offsets of the tracking error signal 27a and the tracking error signal 27b are positive. In FIG. 5B, the offsets of the tracking error signals 27c and 27d are negative. In contrast, a tracking error signal 27e shown in FIG. 5C is a final tracking error signal that is the difference between a tracking error signal of the focused spot 13a and a tracking error signal of each of the focused spots 13t and 13u in the case that the objective lens 6 is outward and inward shifted in the radial directions of the disk 7. In FIG. 5C, the offsets of the tracking error signals shown in FIGS. 5A and 5B are cancelled each other. Thus, the tracking error signal 27e shown in FIG. 5C does not have an offset.

The recording density of an optical information recording and reproducing apparatus is reversely proportional to the second power of the diameter of a focused spot formed on a record medium by an optical head apparatus. In other words, as the diameter of a focused spot is smaller, the recording density becomes higher. The diameter of a focused spot is reversely proportional to the numerical aperture of an objective lens of the optical head apparatus. In other words, as the numerical aperture of the objective lens is higher, the diameter of a focused spot becomes smaller. On the other hand, when the thickness of the substrate of the optical recording medium deviates from a designed value, the shape of a focused spot deforms due to the spherical aberration caused by the deviation of the thickness of the substrate. As a result, the recording and reproduction characteristics deteriorate. Since the spherical aberration is proportional to the fourth power of the numerical aperture, as the numerical aperture of the objective lens is higher, the margin of the deviation of the thickness of the substrate of the optical recording medium becomes narrower. When the optical recording medium tilts in the radial direction against the objective lens, the shape of a focused spot deforms due to the comatic aberration caused by the radial tilt. As a result, the recording and reproduction characteristics deteriorate. Since the comatic aberration is proportional to the third power of the numerical aperture of the objective lens, as the numerical aperture of the objective lens is higher, the margin of the radial tilt of the optical recording medium against the recording and reproduction characteristics becomes narrower. Thus, in the optical head apparatus and the optical information recording and reproducing apparatus that use an objective lens having a higher numerical aperture for a higher recording density, it is necessary to detect and compensate the deviation of the thickness of the substrate of the optical recording medium and the radial tilt thereof so as to prevent the recording and reproduction characteristics from deteriorating.

An example of a conventional optical head apparatus that can detect the radial tilt of an optical recording medium has been described in SPIE Proceedings, Vol. 4090, pp. 309–318. The optical head apparatus features a diffractive optical element 3q with which the diffractive optical element 3p of the optical head apparatus shown in FIG. 1 is substituted.

FIG. 6 is a plan view showing the diffractive optical element 3q. The diffractive optical element 3q has a structure in which a diffraction grating is formed in only the inside of a circular area 28 of which diameter is smaller than the effective diameter (denoted by a dotted line in FIG. 6) of the objective lens 6. The direction of grating members of the diffraction grating parallels the radial direction of the disk 7. The grating members are linearly formed and equally spaced. Light that enters the inside of the circular area 28 partly transmits it as 0-th order light and is diffracted as +1st order diffracted light. In contrast, light that enters the outside of the circular area 28 fully transmits it. In other words, 0-th order light separated by the diffractive optical element 3q contains both light that transmits the inside of the circular area 28 and light that transmits the outside of the circular area 28. Thus, the numerical aperture of 0-th order light depends on the effective diameter of the objective lens 6. On the other hand, +1st order diffracted light separated by the diffractive optical element 3q contains only light diffracted on the inside of the circular area 28. Thus, the numerical aperture of ±1st order diffracted light depends on the diameter of the circular area 28. As a result, the distribution of the intensity of 0-th order light separated by the diffractive optical element 3q is different from that of each of +1st order diffracted light separated thereby. Thus, the intensity of the peripheral portion of each of +1st order diffracted light is lower than that of 0-th order light.

FIG. 7 shows the positions of focused spots on the disk 7. Focused spots 13a, 13v, and 13w correspond to 0-th order light, +1st order diffracted light, and −1st order diffracted light separated by the diffractive optical element 3q, respectively. The focused spot 13a, 13v, and 13w are placed on the same track 12 (land portion or groove portion). Since the intensity of the peripheral portion of each of ±1st order diffracted light is lower than that of 0-th order light, the diameter of each of the focused spots 13v and 13w that are +1st order diffracted light is larger than the diameter of the focused spot 13a that is 0-th order light.

The pattern of the light receiving portion of the photo detector of the optical head apparatus and the positions of the light spots on the photo detector are the same as those shown in FIG. 3.

FIGS. 8A, 8B, and 8C show various types of tracking error signals for detecting a radial tilt. In FIGS. 8A, 8B, and 8C, the horizontal axis represents the off track amount of the disk 7, whereas the vertical axis represents each tracking error signal. A tracking error signal 29a shown in FIG. 8A is a tracking error signal of each of the focused spots 13a, 13v, and 13w in the case that the disk 7 does not have a radial tilt. In contrast, a tracking error signal 29b shown in FIG. 8B is a tracking error signal of the focused spot 13a in the case that the disk 7 has a positive radial tilt. A tracking error signal 29c shown in FIG. 8B is a tracking error signal of each of the focused spots 13v and 13w in the case that the disk 7 has a positive radial tilt. A tracking error signal 29d shown in FIG. 8C is a tracking error signal of the focused spot 13a in the case that the disk 7 has a negative radial tilt. A tracking error signal 29e shown in FIG. 8C is a tracking error signal of each of the focused spots 13v and 13w in the case that the disk 7 has a negative radial tilt. The position at which the tracking error signal of the focused spot 13a traverses zero from the − side to the + side as the curve on the graph moves rightward corresponds to a land portion, whereas the position at which the tracking error signal of the focused spot 13a traverses zero from the + side to the − side as the curve on the graph moves rightward corresponds to a groove portion. When the disk 7 does not have a radial tilt, the zero crossing point of the tracking error signal of each of the focused spots 13v and 13w matches the zero crossing point of the tracking error signal of the focused spot 13a. Thus, the signal level of each of the tracking error signals becomes zero regardless of whether each of the focused spots 13v and 13w is placed on a land portion or a groove portion. When the disk 7 has a positive radial tilt, the zero crossing point of the tracking error signal of each of the focused spots 13v and 13w shifts leftward against the tracking error signal of the focused spot 13a. Thus, when each of the focused spots 13v and 13w is placed at a land portion, the signal level of the tracking error signal becomes positive. In contrast, when each of the focused spots 13v and 13w is placed at a groove portion, the signal level of the tracking error signal becomes negative. When the disk 7 has a negative radial tilt, the zero crossing point of the tracking error signal of each of the focused spots 13v and 13w shifts rightward against the tracking error signal of the focused spot 13a. Thus, when each of the focused spots 13v and 13w is placed at a land portion, the signal level of the tracking error signal becomes negative. In contrast, when each of the focused spots 13v and 13w is placed at a groove portion, the signal level of the tracking error signal becomes positive. Thus, the tracking error signal of each of the focused spots 13v and 13w when performing a tracking servo using the tracking error signal of the focused spot 13a can be used as a radial tilt signal.

In the conventional optical head apparatus that allows the focusing error signal and the tracking error signal to have no offsets, the sum of a focusing error signal of 0-th order light separated by a diffractive optical element and a focusing error signal of each of ±1st order diffracted light separated by the diffractive optical element is a final focusing error signal. In addition, the difference between a tracking error signal of 0-th order light and a tracking error signal of each of ±1st order diffracted light is a final tracking error signal. To cancel an offset of a focusing error signal of 0-th order light separated by a diffractive optical element and that of each of ±1st order diffracted light separated thereby and to cancel an offset of a tracking error signal of 0-th order light separated by the diffractive optical element and that of each of ±1st order diffracted light separated thereby, it is necessary to cause the distribution of the intensity of 0-th order light separated by the diffractive optical element to be the same as that of each of ±1st order diffracted light separated thereby.

On the other hand, in the conventional optical head apparatus that can detect a radial tilt of an optical recording medium, a radial tilt thereof is detected corresponding to the deviation between the zero crossing point of a tracking error signal of 0-th order light separated by the diffractive optical element and the zero crossing point of the tracking error signal of each of ±1st order diffracted light separated thereby, so it is necessary to cause the distribution of the intensity of 0-th order light separated by the diffractive optical element to be different from that of each of ±1st order diffracted light separated thereby.

Thus, in the conventional optical head apparatus, both the structure that allows a focusing error signal and a tracking error signal to have no offsets and the structure that allows a radial tilt of an optical recording medium to be detected cannot be satisfied at a time.

SUMMARY OF THE INVENTION

An object of the present invention is to solve the foregoing problems of the conventional optical head apparatus and to provide an optical head apparatus and an optical information recording and reproducing apparatus that allow a focusing error signal and a tracking error signal to have no offsets and that allow the deviation of the thickness of the substrate of an optical recording medium and the radial tilt thereof to be detected.

A first aspect of the present invention is an optical head apparatus having a light source, an objective lens that focuses light emitted from the light source on an optical recording medium, and a photo detector that receives reflected light from the optical recording medium, the apparatus comprising a means for detecting a focusing error signal or a tracking error signal from each of a main beam, a first sub beam, and a second sub beam, the distribution of the intensity of the main beam being the same as the distribution of the intensity of the first sub beam, the distribution of the intensity of the main beam being different from the distribution of the intensity of the second sub beam. The sum of the focusing error signal of the main beam and the focusing error signal of the first sub beam may be treated as a final focusing error signal. The difference between the tracking error signal of the main beam and the tracking error signal of the first sub beam may be treated as a final tracking error signal. The deviation of the thickness of the substrate of the optical recording medium may be detected corresponding to the deviation between the zero crossing point of the focusing error signal of the main beam and the zero crossing point of the focusing error signal of the second sub beam. The radial tilt of the optical recording medium may be detected corresponding to the deviation between the zero crossing point of the tracking error signal of the main beam and the zero crossing point of the tracking error signal of the second sub beam.

A second aspect of the present invention is an optical information recording and reproducing apparatus, comprising the optical head apparatus of the first aspect of the present invention and a means for compensating the deviation of the thickness of the substrate of the optical recording medium or the radial tilt thereof.

In the optical head apparatus and the optical information recording and reproducing apparatus according to the present invention, the distribution of the intensity of the main beam and the distribution of the intensity of each of the first sub beams are the same. Thus, the offsets of the focusing error signal and the tracking error signal of the main beam and the offsets of the focusing error signal and the tracking error signal of each of the first sub beams are cancelled each other. Thus, when the sum of the focusing error signal of the main beam and the focusing error signal of each of the first sub beams is a final focusing error signal and the difference between the tracking error signal of the main beam and the tracking error signal of each of the first sub beams is a final tracking error signal, the focusing error signal and the tracking error signal do not have offsets.

Moreover, in the optical head apparatus and the optical information recording and reproducing apparatus according to the present invention, the distribution of the intensity of the main beam and the distribution of the intensity of each of the second sub beams are different. When an optical recording medium has no deviation of the thickness of the substrate, the zero crossing point of the focusing error signal of the main beam matches the zero crossing point of the focusing error signal of each of the second sub beams. In contrast, when an optical recording medium has a deviation of the thickness of the substrate, the zero crossing points of the focusing error signals shift due to the spherical aberration. However, since the distribution of the intensity of the main beam and the distribution of the intensity of each of the second sub beams are different, the shift amounts thereof differ. Thus, the zero crossing points of the focusing error signals deviate. Consequently, the deviation of the thickness of the substrate can be detected corresponding to the deviated zero crossing points. Likewise, when an optical recording medium does not have a radial tilt, the zero crossing point of the tracking error signal of the main beam matches the zero crossing point of the tracking error signal of each of the second sub beams. In contrast, when an optical recording medium has a radial tilt, the zero crossing points of the tracking error signals shift due to the comatic aberration. However, since the distribution of the intensity of the main beam and the distribution of the intensity of each of the second sub beams are different, the shift amounts differ. Thus, the zero crossing points of the tracking error signals deviate. Consequently, the radial tilt of the optical recording medium can be detected corresponding to the deviated zero crossing points.

These and other objects, features and advantages of the present invention will become more apparent in light of the following detailed description of the best mode embodiment thereof, as illustrated in the accompanying drawings.

BRIEF DESCRIPTION OF DRAWINGS

FIG. 11 is a schematic diagram showing the positions of focused spots on a disk by the optical head apparatus according to the first embodiment of the present invention;

DESCRIPTION OF PREFERRED EMBODIMENTS

Next, with reference to the accompanying drawings, embodiments of the present invention will be described.

(First Embodiment)

Figure 9:
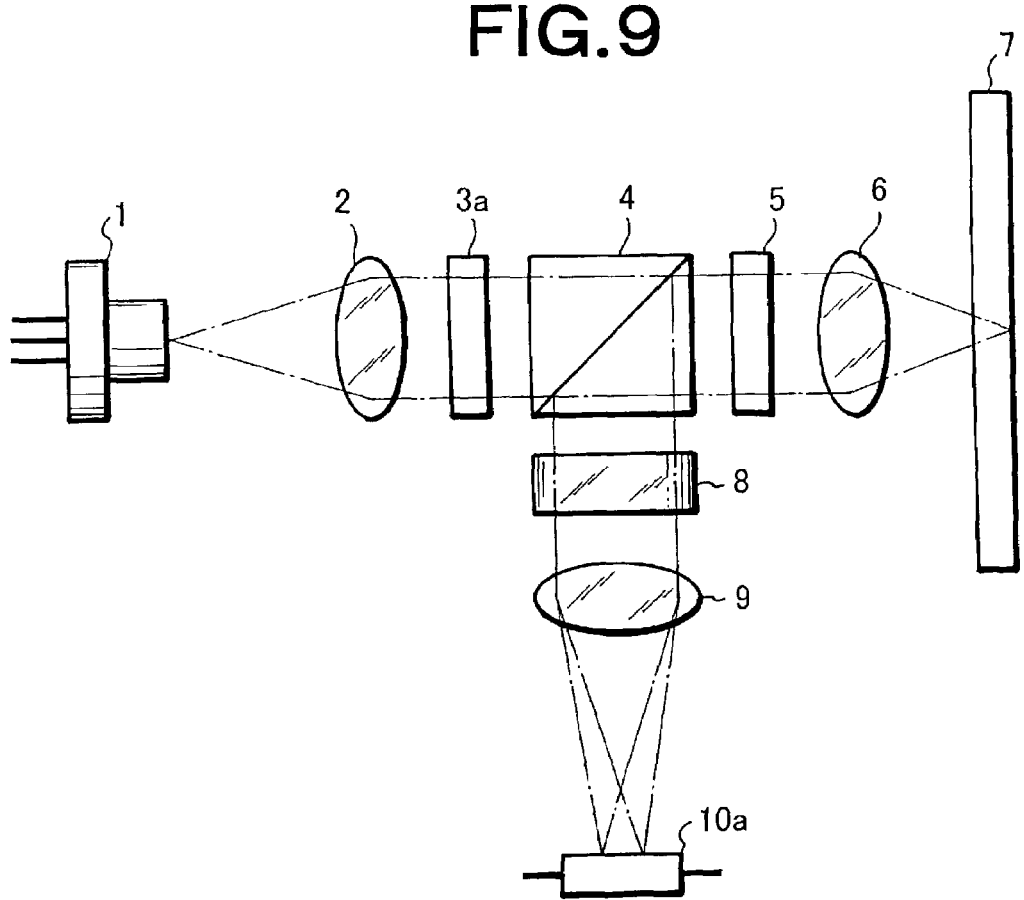
FIG. 9 is a schematic diagram showing an optical head apparatus according to a first embodiment of the present invention.

FIG. 9 shows an optical head apparatus according to a first embodiment of the present invention. Light emitted from a semiconductor laser 1 is collimated by a collimator lens 2. A diffractive optical element 3a separates collimated light into five pieces of light including one piece of transmitted light as a main beam, two pieces of diffracted light as two first sub beams, and two pieces of diffracted light as two second sub beams. These pieces of light enters a polarizing beam splitter 4 as P polarized light. Almost 100% of the P polarized light transmits the polarizing beam splitter 4. A quarter-wave plate 5 converts the linearly polarized light into circularly polarized light. An objective lens 6 focuses the circularly polarized light on a disk 7. Five pieces of reflected light transmit the objective lens 6 in the reverse direction. Thereafter, the transmitted light enters the quarter-wave plate 5. The quarter-wave plate 5 converts the circularly polarized light into linearly polarized light of which polarizing direction is perpendicular to that of the outgoing light. The linearly polarized light enters the polarizing beam splitter 4 as S polarized light. The polarizing beam splitter 4 reflects nearly 100% of the S polarized light. The reflected light transmits a cylindrical lens 8 and a lens 9. A photo detector 10a receives the light that has transmitted the cylindrical lens 8 and the lens 9. The photo detector 10a is disposed at the middle position of two focal lines of the cylindrical lens 8 and the lens 9.

Figure 10A:
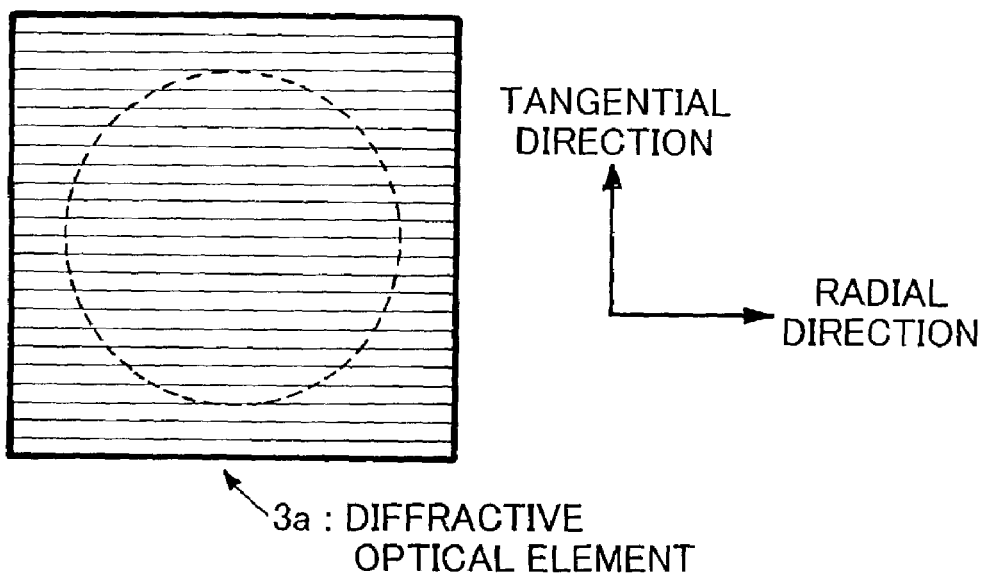
FIGS. 10A and 10B are plan views showing a diffractive optical element of the optical head apparatus according to the first embodiment of the present invention.
Figure 10B:
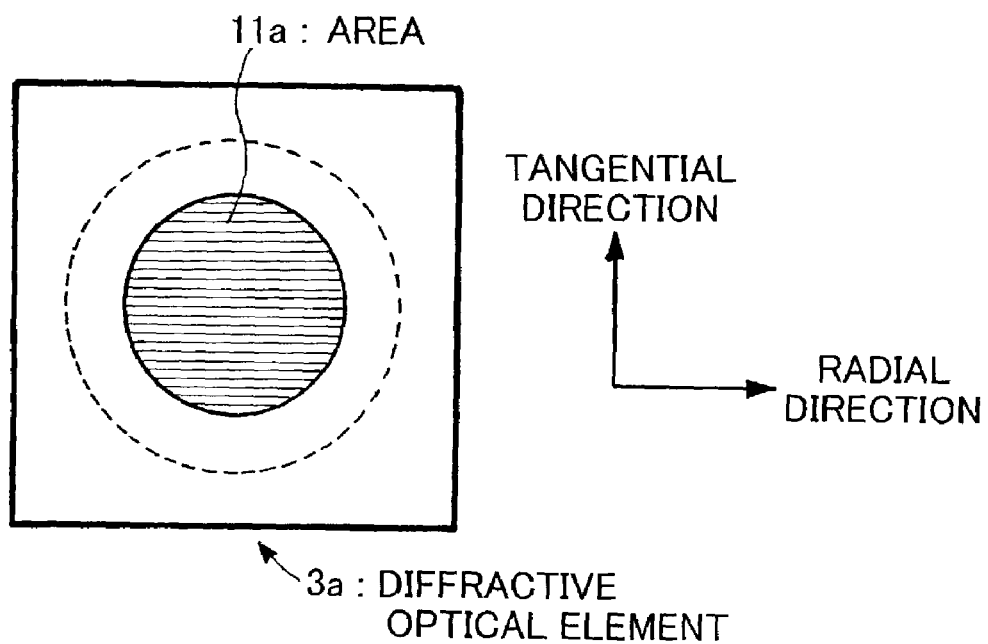

FIGS. 10A and 10B are plan views showing the diffractive optical element 3a. As shown in FIG. 10A, a diffraction grating is formed on the entire surface of the incident plane of the diffractive optical element 3a. As shown in FIG. 10B, a diffraction grating is formed on the exit plane of the diffractive optical element 3a and in only the inside of a circular area 11a that has a smaller diameter than an effective diameter (denoted by a dotted line in FIG. 10B) of the objective lens 6. The direction of grating members of the diffraction grating formed on the incident plane and the direction of grating members of the diffraction grating formed on the exit plane nearly parallel the radial direction of the disk 7. The grating members of the diffraction gratings are linearly formed and equally spaced. The pitches of the grating members of the diffraction grating formed on the incident plane are twice as wide as the pitches of the grating members of the diffraction grating formed on the exit plane.

When the phase difference between a line portion and a space portion of each grating member of each of these diffraction gratings is for example $0.232\pi$ [radian], around 87.3% of light that enters the incident plane transmits as 0-th order light and around 5.1% of the incident light is diffracted as each of ±1st order diffracted light. On the other hand, around 87.3% of light that enters the circular area 11a of the exit plane transmits as 0-th order light and around 5.1% of the light is diffracted as each of ±1st order diffracted light. In addition, nearly 100% of light that enters the outside of the circular area 11a of the exit plane transmits. The light that exits the incident plane as the 0-th order light and exits the exit plane as the 0-th order light is referred to as main beam. The light that exits the incident plane as ±1st order diffracted light and exits the exit plane as the 0-th order light is referred to as first sub beams. The light that exits the incident plane as the 0-th order light and exits the exit plane as ±1st order diffracted light is referred to as second sub beams. In this case, each of the main beam and the first sub beams contains light that transmits the inside of the circular area 11a and light that transmits the outside of the circular area 11a in the same rate. In contrast, each of the second sub beams contains only light diffracted in the inside of the circular area 11a of the exit plane. As a result, the distribution of the intensity of the main beam is the same as that of each of the first sub beams. In contrast, the distribution of the intensity of the main beam is different from that of each of the second sub beams. The intensity of the peripheral portion of each of the second sub beams is lower than the intensity of the peripheral portion of the main beam. The positions of the incident plane and the exit plane of the diffractive optical element 3a may be reversed.

FIG. 11 shows the positions of focused spots on the disk 7. Focused spots 13a, 13b, 13c, 13d, and 13e correspond to the light that exits the incident plane as the 0-th order light and exits the exit plane as the 0-th order light, the light that exits the incident plane as the +1st order diffracted light and exits the exit plane as the 0-th order light, the light that exits the incident plane as the −1st order diffracted light and exit the exit plane as the 0-th order light, the light that exits the incident plane as the 0-th order light and exits the exit plane as the +1st order diffracted light, the light that exits the incident plane as the 0-th order light and exits the exit plane as the −1st order diffracted light, respectively. The focused spot 13a is placed on a track 12 (land portion or groove portion). The focused spot 13b is placed on a track (groove portion or land portion) at the immediately right position of the track 12. The focused spot 13c is placed on a track (groove portion or land portion) at the immediately left position of the track 12. The focused spot 13d is placed on a track (land portion or groove portion) rightward spaced apart from the track 12 by two tracks. The focused spot 13e is placed on a track (land portion or groove portion) leftward spaced apart from the track 12 by two tracks. Since the distribution of the intensity of each of the first sub beam is the same as the distribution of the intensity of the main beam, the diameter of each of the focused spots 13b and 13c as the first sub beams is equal to the diameter of the focused spot 13a. In contrast, since the intensity of the peripheral portion of each of the second sub beams is lower than the intensity of the peripheral portion of the main beam, the diameter of each of the focused spots 13d and 13e as the second sub beams is larger than the diameter of the focused spot 13a.

Figure 12:
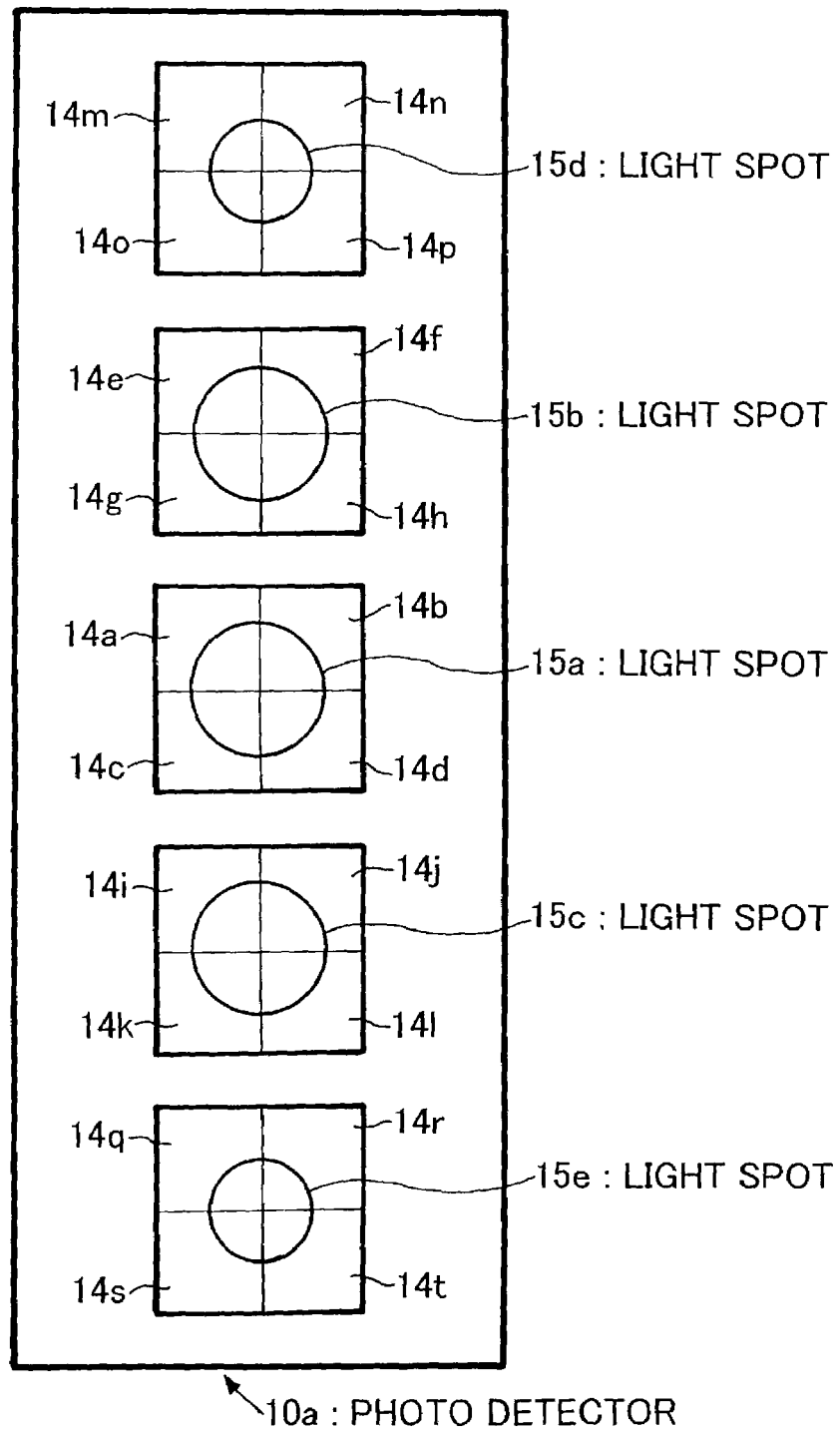
FIG. 12 is a schematic diagram showing the pattern of a light receiving portion of a photo detector and the positions of light spots on the photo detector of the optical head apparatus according to the first embodiment of the present invention.

FIG. 12 shows the pattern of the light receiving portion of the photo detector 10a and the positions of light spots on the photo detector 10a. A light spot 15a corresponds to the light that exits the incident plane as the 0-th order light and exits the exit plane as 0-th order light. The light spot 15a is received by light receiving portions 14a to 14d divided by a division line that passes through the optical axis and that parallels the tangential direction of the disk 7 and a division line that parallels the radial direction thereof. A light spot 15b corresponds to the light that exits the incident plane as the +1st order diffracted light and exits the exit plane as 0-th order light. The light spot 15b is received by light receiving portions 14e to 14h divided by a division line that passes through the optical axis and that parallels the tangential direction of the disk 7 and a division line that parallels the radial direction thereof. A light spot 15c corresponds to a light that exits the incident plane as the −1st order diffracted light and exits the exit plane as 0-th order light. The light spot 15c is received by four light receiving portions 14i to 14l divided by a division line that passes through the optical axis and that parallels the tangential direction of the disk 7 and a division line that parallels the radial direction thereof. A light spot 15d corresponds to a light that exits the incident plane as the 0-th order light and exits the exit plane as the +1st order diffracted light. The light spot 15d is received by four light receiving portions 14m to 14p divided by a division line that passes through the optical axis and that parallels the tangential direction of the disk 7 and a division line that parallels the radial direction thereof. A light spot 15e corresponds to a light that exits the incident plane as the 0-th order light and exits the exit plane as the −1st order diffracted light. The light spot 15e is received by four light receiving portions 14q to 14t divided by a division line that passes through the optical axis and that parallels the tangential direction of the disk 7 and a division line that parallels the radial direction thereof The focused spots 13a, 13b, 13c, 13d, and 13e on the disk 7 are trained nearly in the tangential direction. Due to the operations of the cylindrical lens 8 and the lens 9, the light spots 15a, 15b, 15c, 15d, and 15e are trained on the photo detector 10a nearly in the radial direction.

When outputs of the light receiving portions 14a to 14t are denoted by V14a to V14t, focusing error signals of the focused spot 13a as the main beam, the focused spots 13b and 13c as the first sub beams, and the focused spots 13d and 13e as the second sub beams are obtained by astigmatism method as (V14a+V14d)−(V14b+V14c), (V14e+V14h+V14i+V14l)−(V14f+V14g+V14j+V14k), and (V14m+V14p+V14q+V14t)−(V14 n+V14o+V14r+V14s), respectively. The final focusing error signal is obtained by differential astigmatism method as (V14a+V14d)−(V14b+V14c)+K{(V14e+V14h+V14i+V14l)−(V14f+V14g+V14j+V14k)} (where K is constant). On the other hand, tracking error signals of the focused spot 13a as the main beam, the focused spots 13b and 13c as the first sub beams, and the focused spots 13d and 13e as the second sub beams are obtained by push-pull method as (V14a+V14b)−(V14c+V14d), (V14e+V14f+V14i+V14j)−(V14g+V14h+V14k+V14l), and (V14 m+V14n+V14q+V14r)−(V14o+V14p+V14s+V14t), respectively. The final tracking error signal is obtained by differential push-pull method as (V14a+V14b)−(V14c+V14d)−K{(V14e+V14f+V14i+V14j)−

(V14$g$+V14$h$+V14$k$+V14$l$)}. In addition, the RF signal of the focused spot 13$a$ as the main beam is obtained as V14$a$+V14$b$+V14$c$+V14$d$.

Figure 1:
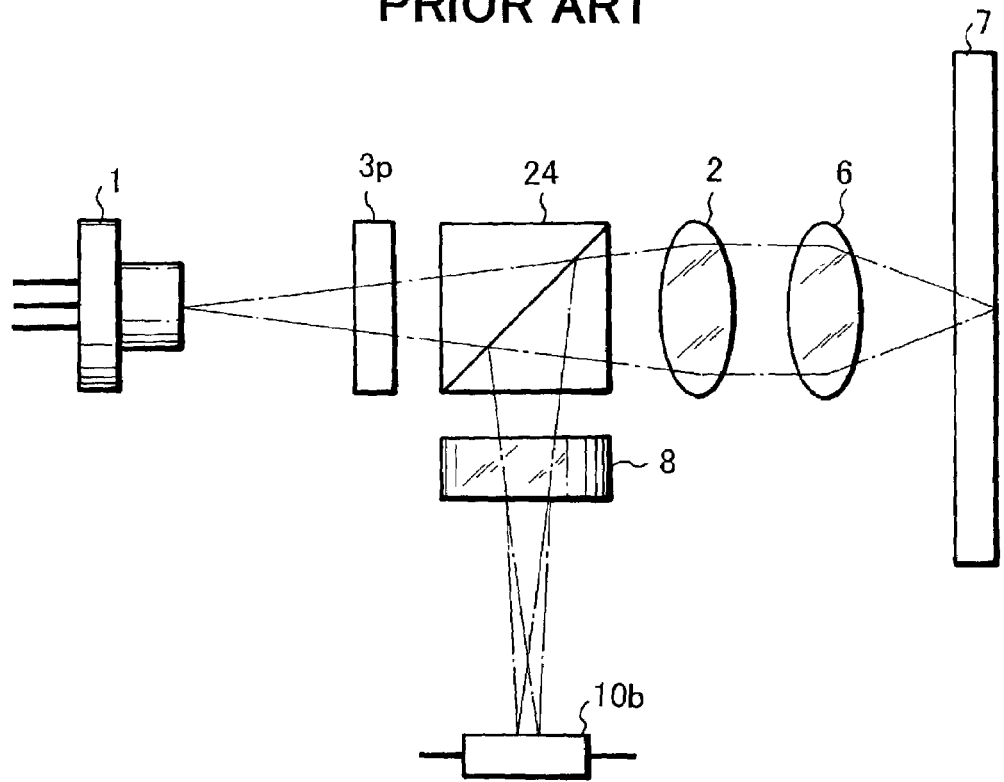
FIG. 1 is a schematic diagram showing the structure of a conventional optical head apparatus.
Figure 2:
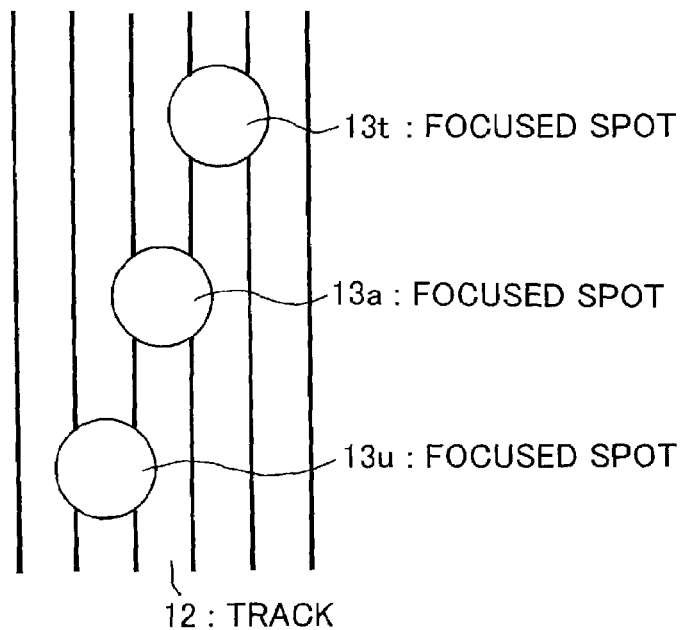
FIG. 2 is a schematic diagram showing the positions of focused spots on a disk by a conventional optical head apparatus.
Figure 3:
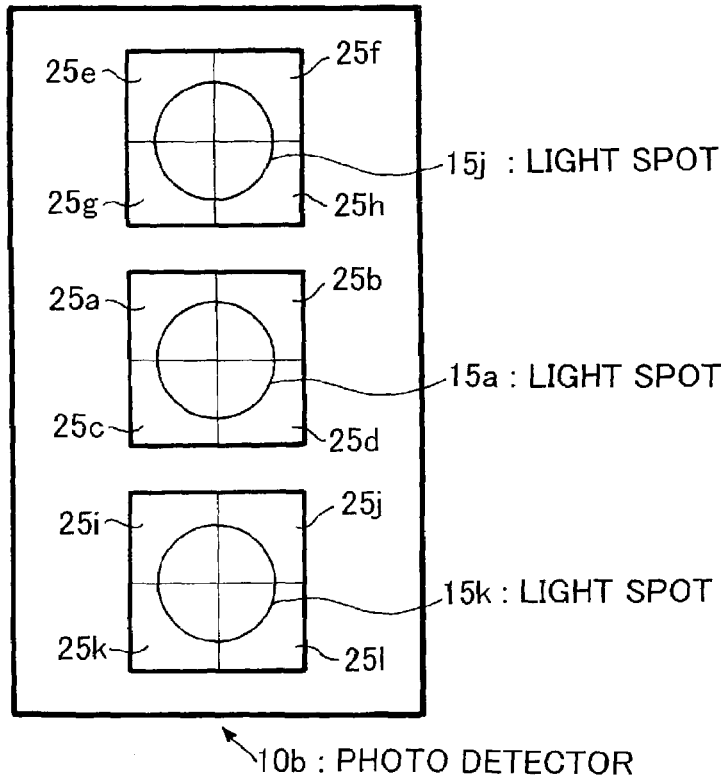
FIG. 3 is a schematic diagram showing the pattern of a light receiving portion of a photo detector of a conventional optical head apparatus and the positions of light spots on the photo detector.
Figure 4A:
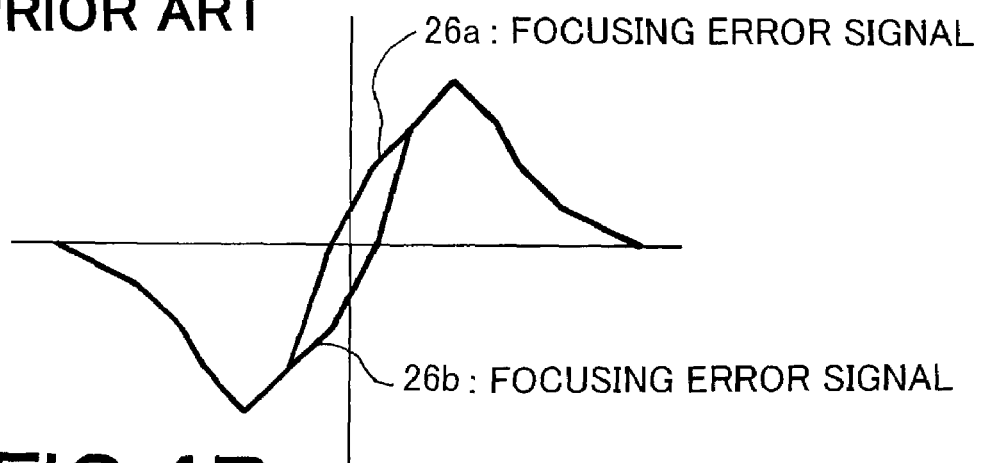
FIGS. 4A, 4B, and 4C are schematic diagram showing various types of focusing error signals.
Figure 4B:
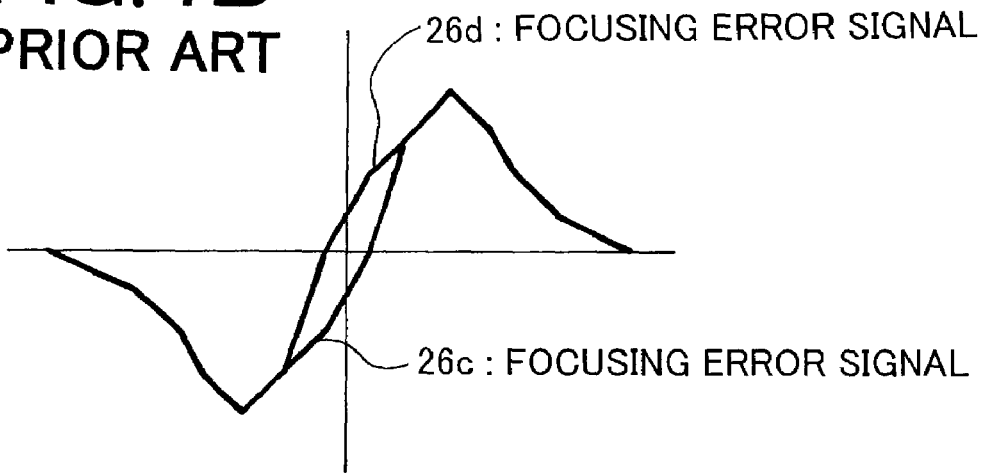
Figure 4C:
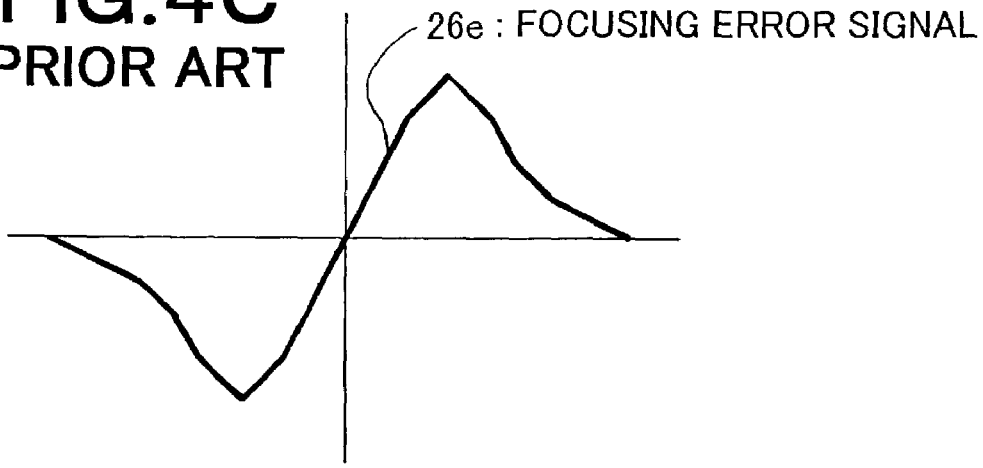

Various types of focusing error signals according to the embodiment are the same as those shown in FIGS. 4A, 4B, and 4C. With the same reason as the conventional optical head apparatus described with reference to FIGS. 4A, 4B, and 4C, according to the embodiment, the focusing error signals do not have offsets. Various types of tracking error signals according to the embodiment are the same as those shown in FIGS. 5A, 5B, and 5C. With the same reason as the conventional optical head apparatus described with reference to FIGS. 5A, 5B, and 5C, according to the embodiment, the tracking error signals do not have offsets.

Figure 13A:
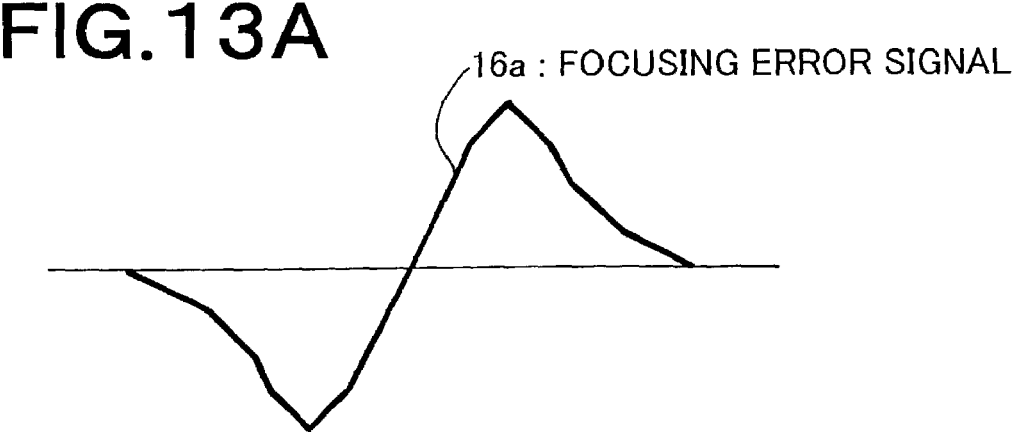
FIGS. 13A, 13B, and 13C are schematic diagrams showing various types of focusing error signals for detecting the deviation of the thickness of a substrate.
Figure 13B:
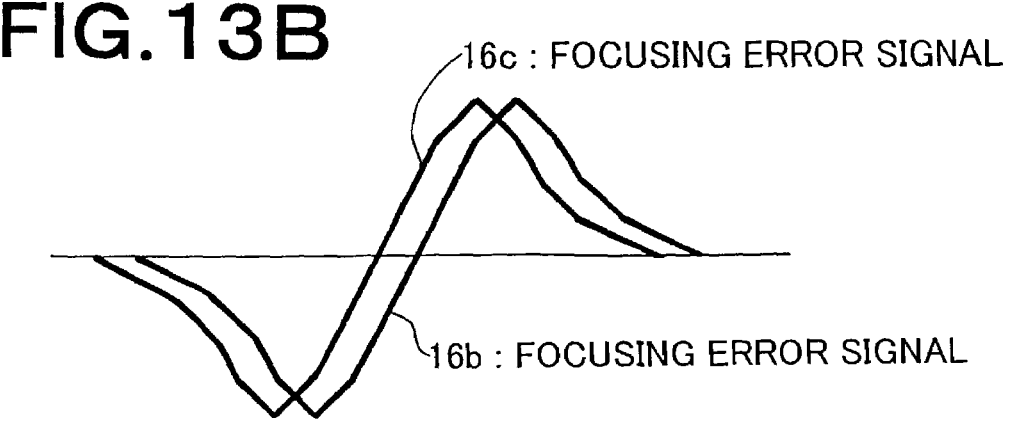
Figure 13C:
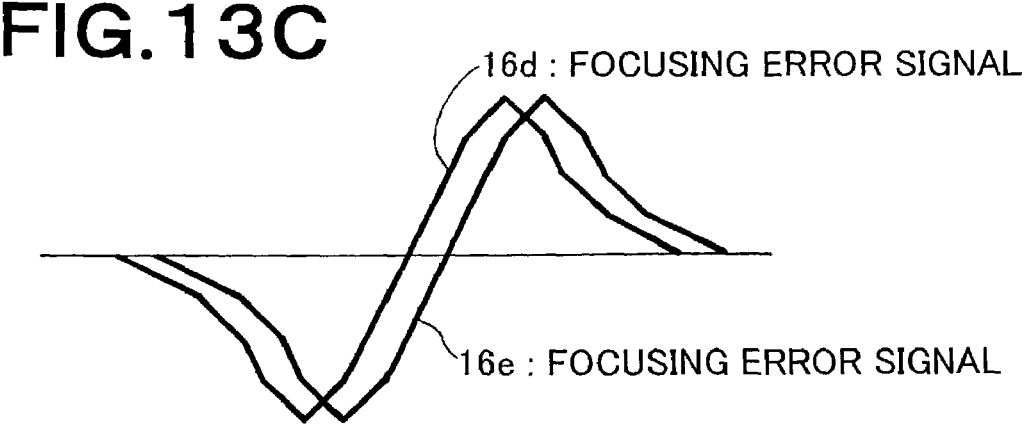

FIGS. 13A, 13B, and 13C show various types of focusing error signals for detecting the deviation of the thickness of a substrate. In FIGS. 13A to 13C, the horizontal axis represents the defocus amount of the disk 7, whereas the vertical axis represents each focusing error signal. A focusing error signal 16$a$ shown in FIG. 13A is a focusing error signal of the focused spot 13$a$ and a focusing error signal of each of the focused spots 13$d$ and 13$e$ in the case the disk 7 does not have a deviation of the thickness of the substrate. In contrast, a focusing error signal 16$b$ shown in FIG. 16B is a focusing error signal of the focused spot 13$a$ in the case that the disk 7 has a positive deviation of the thickness of the substrate. A focusing error signal 16$c$ shown in FIG. 13B is a focusing error signal of each of the focused spots 13$d$ and 13$e$ in the case that the disk 7 has a positive deviation of the thickness of the substrate. A focusing error signal 16$d$ shown in FIG. 13C is a focusing error signal of the focused spot 13$a$ in the case that the disk 7 has a negative deviation of the thickness of the substrate. A focusing error signal 16$e$ shown in FIG. 13C is a focusing error signal of each of the focused spots 13$d$ and 13$e$ in the case that the disk 7 has a negative deviation of the thickness of the substrate. The position at which the focusing error signal of the focused spot 13$a$ crosses zero point is a just focus position. When the disk 7 does not have a deviation of the thickness of the substrate, the zero crossing point of the focusing error signal of each of the focused spots 13$d$ and 13$e$ matches the zero crossing point of the focusing error signal of the focused spot 13$a$. At the just focus position, the signal level of the focusing error signal of each of the focused spots 13$d$ and 13$e$ becomes zero. In contrast, when the disk 7 has a positive deviation of the thickness of the substrate, the zero crossing point of the focusing error signal of each of the focused spots 13$d$ and 13$e$ shifts leftward against the focusing error signal of the focused spot 13$a$. At the just focus position, the signal level of the focusing error signal of each of the focused spots 13$d$ and 13$e$ becomes positive. When the disk 7 has a negative deviation of the thickness of the substrate, the zero crossing point of the focusing error signal of each of the focused spots 13$d$ and 13$e$ shifts rightward against the focusing error signal of the focused spot 13$a$. At the just focus position, the signal level of the focusing error signal of each of the focused spots 13$d$ and 13$e$ becomes negative. Thus, the focusing error signal of each of the focused spots 13$d$ and 13$e$, which is the second sub beams when performing a focusing servo using the focusing error signal of the focused spot 13$a$ as the main beam, can be used as a substrate thickness deviation signal.

Figure 8A:
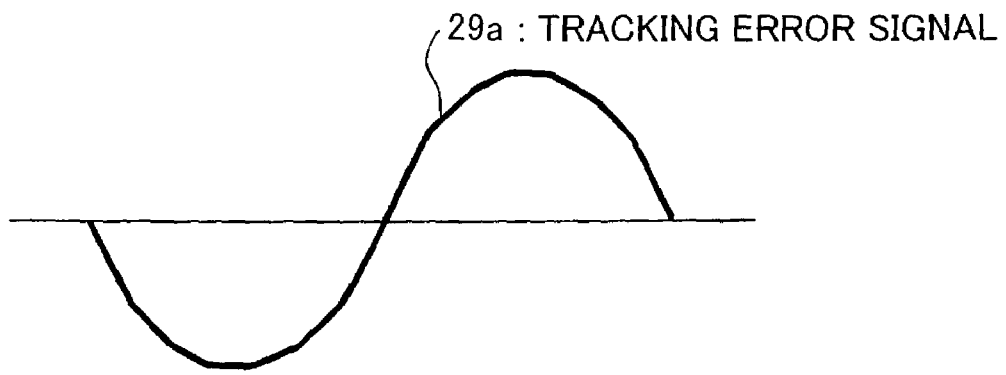
FIGS. 8A, 8B, and 8C are schematic diagrams showing various types of tracking error signals for detecting radial tilts.
Figure 8B:
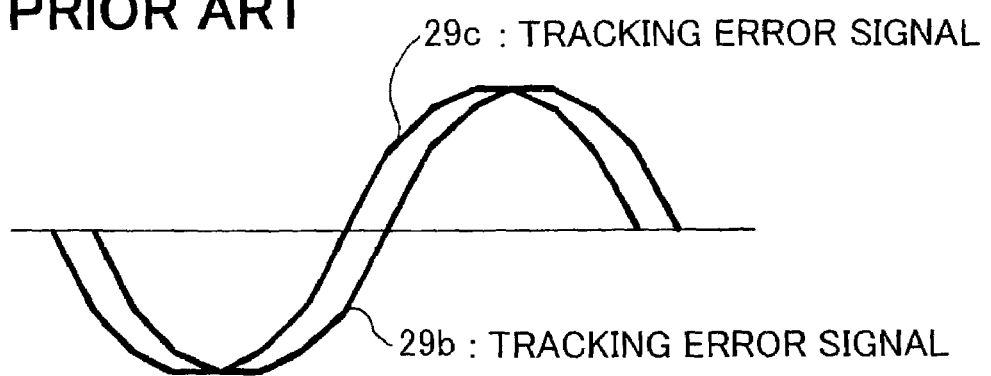
Figure 8C:
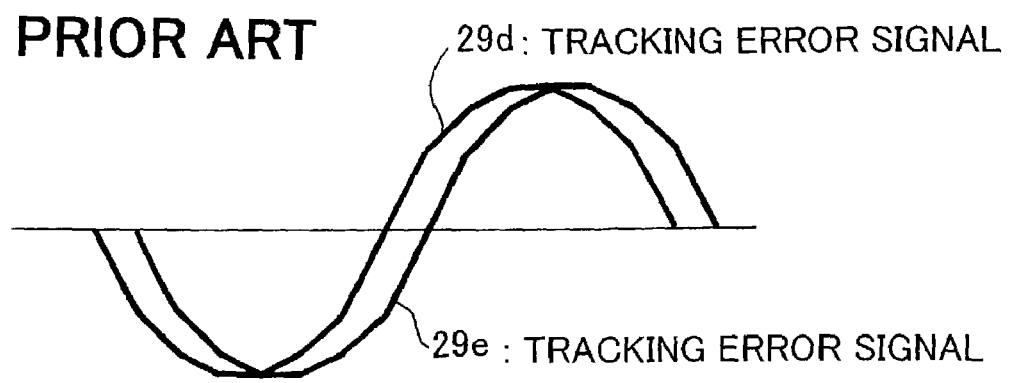

Various types of tracking error signals for detecting a radial tilt according to the embodiment are the same as those shown in FIGS. 8A to 8C. With the same reason as the conventional optical head apparatus described with reference to FIGS. 8A to 8C, the tracking error signal of each of the focused spots 13$d$ and 13$e$, which is the second sub beams when performing a tracking servo using the tracking error signal of the focused spot 13$a$ as the main beam, can be used as a radial tilt signal.

(Second Embodiment)

Figure 14A:
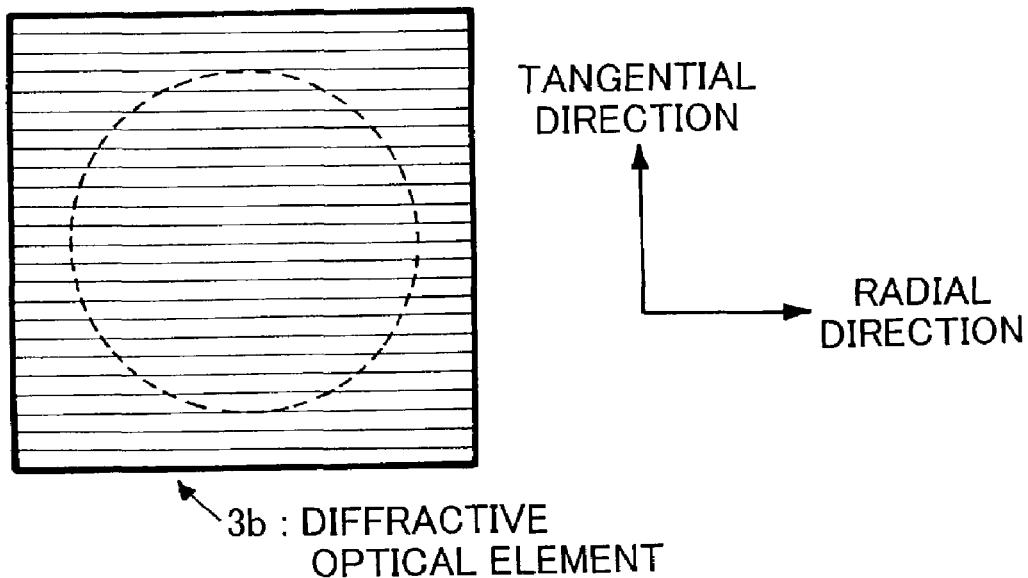
FIGS. 14A and 14B are plan views showing a diffractive optical element of an optical head apparatus according to a second embodiment of the present invention.
Figure 14B:
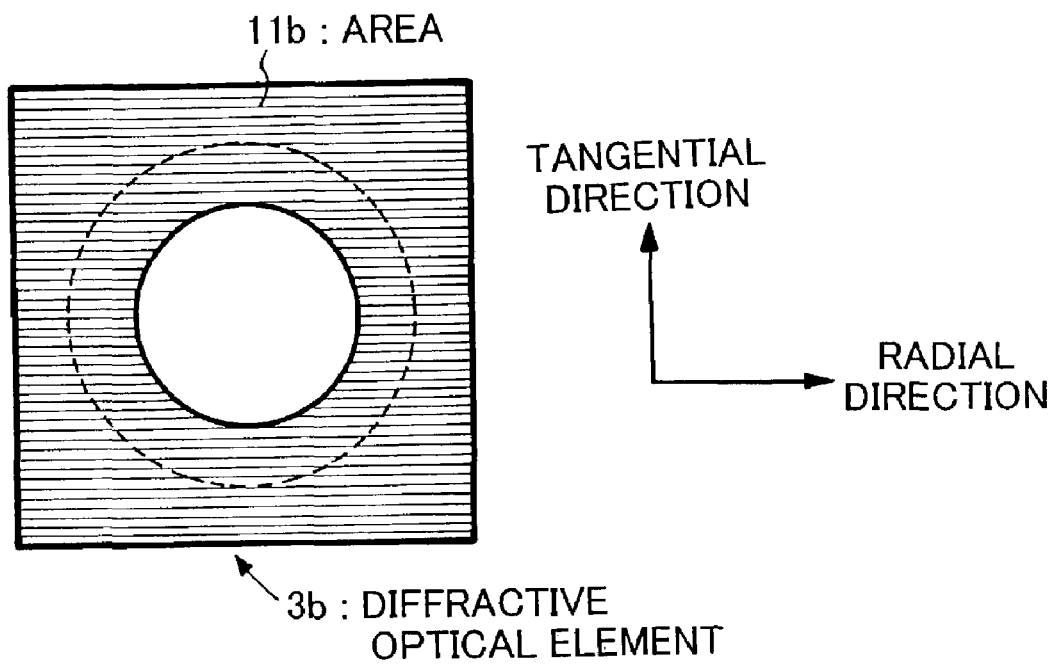

A second embodiment of the present invention is an optical head apparatus that is the same as the first embodiment except for the difference that the diffractive optical element 3$a$ is substituted with a diffractive optical element 3$b$. FIGS. 14A and 14B are plan views showing the diffractive optical element 3$b$. As shown in FIG. 14A, a diffraction grating is formed on the entire incident plane of the diffractive optical element 3$b$. As shown in FIG. 14B, a diffraction grating is formed in only an area 11$b$ of the exit plane of the diffractive optical element 3$b$. The area 11$b$ is outside a circle having a diameter that is smaller than the effective diameter (as denoted by a dotted line in FIG. 14B) of the objective lens 6. The direction of grating members of the diffraction grating formed on the incident plane and the direction of grating members of the diffraction grating formed on the exit plane nearly parallel the radial direction of the disk 7. The grating members are linearly formed and equally spaced. The pitches of the grating members of the diffraction grating formed on the incident plane are twice as wide as the pitches of the grating members of the diffraction grating formed on the exit plane.

When the phase difference between a line portion and a space portion of each grating member of each of these diffraction gratings is for example 0.232$\pi$ [radian], around 87.3% of light that enters the incident plane transmits as 0-th order light and around 5.1% of the incident light is diffracted as each of ±1st order diffracted light. On the other hand, around 87.3% of light that enters the area 11$b$ of the exit plane transmits as 0-th order light and around 5.1% of the light is diffracted as each of ±1st order diffracted light. In addition, nearly 100% of light that enters the outside of the area 11$b$ of the exit plane transmits. The light that exits the incident plane as the 0-th order light and exits the exit plane as the 0-th order light is referred to as main beam. The light that exits the incident plane as the ±1st order diffracted light and exits the exit plane as the 0-th order light is referred to as first sub beams. The light that exits the incident plane as the 0-th order light and exits the exit plane as the ±1st order diffracted light is referred to as second sub beams. In this case, each of the main beam and the first sub beams contains light that transmits the area 11$b$ of the exit plane and light that transmits the outside of the area 11$b$ in the same rate. In contrast, each of the second sub beams contains only light diffracted in the area 11$b$ of the exit plane. As a result, the distribution of the intensity of the main beam is the same as that of each of the first sub beams. In contrast, the distribution of the intensity of the main beam is different from that of each of the second sub beams. The intensity of the peripheral portion of each of the second sub beams is higher than the intensity of the peripheral portion of the main beam. The positions of the incident plane and the exit plane of the diffractive optical element 3$b$ may be reversed.

Figure 15:
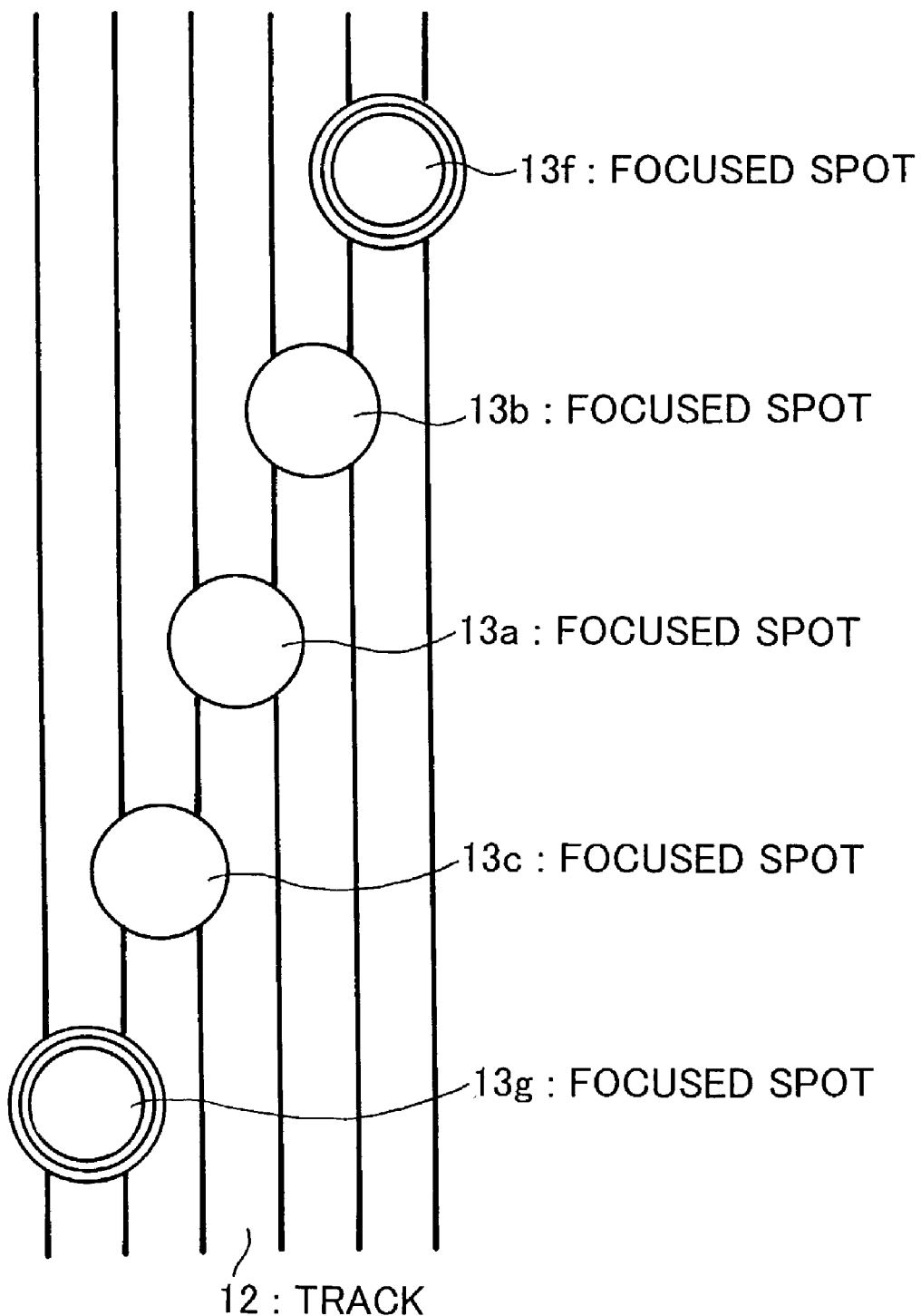
FIG. 15 is a schematic diagram showing the positions of focused spots on a disk by the optical head apparatus according to the second embodiment of the present invention.

FIG. 15 shows the positions of focused spots on the disk 7. Focused spots 13$a$, 13$b$, 13$c$, 13$f$, and 13$g$ correspond to the light that exits the incident plane of the diffractive optical element 3$b$ as the 0-th order light and exits the exit plane thereof as the 0-th order light, the light that exits the incident plane of the diffractive optical element 3$b$ as the +1st order diffracted light and exits the exit plane thereof as the 0-th order light, the light that exits the incident plane of the diffractive optical element 3$b$ as the −1st order diffracted light and exits the exit plane thereof as the 0-th order light, the light that exits the incident plane of the diffractive optical element 3b as the 0-th order light and exits the exit plane thereof as the +1st order diffracted light, and the light that exits the incident plane of the diffractive optical element 3b as the 0-th order light and exits the exit plane thereof as the −1st order diffracted light, respectively. The focused spot 13a is placed on a track 12 (land portion or groove portion). The focused spot 13b is placed on a track (groove portion or land portion) at the immediately right position of the track 12. The focused spot 13c is placed on a track (groove portion or land portion) at the immediately left position of the track 12. The focused spot 13f is placed on a track (land portion or groove portion) rightward spaced apart from the track 12 by two tracks. The focused spot 13g is placed on a track (land portion or groove portion) leftward spaced apart from the track 12 by two tracks. Since the distribution of the intensity of each of the first sub beam is the same as the distribution of the intensity of the main beam, the diameter of each of the focused spots 13b and 13c as the first sub beams is equal to the diameter of the focused spot 13a. In contrast, since the intensity of the peripheral portion of each of the second sub beams is higher than the intensity of the peripheral portion of the main beam, the diameter of each of the focused spots 13f and 13g as the second sub beams is smaller than the diameter of the focused spot 13a and the side lobe of the former is larger than the side lobe of the latter.

Figure 16:
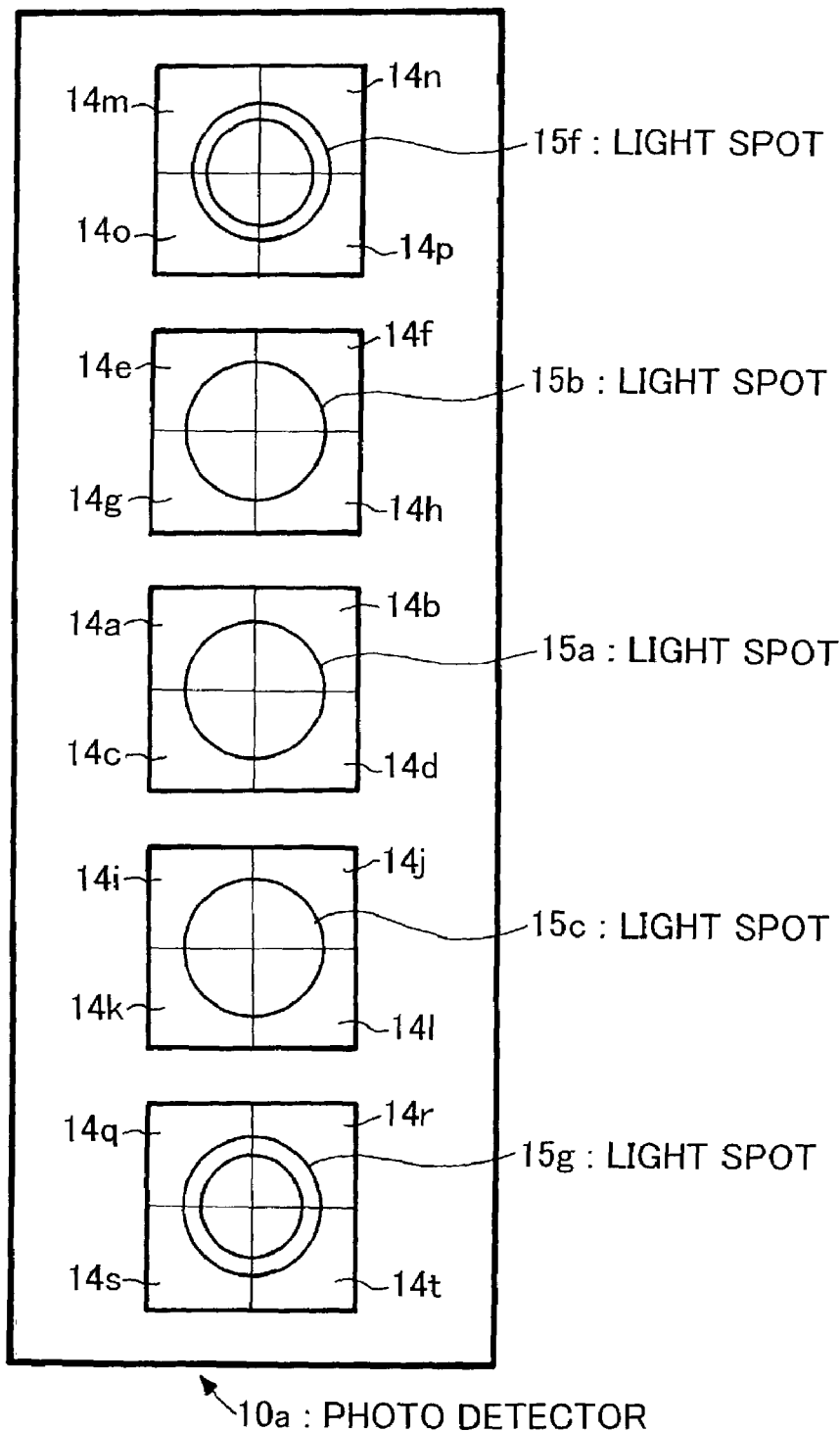
FIG. 16 is a schematic diagram showing the pattern of a light receiving portion of a photo detector of the optical head apparatus and the positions of light spots on the photo detector according to the second embodiment of the present invention.

FIG. 16 shows the pattern of the light receiving portion of the photo detector 10a and the positions of light spots on the photo detector 10a. A light spot 15a corresponds to the light that exits the incident plane as the 0-th order light and exits the exit plane as the 0-th order light. The light spot 15a is received by light receiving portions 14a to 14d divided by a division line that passes through the optical axis and parallels the tangential direction of the disk 7 and a division line that parallels the radial direction thereof. A light spot 15b corresponds to the light that exits the incident plane as the +1st order diffracted light and exits the exit plane as the 0-th order light. The light spot 15b is received by light receiving portions 14e to 14h divided by a division line that passes through the optical axis and that parallels the tangential direction of the disk 7 and a division line that parallels the radial direction thereof A light spot 15c corresponds to the light that exits the incident plane as the −1st order diffracted light and exits the exit plane as the 0-th order light. The light spot 15c is received by four light receiving portions 14i to 14l divided by a division line that passes through the optical axis and that parallels the tangential direction of the disk 7 and a division line that parallels the radial direction thereof. A light spot 15f corresponds to the light that exits the incident plane as the 0-th order light and exits the exit plane as the +1st order diffracted light. The light spot 15f is received by four light receiving portions 14m to 14p divided by a division line that passes through the optical axis and that parallels the tangential direction of the disk 7 and a division line that parallels the radial direction thereof. A light spot 15g corresponds to the light that exits the incident plane as the 0-th order light and exits the exit plane as the −1st order diffracted light. The light spot 15g is received by four light receiving portions 14q to 14t divided by a division line that passes through the optical axis and that parallels the tangential direction of the disk 7 and a division line that parallels the radial direction thereof. The focused spots 13a, 13b, 13c, 13f, and 13g on the disk 7 are trained nearly in the tangential direction. Due to the operations of the cylindrical lens 8 and the lens 9, the light spots 15a, 15b, 15c, 15f, and 15g are trained on the photo detector 10a nearly in the radial direction. According to the second embodiment of the present invention, in the same manner as the first embodiment, a focusing error signal, a tracking error signal, and an RF signal can be obtained.

With the same reason as the conventional optical head apparatus described with reference to FIGS. 4A, 4B, and 4C, according to the embodiment, the focusing error signals do not have offsets. With the same reason as the conventional optical head apparatus described with reference to FIGS. 5A, 5B, and 5C, according to the embodiment, the tracking error signals do not have offsets. With the same reason as the first embodiment described with reference to FIGS. 13A to 13C, the focusing error signal of each of the focused spots 13f and 13g as the second sub beams when performing a focusing servo using the focusing error signal of the focused spot 13a as the main beam can be used as a substrate thickness deviation signal. With the same reason as the conventional optical head apparatus described with reference to FIGS. 8A to 8C, the tracking error signal of each of the focused spots 13f and 13g as the second sub beams when performing a tracking servo using the tracking error signal of the focused spot 13a as the main beam can be used as a radial tilt signal.

(Third Embodiment)

Figure 17A:
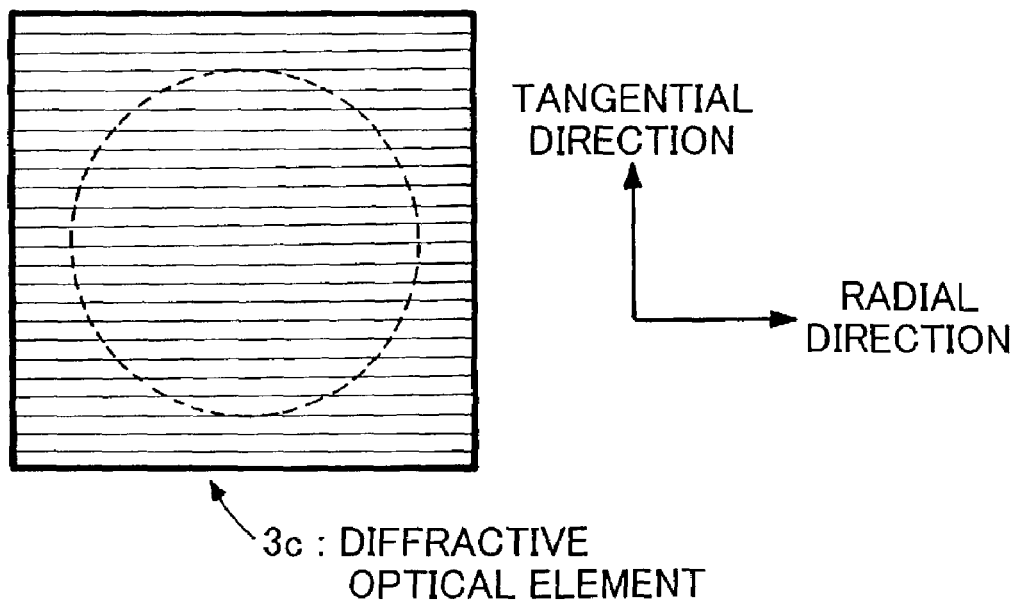
FIGS. 17A and 17B are plan views showing a diffractive optical element of an optical head apparatus according to a third embodiment of the present invention.
Figure 17B:
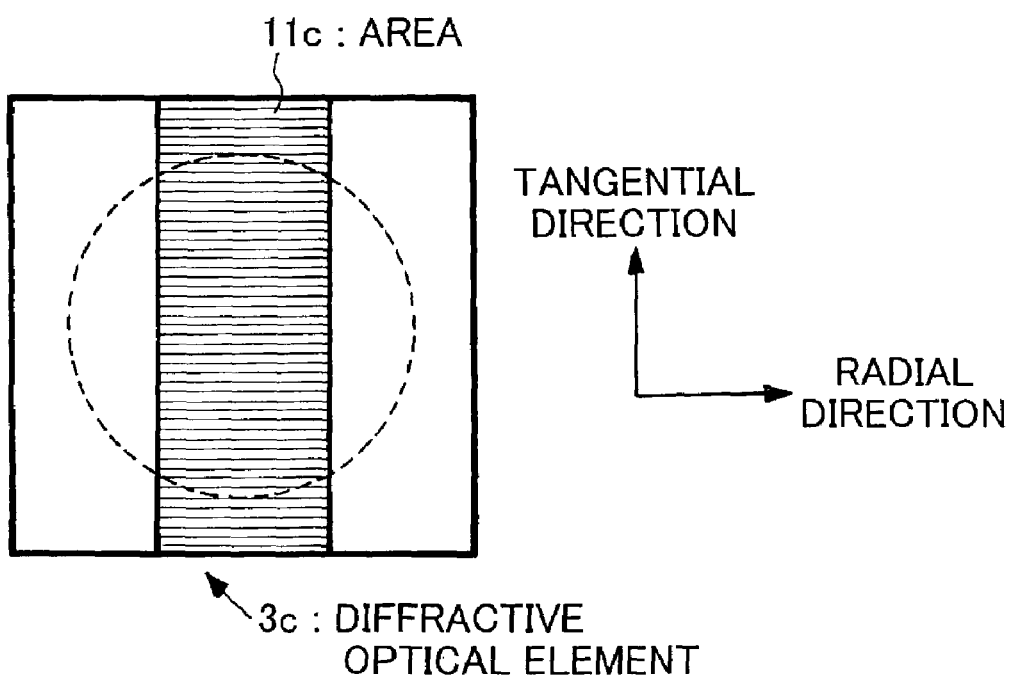

A third embodiment of the present invention is an optical head apparatus that is the same as the first embodiment except for the difference that the diffractive optical element 3a is substituted with a diffractive optical element 3c. FIGS. 17A and 17B are plan views showing the diffractive optical element 3c. As shown in FIG. 17A, a diffraction grating is formed on the entire incident plane of the diffractive optical element 3c. As shown in FIG. 17B, a diffraction grating is formed in only an area 11c of the exit plane of the diffractive optical element 3c. The area 11c is inside a rectangular portion having a width that is smaller than the effective diameter (as denoted by a dotted line in FIG. 17B) of the objective lens 6. The direction of grating members of the diffraction grating formed on the incident plane and the direction of grating members of the diffraction grating formed on the exit plane nearly parallel the radial direction of the disk 7. The grating members are linearly formed and equally spaced. The pitches of the grating members of the diffraction grating formed on the incident plane are twice as wide as the pitches of the grating members of the diffraction grating formed on the exit plane.

When the phase difference between a line portion and a space portion of each grating member of each of these diffraction gratings is for example 0.232π [radian], around 87.3% of light that enters the incident plane transmits as 0-th order light and around 5.1% of the incident light is diffracted as each of +1st order diffracted light. On the other hand, around 87.3% of light that enters the area 11c of the exit plane transmits as 0-th order light and around 5.1% of the light is diffracted as each of +1st order diffracted light. In addition, nearly 100% of light that enters the outside of the area 11c of the exit plane transmits. The light that exits the incident plane of the diffractive optical element 3c as the 0-th order light and exits the exit plane thereof as the 0-th order light is referred to as main beam. The light that exits the incident plane of the diffractive optical element 3c as the ±1st order diffracted light and exits the exit plane thereof as the 0-th order light is referred to as first sub beams. The light that exits the incident plane of the diffractive optical element 3c as the 0-th order light and exits the exit plane as the ±1st order diffracted light is referred to as second sub beams. In this case, each of the main beam and the first sub beams contains light that transmits the area 11c of the exit plane and light that transmits the outside of the area 11c in the same rate. In contrast, each of the second sub beams contains only light diffracted in the area 11c of the exit plane. As a result, the distribution of the intensity of the main beam is the same as that of each of the first sub beams. In contrast, the distribution of the intensity of the main beam is different from that of each of the second sub beams. The intensity of the peripheral portion in the radial direction of each of the second sub beams is lower than the intensity of the peripheral portion in the radial direction of the main beam. The positions of the incident plane and the exit plane of the diffractive optical element 3c may be reversed.

The positions of focused spots on the disk 7 according to the third embodiment are nearly the same as those shown in FIG. 11. However, since the intensity of the peripheral portion in the radial direction of each of the second sub beams is lower than the intensity of the peripheral portion in the radial direction of the main beam, the diameter in the radial direction of each of the focused spots as the second sub beams is larger than the diameter in the radial direction of the focused spot of the main beam. In addition, the pattern of the light receiving portion of the photo detector 10a and the positions of the light spots on the photo detector 10a according to the third embodiment are nearly the same as those shown in FIG. 12. According to the third embodiment of the present invention, in the same manner as the first embodiment, a focusing error signal, a tracking error signal, and an RF signal can be obtained.

With the same reason as the conventional optical head apparatus, according to the embodiment, the focusing error signals and the tracking error signals do not have offsets. In the same manner as the optical head apparatus according to the first embodiment and the conventional optical head apparatus, according to the third embodiment, a deviation of the thickness of the substrate of the disk 7 and a radial tilt thereof can be detected, respectively.

(Fourth Embodiment)

Figure 18A:
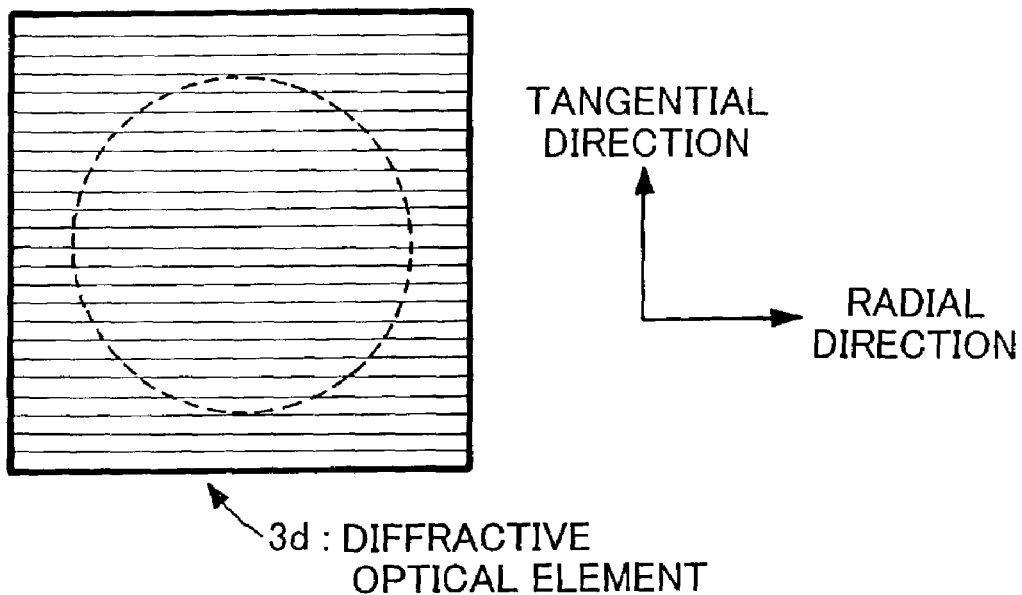
FIGS. 18A and 18B are plan views showing a diffractive optical element of an optical head apparatus according to a fourth embodiment of the present invention.
Figure 18B:
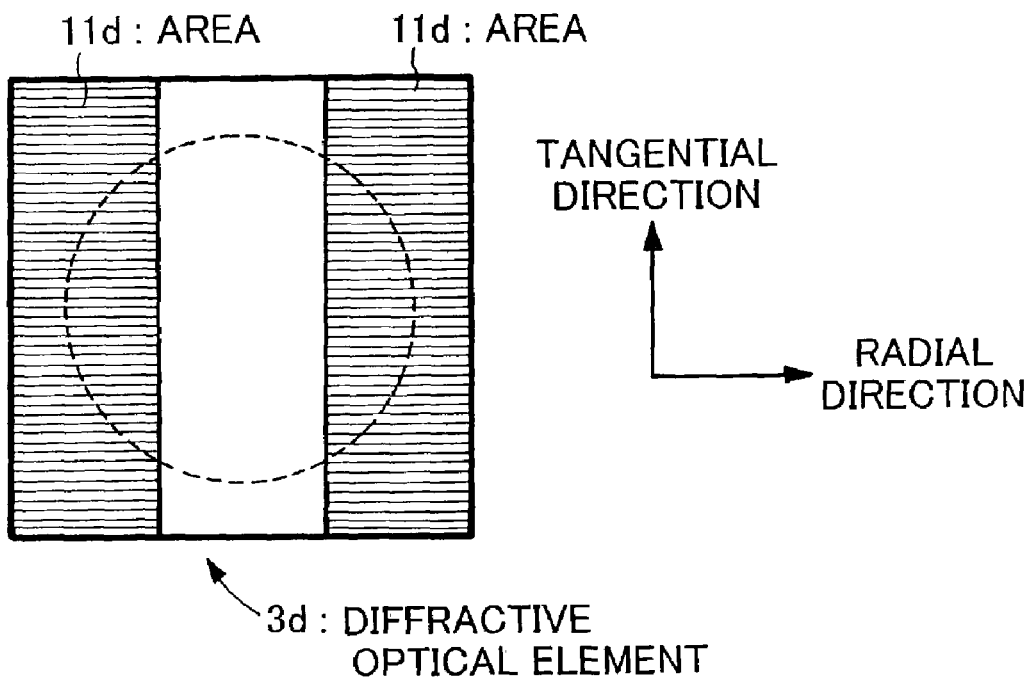

A fourth embodiment of the present invention is an optical head apparatus that is the same as the first embodiment except for the difference that the diffractive optical element 3a is substituted with a diffractive optical element 3d. FIGS. 18A and 18B are plan views showing the diffractive optical element 3d. As shown in FIG. 18A, a diffraction grating is formed on the entire incident plane of the diffractive optical element 3d. As shown in FIG. 18B, a diffraction grating is formed in only an area 11d of the exit plane of the diffractive optical element 3d. The area 11d is outside a rectangular portion having a width that is smaller than the effective diameter (as denoted by a dotted line in FIG. 18B) of the objective lens 6. The direction of grating members of the diffraction grating formed on the incident plane and the direction of grating members of the diffraction grating formed on the exit plane nearly parallel the radial direction of the disk 7. The grating members are linearly formed and equally spaced. The pitches of the grating members of the diffraction grating formed on the incident plane are twice as wide as the pitches of the grating members of the diffraction grating formed on the exit plane.

When the phase difference between a line portion and a space portion of each grating member of each of these diffraction gratings is for example $0.232\pi$ [radian], around 87.3% of light that enters the incident plane transmits as 0-th order light and around 5.1% of the incident light is diffracted as each of ±1st order diffracted light. On the other hand, around 87.3% of light that enters the area 11d of the exit plane transmits as 0-th order light and around 5.1% of the light is diffracted as each of ±1st order diffracted light. In addition, nearly 100% of light that enters the outside of the area lid of the exit plane transmits. The light that exits the incident plane as the 0-th order light and exits the exit plane as the 0-th order light is referred to as main beam. The light that exits the incident plane as the +1st order diffracted light and exits the exit plane as the 0-th order light is referred to as first sub beams. The light that exits the incident plane as the 0-th order light and exits the exit plane as the ±1st order diffracted light is referred to as second sub beams. In this case, each of the main beam and the first sub beams contains light that transmits the area 11d of the exit plane and light that transmits the outside of the area 11d in the same rate. In contrast, each of the second sub beams contains only light diffracted in the area 11d of the exit plane. As a result, the distribution of the intensity of the main beam is the same as that of each of the first sub beams. In contrast, the distribution of the intensity of the main beam is different from that of each of the second sub beams. The intensity of the peripheral portion in the radial direction of each of the second sub beams is higher than the intensity of the peripheral portion in the radial direction of the main beam. The positions of the incident plane and the exit plane of the diffractive optical element 3d may be reversed.

The positions of focused spots on the disk 7 according to the fourth embodiment are nearly the same as those shown in FIG. 15. However, since the intensity of the peripheral portion in the radial direction of each of the second sub beams is higher than the intensity of the peripheral portion in the radial direction of the main beam, the diameter in the radial direction of each of the focused spots as the second sub beams is smaller than the diameter in the radial direction of the focused spot of the main beam and the side lobe of the former is larger than the side lobe of the latter. In addition, the pattern of the light receiving portion of the photo detector 10a and the positions of the light spots on the photo detector 10a according to the fourth embodiment are nearly the same as those shown in FIG. 16. According to the fourth embodiment of the present invention, in the same manner as the first embodiment, a focusing error signal, a tracking error signal, and an RF signal can be obtained.

With the same reason as the conventional optical head apparatus, according to the fourth embodiment, the focusing error signals and the tracking error signals do not have offsets. In the same manner as the optical head apparatus according to the first embodiment and the conventional optical head apparatus, according to the fourth embodiment, a deviation of the thickness of the substrate of the disk 7 and a radial tilt thereof can be detected, respectively.

(Fifth Embodiment)

Figure 19A:
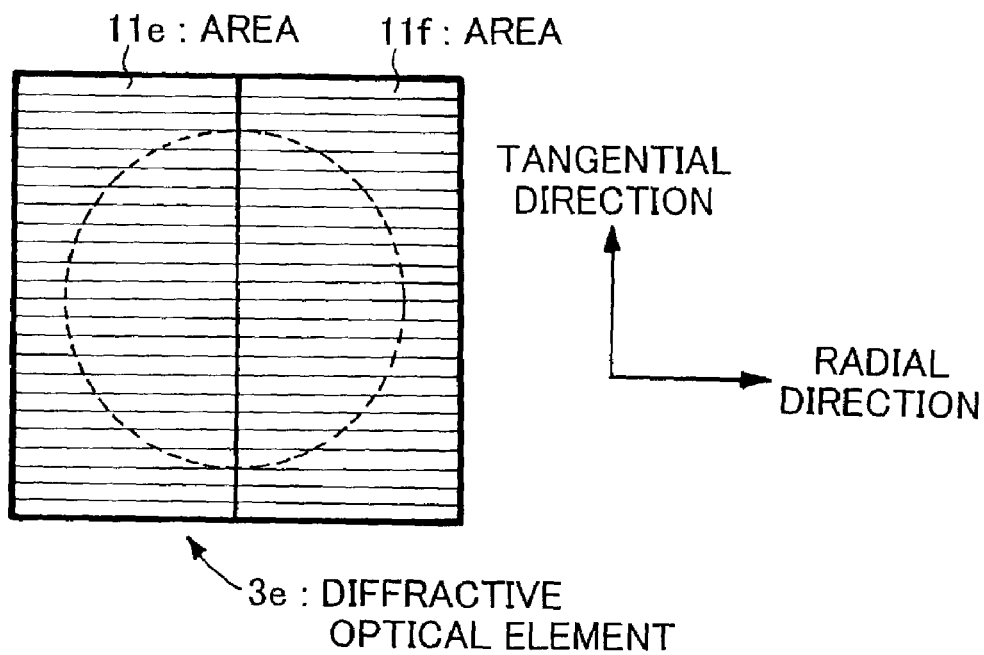
FIGS. 19A and 19B are plan views showing a diffractive optical element of an optical head apparatus according to a fifth embodiment of the present invention.
Figure 19B:
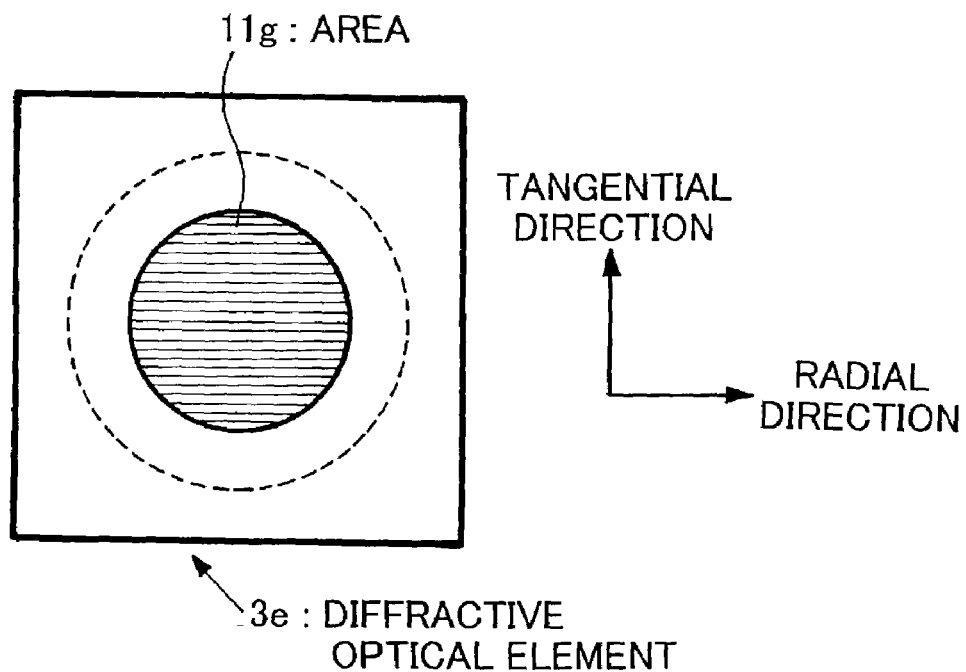

A fifth embodiment of the present invention is an optical head apparatus that is the same as the first embodiment except for the difference that the diffractive optical element 3a is substituted with a diffractive optical element 3e. FIGS. 19A and 19B are plan views showing the diffractive optical element 3e. As shown in FIG. 19A, a diffraction grating is formed on the incident plane of the diffractive optical element 3e. The diffraction grating has two areas 11e and 11f divided by a straight line that passes through the optical axis of the incident light and that parallels the tangential direction of the disk 7. As shown in FIG. 19B, a diffraction grating is formed in only an area 11g of the exit plane of the diffractive optical element 3e. The area 11g is a circular area having a diameter that is smaller than the effective diameter (as denoted by a dotted line in FIG. 19B) of the objective lens 6. The direction of grating members of the diffraction grating formed on the incident plane and the direction of grating members of the diffraction grating formed on the exit plane nearly parallel the radial direction of the disk 7. The grating members are linearly formed and equally spaced. The pitches of the grating members of the diffraction grating formed on the incident plane are twice as wide as the pitches of the grating members of the diffraction grating formed on the exit plane. The phase of the grating of the area 11e of the incident plane is different from the phase of the grating of the area 11f by π [radian].

When the phase difference between a line portion and a space portion of each grating member of each of these diffraction gratings is for example 0.232π [radian], around 87.3% of light that enters the incident plane transmits as 0-th order light and around 5.1% of the incident light is diffracted as each of ±1st order diffracted light. On the other hand, around 87.3% of light that enters the area 11g of the exit plane transmits as 0-th order light and around 5.1% of the light is diffracted as each of ±1st order diffracted light. In addition, nearly 100% of light that enters the outside of the area 11g of the exit plane transmits. The light that exits the incident plane as the 0-th order light and exits the exit plane as the 0-th order light is referred to as main beam. The light that exits the incident plane as the ±1st order diffracted light and exits the exit plane as the 0-th order light is referred to as first sub beams. The light that exits the incident plane as the 0-th order light and exits the exit plane as the ±1st order diffracted light is referred to as second sub beams. In this case, each of the main beam and the first sub beams contains light that transmits the area 11g of the exit plane and light that transmits the outside of the area 11g in the same rate. In contrast, each of the second sub beams contains only light diffracted in the area 11g of the exit plane. As a result, the distribution of the intensity of the main beam is the same as that of each of the first sub beams. In contrast, the distribution of the intensity of the main beam is different from that of each of the second sub beams. The intensity of the peripheral portion of each of the second sub beams is lower than the intensity of the peripheral portion of the main beam. The phase of +1st order diffracted light of the area 11e of the incident plane is different from the phase of +1st order diffracted light of the area 11f by π [radian]. Likewise, the phase of −1st order diffracted light of the area 11e of the incident plane is different from the phase of −1st order diffracted light of the area 11f by π [radian]. The positions of the incident plane and the exit plane of the diffractive optical element 3e may be reversed.

Figure 20:
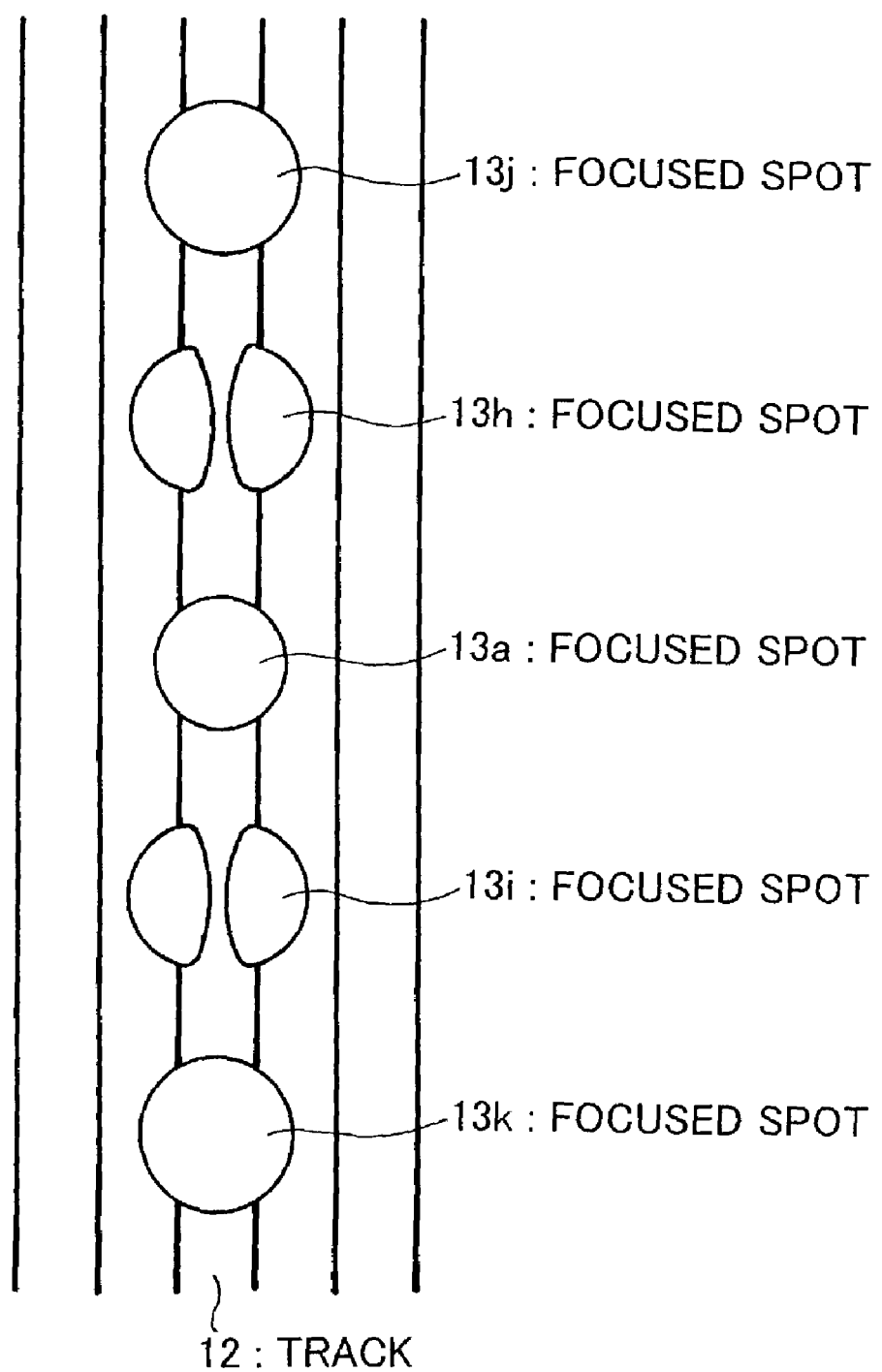
FIG. 20 is a schematic diagram showing the positions of focused spots on a disk by the optical head apparatus according to the fifth embodiment of the present invention.

FIG. 20 shows the positions of focused spots on the disk 7. Focused spots 13a, 13h, 13i, 13j, and 13k correspond to the light that exits the incident plane as the 0-th order light and exits the exit plane as the 0-th order light, the light that exits the incident plane as the +1st order diffracted light and exits the exit plane as the 0-th order light, the light that exits the incident plane as the −1st order diffracted light and exits the exit plane as the 0-th order light, the light that exits the incident plane as the 0-th order light and exits the exit plane as the +1st order diffracted light, and the light that exits the incident plane as the 0-th order light and exits the exit plane as the −1st order diffracted light, respectively. The five focused spots 13a, 13h, 13i, 13j, and 13k are placed on the same track 12 (land portion or groove portion). Each of the first sub beams is divided into a left side and a right side by a straight line that passes through the optical axis and that parallels the tangential direction of the disk 7. The phase of the left side is different from the phase of the right side by π [radian]. Thus, each of the focused spots 13h and 13i that are the first sub beams has two peaks of which intensities are the same on the left side and the right side in the radial direction of the disk 7. In contrast, since the intensity of the peripheral portion of each of the second sub beams is lower than the intensity of the peripheral portion of the main beam, the diameter of each of the focused spots 13j and 13k as the second sub beams is larger than the diameter of the focused spot 13a as the main beam.

The pattern of the light receiving portion of the photo detector 10a and the positions of the light spots on the photo detector 10a according to the fifth embodiment are nearly the same as those shown in FIG. 12. According to the fifth embodiment of the present invention, in the same manner as the first embodiment, a focusing error signal, a tracking error signal, and an RF signal can be obtained.

The phase of the grating of the area 11e of the incident plane of the diffractive optical element 3e is different from the phase of the grating of the area 11f thereof by π [radian]. Thus, the phase of each of the first sub beams in the left side of a straight line that passes through the optical axis and that parallels the tangential direction of the disk 7 is different from the phase of each of the first sub beams in the right side of this straight line by π [radian]. With respect to an error signal, that structure is equivalent to the case that focused spots of each of the first sub beams are placed on the disk 7 so that they shift in the radial direction of the disk 7 by ½ pitch of the groove of the disk 7 as described in for example Japanese Patent Laid-Open Publication No. 9-81942. Thus, with the same reason as the conventional optical head apparatus, according to the fifth embodiment, the focusing error signals and the tracking error signals do not have offsets. In addition, in the same manner as the optical head apparatus according to the first embodiment and the conventional optical head apparatus, a deviation of the thickness of the substrate of the disk 7 and a radial tilt thereof can be detected, respectively. In addition, according to the fifth embodiment of the present invention, the five focused spots 13a, 13h, 13i, 13j, and 13k are placed on the same track 12 of the disk 7. Thus, the positions of the five focused spots do not vary for a disk having any track pitch. Regardless of the track pitch of a disk which is subjected to the optical head apparatus according to the fifth embodiment, the focusing error signals and tracking error signals do not have offsets, and a deviation of the thickness of the substrate of the disk and a radial tilt thereof can be detected.

As further embodiments of the present invention, each of the diffractive optical element 3b of the second embodiment, the diffractive optical element 3c of the third embodiment, and the diffractive optical element 3d of the fourth embodiment may be substituted with a diffractive optical element of which the incident plane is divided into two areas like the diffractive optical element 3e of the fifth embodiment. These further embodiments are the combination of the second embodiment and the fifth embodiment, the combination of the third embodiment and the fifth embodiment, and the combination of the fourth embodiment and the fifth embodiment. In the combination of the second embodiment and the fifth embodiment, the incident plane of the diffractive optical element has the pattern shown in FIG. 19A and the exit plane of the diffractive optical element has the pattern shown in FIG. 14B. In the combination of the third embodiment and the fifth embodiment, the incident plane of the diffractive optical element has the pattern shown in FIG. 19A and the exit plane of the diffractive optical element has the pattern shown in FIG. 17B. In the combination of the fourth embodiment and the fifth embodiment, the incident plane of the diffractive optical element has the pattern shown in FIG. 19A and the exit plane of the diffractive optical element has the pattern shown in FIG. 18B.

According to these embodiments, with the same reason as the fifth embodiment, when a disk having any track pitch is used, the focusing error signals and tracking error signals do not have offsets. In addition, a deviation of the thickness of the substrate of the disk and a radial tilt thereof can be detected.

(Sixth Embodiment)

Figure 21A:
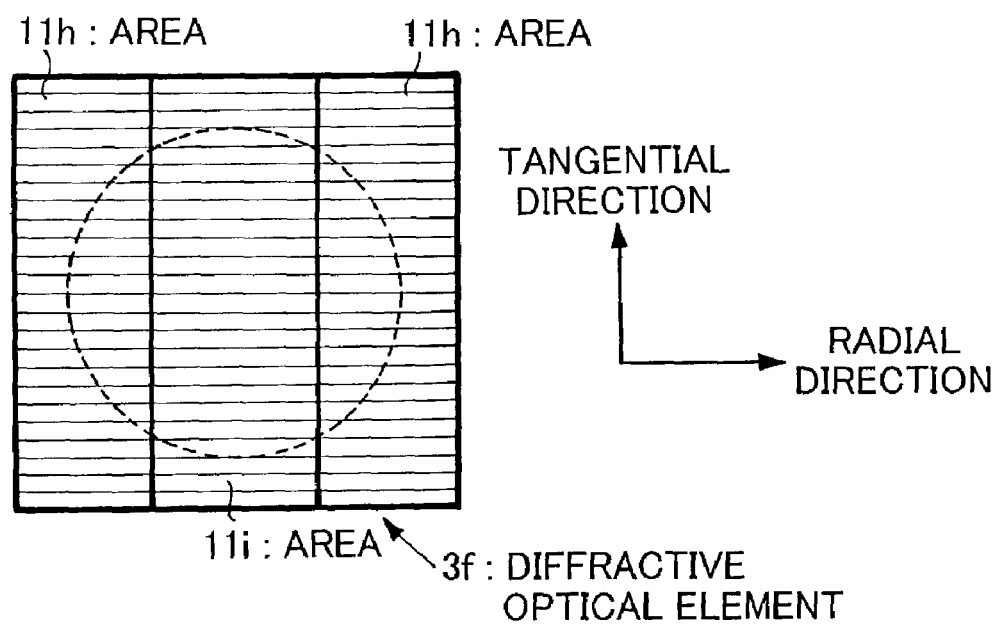
FIGS. 21A and 21B are plan views showing a diffractive optical element of an optical head apparatus according to a sixth embodiment of the present invention.
Figure 21B:
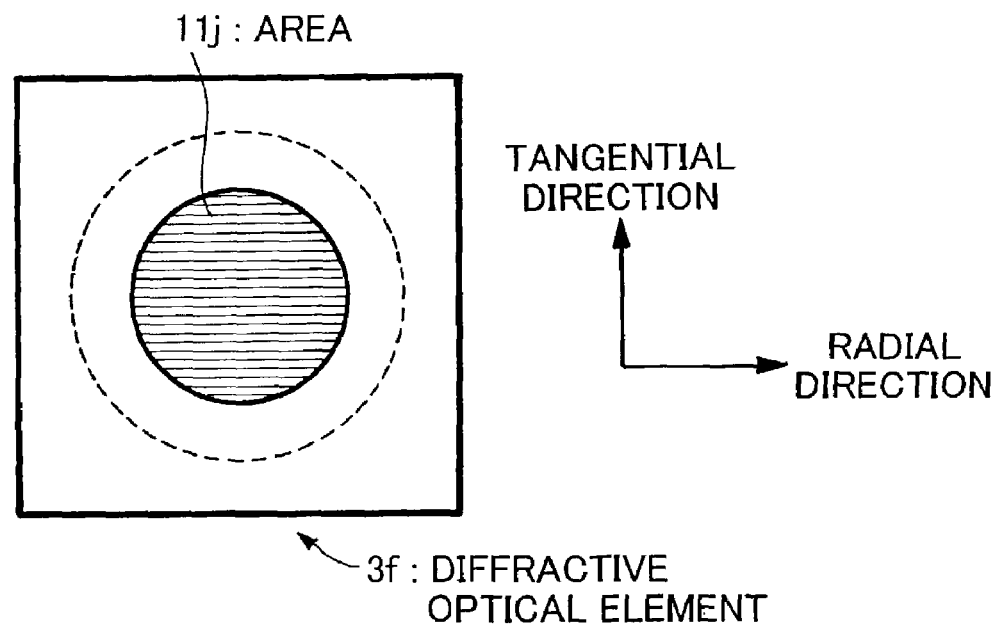

A sixth embodiment of the present invention is an optical head apparatus that is the same as the first embodiment except for the difference that the diffractive optical element 3a is substituted with a diffractive optical element 3f. FIGS. 21A and 21B are plan views showing the diffractive optical element 3f. As shown in FIG. 21A, a diffraction grating is formed on the incident plane of the diffractive optical element 3f. The diffraction grating has two areas 11h and 11i (composed of two portions) divided by two straight lines that are symmetrical with respect to the optical axis of the incident light and that parallel the tangential direction of the disk 7. As shown in FIG. 21B, a diffraction grating is formed in only an area 11j of the exit plane of the diffractive optical element 3f. The area 11j is a circular area having a diameter that is smaller than the effective diameter (as denoted by a dotted line in FIG. 21B) of the objective lens 6. The direction of grating members of the diffraction grating formed on the incident plane and the direction of grating members of the diffraction grating formed on the exit plane nearly parallel the radial direction of the disk 7. The grating members are linearly formed and equally spaced. The pitches of the grating members of the diffraction grating formed on the incident plane are twice as wide as the pitches of the grating members of the diffraction grating formed on the exit plane. The phase of the grating of the area 11h of the incident plane is different from the phase of the grating of the area 11i by $\pi$ [radian].

When the phase difference between a line portion and a space portion of each grating member of each of these diffraction gratings is for example $0.232\pi$ [radian], around 87.3% of light that enters the incident plane transmits as 0-th order light and around 5.1% of the incident light is diffracted as each of ±1st order diffracted light. On the other hand, around 87.3% of light that enters the area 11j of the exit plane transmits as 0-th order light and around 5.1% of the light is diffracted as each of ±1st order diffracted light. In addition, nearly 100% of light that enters the outside of the area 11j of the exit plane transmits. The light that exits the incident plane as the 0-th order light and exits the exit plane as the 0-th order light is referred to as main beam. The light that exits the incident plane as the ±1st order diffracted light and exits the exit plane as the 0-th order light is referred to as first sub beams. The light that exits the incident plane as the 0-th order light and exits the exit plane as the ±1st order diffracted light is referred to as second sub beams. In this case, each of the main beam and the first sub beams contains light that transmits the area 11j of the exit plane and light that transmits the outside of the area 11j in the same rate. In contrast, each of the second sub beams contains only light diffracted in the area 11j of the exit plane. As a result, the distribution of the intensity of the main beam is the same as that of each of the first sub beams. In contrast, the distribution of the intensity of the main beam is different from that of each of the second sub beams. The intensity of the peripheral portion of each of the second sub beams is lower than the intensity of the peripheral portion of the main beam. The phase of +1st order diffracted light of the area 11h of the incident plane is different from the phase of +1st order diffracted light of the area 11i by $\pi$ [radian]. Likewise, the phase of −1st order diffracted light of the area 11h of the incident plane is different from the phase of −1st order diffracted light of the area 11i by $\pi$ [radian]. The positions of the incident plane and the exit plane of the diffractive optical element 3f may be reversed.

Figure 22:
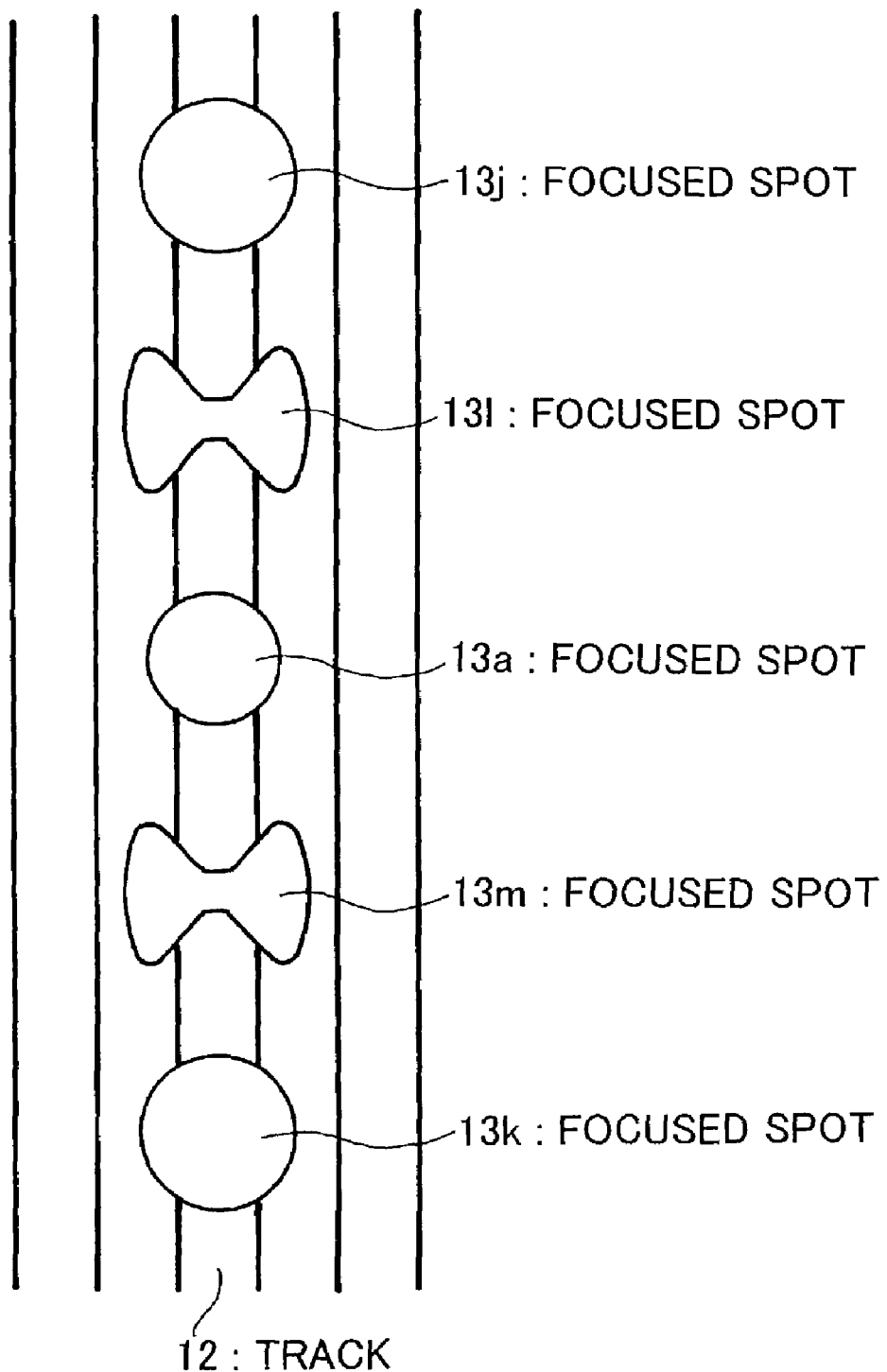
FIG. 22 is a plan view showing the positions of focused spots on a disk of the optical head apparatus according to the sixth embodiment of the present invention.

FIG. 22 shows the positions of focused spots on the disk 7. Focused spots 13a, 13l, 13m, 13j, and 13k correspond to the light that exits the incident plane as the 0-th order light and exits the exit plane as the 0-th order light, the light that exits the incident plane as the +1st order diffracted light and exits the exit plane as the 0-th order light, the light that exits the incident plane as the −1st order diffracted light and exits the exit plane as the 0-th order light, the light that exits the incident plate as the 0-th order light and exits the exit plane as the +1st order diffracted light, and the light that exits the incident plate as the 0-th order light and exits the exit plane as the −1st order diffracted light, respectively. The five focused spots 13a, 13l, 13m, 13j, and 13k are placed on the same track 12 (land portion or groove portion). Each of the first sub beams is divided into a left side and a right side by two straight lines that are symmetrical with respect to the optical axis and that parallel the tangential direction of the disk 7. The phase of the left side is different from the phase of the right side by $\pi$ [radian]. Thus, each of the focused spots 13l and 13m that are the first sub beams has two peaks of which intensities are the same on the left side and the right side in the radial direction of the disk 7. In contrast, since the intensity of the peripheral portion of each of the second sub beams is lower than the intensity of the peripheral portion of the main beam, the diameter of each of the focused spots 13j and 13k as the second sub beams is larger than the diameter of the focused spot 13a as the main beam.

The pattern of the light receiving portion of the photo detector 10a and the positions of the light spots on the photo detector 10a according to the sixth embodiment are nearly the same as those shown in FIG. 12. According to the sixth embodiment of the present invention, in the same manner as the first embodiment, a focusing error signal, a tracking error signal, and an RF signal can be obtained.

The phase of the grating of the area 11h of the incident plane of the diffractive optical element 3f is different from the phase of the grating of the area 11i thereof by $\pi$ [radian]. Thus, the phases of the inside and outside of two straight lines that are symmetrical with respect to the optical axis and that parallel the tangential direction of the disk 7 are different from each other by it [radian]. With respect to an error signal, that structure is equivalent to the case that focused spots of each of the first sub beams are placed on the disk 7 so that they shift in the radial direction of the disk 7 by ½ pitch of the groove of the disk 7 as described in for example Japanese Patent Laid-Open Publication No. 11-296875. Thus, with the same reason as the conventional optical head apparatus, according to the sixth embodiment, the focusing error signals and the tracking error signals do not have offsets. In addition, in the same manner as the optical head apparatus according to the first embodiment and the conventional optical head apparatus, a deviation of the thickness of the substrate of the disk 7 and a radial tilt thereof can be detected, respectively. Moreover, according to the sixth embodiment of the present invention, the five focused spots 13a, 13l, 13m, 13j, and 13k are placed on the same track 12 of the disk 7. Thus, the positions of the five focused spots do not vary for a disk having any track pitch. Regardless of the track pitch of a disk which is subjected to the optical head apparatus according to the sixth embodiment, the focusing error signals and tracking error signals do not have offsets, and a deviation of the thickness of the substrate of the disk and a radial tilt thereof can be detected.

As further embodiments of the present invention, each of the diffractive optical element 3b of the second embodiment, the diffractive optical element 3c of the third embodiment, and the diffractive optical element 3d of the fourth embodiment may be substituted with a diffractive optical element of which the incident plane is divided into two areas like the diffractive optical element 3f of the sixth embodiment. These further embodiments are the combination of the second embodiment and the sixth embodiment, the combination of the third embodiment and the sixth embodiment, and the combination of the fourth embodiment and the sixth embodiment. In the combination of the second embodiment and the sixth embodiment, the incident plane of the diffractive optical element has the pattern shown in FIG. 21A and the exit plane of the diffractive optical element has the pattern shown in FIG. 14B. In the combination of the third embodiment and the sixth embodiment, the incident plane of the diffractive optical element has the pattern shown in FIG. 21A and the exit plane of the diffractive optical element has the pattern shown in FIG. 17B. In the combination of the fourth embodiment and the sixth embodiment, the incident plane of the diffractive optical element has the pattern shown in FIG. 21A and the exit plane of the diffractive optical element has the pattern shown in FIG. 18B.

According to these embodiments, with the same reason as the sixth embodiment, when a disk having any track pitch is used, the focusing error signals and tracking error signals do not have offsets. In addition, a deviation of the thickness of the substrate of the disk and a radial tilt thereof can be detected.

(Seventh Embodiment)

Figure 23:
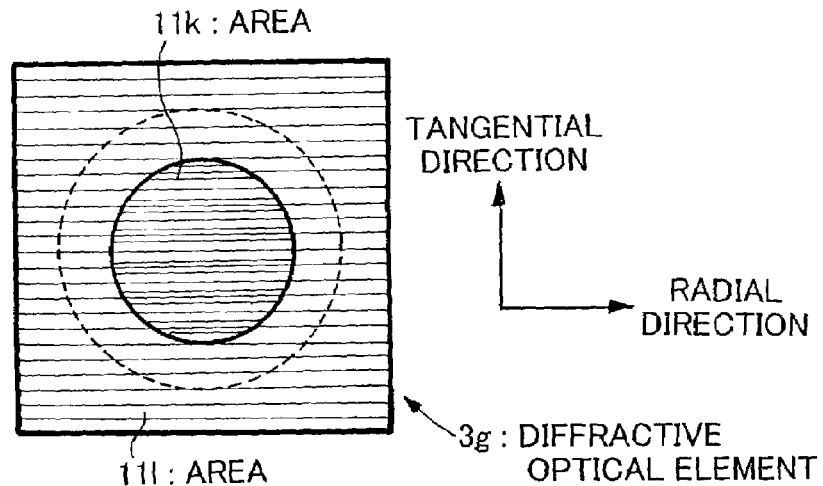
FIG. 23 is a plan view showing a diffractive optical element of an optical head apparatus according to a seventh embodiment of the present invention.

A seventh embodiment of the present invention is an optical head apparatus that is the same as the first embodiment except for the difference that the diffractive optical element 3a is substituted with a diffractive optical element 3g. FIG. 23 is a plan view showing the diffractive optical element 3g. A diffraction grating is formed in an area 11k and an area 11l of the diffractive optical element 3g. The area 11k is a circular area having a diameter that is smaller than the effective diameter (denoted by a dotted line in FIG. 23) of the objective lens 6. The area 11l is an area outside the area 11k. The direction of grating members of the diffraction grating of the area 11k and the direction of grating members of the diffraction grating of the area 11l nearly parallel the radial direction of the disk 7. The grating members are linearly formed and equally spaced. The pitches of the grating members of the diffraction grating of the area 11k are equal to the pitches of the grating members of the diffraction grating of the area 11l.

Figure 24A:
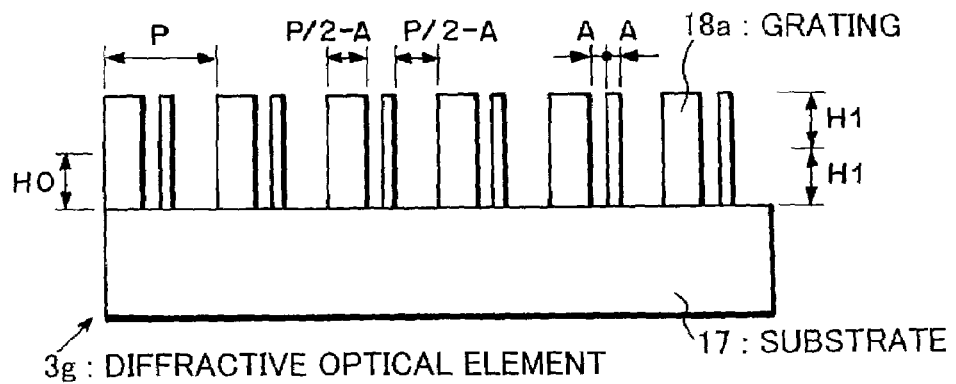
FIGS. 24A and 24B are sectional views showing a diffractive optical element of the optical head apparatus according to the seventh embodiment of the present invention.
Figure 24B:
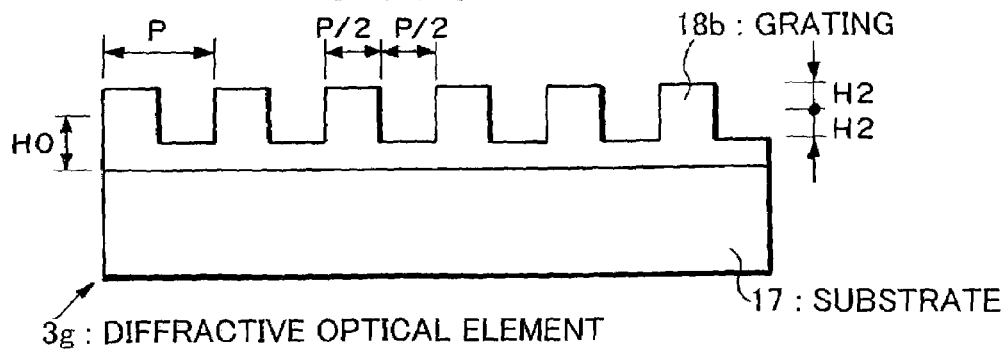

FIGS. 24A and 24B are sectional views showing the diffractive optical element 3g. As shown in FIG. 24A, in the area 11k, a grating 18a is formed on a substrate 17. As shown in FIG. 24B, in the area 11l, a grating 18b is formed on the substrate 17. The pitch of the grating members of each of the grating 18a and the grating 18b is P. The section of the grating 18a is composed of line portions and space portions in which a line portion having a width of (P/2−A), a space portion having a width of A, a line portion having a width of A, and a space portion having a width of (P/2−A) are repeated. The average height of the line portions and the space portions is H0. The difference of height between a line portion and a space portion is 2×H1. In contrast, the section of the grating 18b is composed of line portions and space portions in which a line portion having a width of P/2 and a space portion having a width of P/2 are repeated. The average of the heights of the line portions and the space portions is H0. The difference of height between a line portion and a space portion is 2×H2. When the transmissivity, +1st order diffraction efficiency, and ±2nd order diffraction efficiency of the grating 18a are denoted by $\eta a0$, $\eta a1$, and $\eta a2$ and the transmissivity, +1st order diffraction efficiency, and ±2nd order diffraction efficiency of the grating 18b are denoted by $\eta b0$, $\eta b1$, and $\eta b2$, respectively, the following formulas are satisfied.

$\eta a0 = \cos^2(\phi 1/2)$ $\eta a1 = (2/\pi)^2 \sin^2(\phi 1/2) \sin^2[\pi(1-4A/P)/2]$ $\eta a2 = (1/\pi)^2 \sin^2(\phi 1/2) \{1+\cos[\pi(1-4A/P)]\}^2$ $\eta b0 = \cos^2(\phi 2/2)$ $\eta b1 = (2/\pi)^2 \sin^2(\phi 2/2)$ $\eta b2 = 0$ $\phi 1 = 4\pi(n-1)H1/\lambda$ $\phi 2 = 4\pi(n-1)H2/\lambda$ where $\lambda$ represents the wavelength of the semiconductor laser 1; n represents the refractive index of each of the gratings 18a and 18b.

Assuming that $\phi 1 = 0.295\pi$ [radian], $\phi 2 = 0.194\pi$ [radian], and A= 0.142 P, then $\eta a0 = 0.800$, $\eta a1 = 0.032$, $\eta a2 = 0.030$, $\eta b0 = 0.910$, $\eta b1 = 0.036$, and $\eta b2 = 0$ are obtained. In other words, around 80.0% of light that enters the area 11k transmits as 0-th order light, around 3.2% of the light is diffracted as each of ±1st order diffracted light, and around 3.0% of the light is diffracted as each of ±2nd order diffracted light. In contrast, around 91.0% of light that enters the area 11l transmits as 0-th order light, around 3.6% of the light is diffracted as each of ±1st order diffracted light, and 0% of the light is diffracted as each of ±2nd order diffracted light. When 0-th order light, ±1st order diffracted light, and ±2nd order diffracted light exiting from the diffractive optical element 3g are referred to as main beam, first sub beams, and second sub beams, respectively, each of the main beam and the first sub beams contains both light that transmits or is diffracted by the area 11k and light that transmits or is diffracted by the area 11l in the same rate. Each of the second sub beams contains only light diffracted by the area 11k. As a result, the distribution of the intensity of the main beam is the same as the distribution of the intensity of each of the first sub beams. In contrast, the distribution of the intensity of the main beam is different from the distribution of the intensity of each of the second sub beams. The intensity of the peripheral portion of each of the second sub beams is lower than the intensity of the peripheral portion of the main beam.

According to the seventh embodiment, the positions of the focused spots on the disk 7 are the same as those shown in FIG. 11. In addition, according to the seventh embodiment, the pattern of the light receiving portion of the photo detector 10a and the positions of the light spots on the photo detector 10a are the same as those shown in FIG. 12. According to the seventh embodiment, in the same manner as the first embodiment, a focusing error signal, a tracking error signal, and an RF signal can be obtained.

With the same reason as the conventional optical head apparatus, according to the seventh embodiment, the focusing error signals and the tracking error signals do not have offsets. In the same manner as the optical head apparatus according to the first embodiment and the conventional optical head apparatus, according to the seventh embodiment, a deviation of the thickness of the substrate of the disk 7 and a radial tilt thereof can be detected, respectively.

(Eighth Embodiment)

Figure 25:
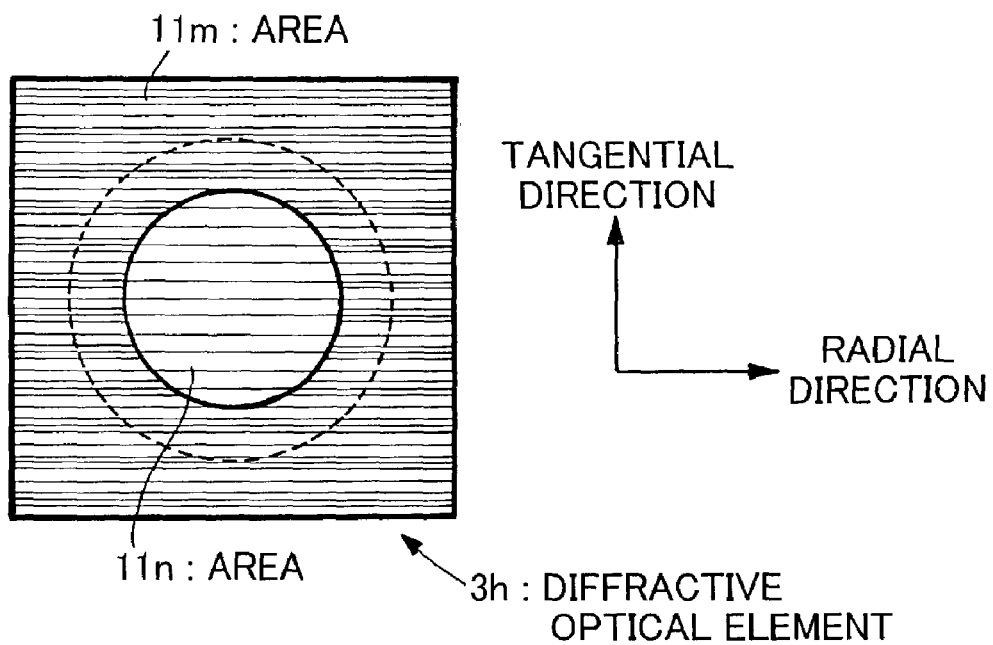
FIG. 25 is a plan view showing a diffractive optical element of an optical head apparatus according to an eighth embodiment of the present invention.

An eighth embodiment of the present invention is an optical head apparatus that is the same as the first embodiment except for the difference that the diffractive optical element 3a is substituted with a diffractive optical element 3h. FIG. 25 is a plan view showing the diffractive optical element 3h. A diffraction grating is formed in an area 11m and an area 11n of the diffractive optical element 3h. The area 11m is an area outside the area 11n. The area 11n is a circular area having a diameter that is smaller than the effective diameter (denoted by a dotted line in FIG. 25) of the objective lens 6. The direction of grating members of the diffraction grating of the area 11m and the direction of grating members of the diffraction grating of the area 11n nearly parallel the radial direction of the disk 7. The grating members are linearly formed and equally spaced. The pitches of the grating members of the diffraction grating of the area 11m are equal to the pitches of the grating members of the diffraction grating of the area 11n.

According to the eighth embodiment, the diffractive optical element 3h has the same section as FIGS. 24A and 24B. The areas 11m and 11n correspond to FIGS. 24A and 24B, respectively. Assuming that $\phi1=0.295\pi$ [radian], $\phi2=0.194\pi$ [radian], and A=0.142 P, then around 80.0% of light that enters the area 11m transmits as 0-th order light, around 3.2% of the light is diffracted as each of ±1st order diffracted light, and around 3.0% of the light is diffracted as each of ±2nd order diffracted light. In contrast, around 91.0% of light that enters the area 11n transmits as 0-th order light, around 3.6% of the light is diffracted as each of ±1st order diffracted light, and 0% of the light is diffracted as each of ±2nd order diffracted light. When 0-th order light, ±1st order diffracted light, and ±2nd order diffracted light exiting from the diffractive optical element 3g are referred to as main beam, first sub beams, and second sub beams, respectively, each of the main beam and the first sub beams contains both light that transmits or is diffracted by the area 11m and light that transmits or is diffracted by the area 11n in the same rate. Each of the second sub beams contains only light diffracted by the area 11m. As a result, the distribution of the intensity of the main beam is the same as the distribution of the intensity of each of the first sub beams. In contrast, the distribution of the intensity of the main beam is different from the distribution of the intensity of each of the second sub beams. The intensity of the peripheral portion of each of the second sub beams is higher than the intensity of the peripheral portion of the main beam.

According to the eighth embodiment, the positions of the focused spots on the disk 7 are the same as those shown in FIG. 15. In addition, according to the eighth embodiment, the pattern of the light receiving portion of the photo detector 10a and the positions of the light spots on the photo detector 10a are the same as those shown in FIG. 16. According to the eighth embodiment, in the same manner as the first embodiment, a focusing error signal, a tracking error signal, and an RF signal can be obtained.

With the same reason as the conventional optical head apparatus, according to the eighth embodiment, the focusing error signals and the tracking error signals do not have offsets. In the same manner as the optical head apparatus according to the first embodiment and the conventional optical head apparatus, according to the eighth embodiment, a deviation of the thickness of the substrate of the disk 7 and a radial tilt thereof can be detected, respectively.

(Ninth Embodiment)

Figure 26:
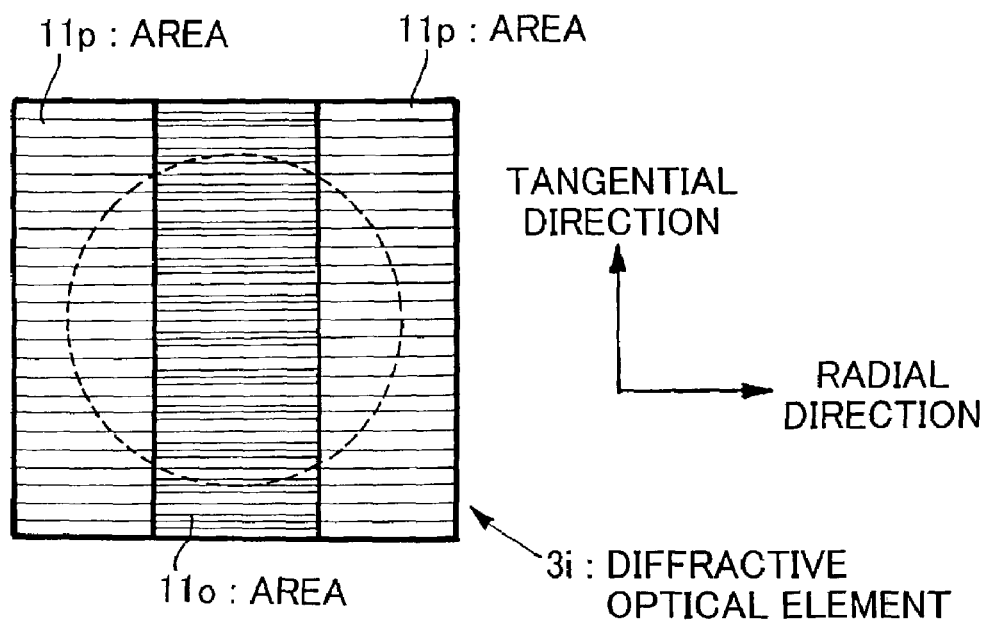
FIG. 26 is a plan view showing a diffractive optical element of an optical head apparatus according to a ninth embodiment of the present invention.

A ninth embodiment of the present invention is an optical head apparatus that is the same as the first embodiment except for the difference that the diffractive optical element 3a is substituted with a diffractive optical element 3i. FIG. 26 is a plan view showing the diffractive optical element 3i. A diffraction grating is formed in an area 11o and an area 11p (composed of two portions) of the diffractive optical element 3i. The area 11p is an area outside the area 11o. The area 11o is a rectangular area having a width that is smaller than the effective diameter (denoted by a dotted line in FIG. 26) of the objective lens 6. The direction of grating members of the diffraction grating of the area 11o and the direction of grating members of the diffraction grating of the area 11p nearly parallel the radial direction of the disk 7. The grating members are linearly formed and equally spaced. The pitches of the grating members of the diffraction grating of the area 11o are equal to the pitches of the grating members of the diffraction grating of the area 11p.

According to the ninth embodiment, the diffractive optical element 3i has the same section as FIGS. 24A and 24B. The areas 11o and 11p correspond to FIGS. 24A and 24B, respectively. Assuming that $\phi1=0.295\pi$ [radian], $\phi2=0.194\pi$ [radian], and A=0.142 P, then around 80.0% of light that enters the area 11o transmits as 0-th order light, around 3.2% of the light is diffracted as each of ±1st order diffracted light, and around 3.0% of the light is diffracted as each of ±2nd order diffracted light. In contrast, around 91.0% of light that enters the area 11p transmits as 0-th order light, around 3.6% of the light is diffracted as each of ±1st order diffracted light, and 0% of the light is diffracted as each of ±2nd order diffracted light. When 0-th order light, ±1st order diffracted light, and ±2nd order diffracted light exiting from the diffractive optical element 3i are referred to as main beam, first sub beams, and second sub beams, respectively, each of the main beam and the first sub beams contains both light that transmits or is diffracted by the area 11o and light that transmits or is diffracted by the area 11p in the same rate. Each of the second sub beams contains only light diffracted by the area 11o. As a result, the distribution of the intensity of the main beam is the same as the distribution of the intensity of each of the first sub beams. In contrast, the distribution of the intensity of the main beam is different from the distribution of the intensity of each of the second sub beams. The intensity of the peripheral portion in the radial direction of each of the second sub beams is lower than the intensity of the peripheral portion in the radial direction of the main beam.

The positions of focused spots on the disk 7 according to the ninth embodiment are nearly the same as those shown in FIG. 11. However, since the intensity of the peripheral portion in the radial direction of each of the second sub beams is lower than the intensity of the peripheral portion in the radial direction of the main beam, the diameter in the radial direction of each of the focused spots as the second sub beams is larger than the diameter in the radial direction of the focused spot of the main beam. In addition, the pattern of the light receiving portion of the photo detector 10a and the positions of the light spots on the photo detector 10a according to the ninth embodiment are nearly the same as those shown in FIG. 12. According to the ninth embodiment of the present invention, in the same manner as the first embodiment, a focusing error signal, a tracking error signal, and an RF signal can be obtained.

With the same reason as the conventional optical head apparatus, according to the ninth embodiment, the focusing error signals and the tracking error signals do not have offsets. In the same manner as the optical head apparatus according to the first embodiment and the conventional optical head apparatus, according to the ninth embodiment, a deviation of the thickness of the substrate of the disk 7 and a radial tilt thereof can be detected, respectively.

(Tenth Embodiment)

Figure 27:
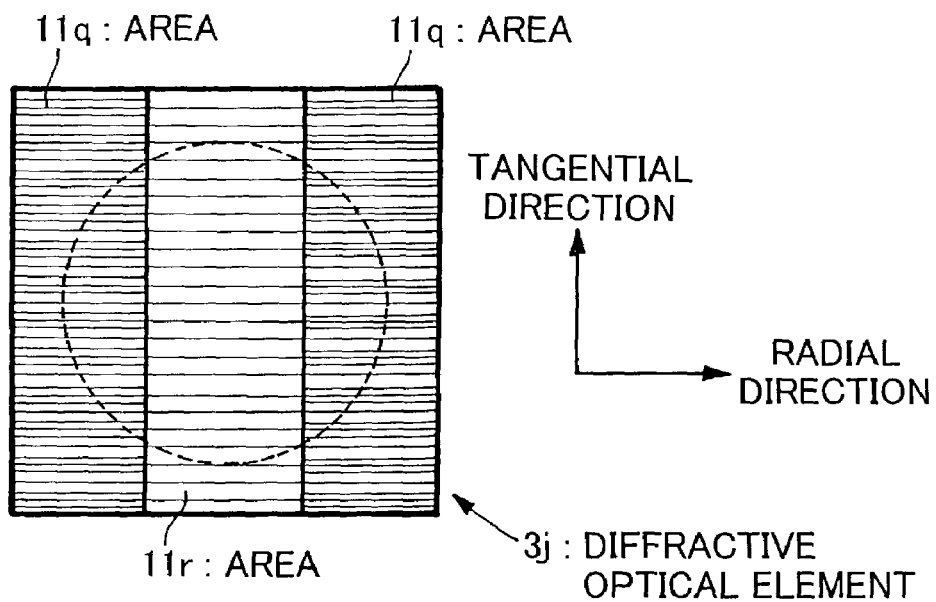
FIG. 27 is a plan view showing a diffractive optical element of an optical head apparatus according to a tenth embodiment of the present invention.

A tenth embodiment of the present invention is an optical head apparatus that is the same as the first embodiment except for the difference that the diffractive optical element 3a is substituted with a diffractive optical element 3j. FIG. 27 is a plan view showing the diffractive optical element 3j. A diffraction grating is formed in an area 11q (composed of two portions) and an area 11r of the diffractive optical element 3j. The area 11q is an area outside the area 11r. The area 11r is a rectangular area having a width that is smaller than the effective diameter (denoted by a dotted line in FIG. 27) of the objective lens 6. The direction of grating members of the diffraction grating of the area 11q and the direction of grating members of the diffraction grating of the area 11r nearly parallel the radial direction of the disk 7. The grating members are linearly formed and equally spaced. The pitches of the grating members of the diffraction grating of the area 11q are equal to the pitches of the grating members of the diffraction grating of the area 11r.

According to the tenth embodiment, the diffractive optical element 3j has the same section as FIGS. 24A and 24B. The areas 11q and 11r correspond to FIGS. 24A and 24B, respectively. Assuming that $\phi1=0.295\pi$ [radian], $\phi2=0.194\pi$ [radian], and A=0.142 P, then around 80.0% of light that enters the area 11q transmits as 0-th order light, around 3.2% of the light is diffracted as each of ±1st order diffracted light, and around 3.0% of the light is diffracted as each of ±2nd order diffracted light. In contrast, around 91.0% of light that enters the area 11r transmits as 0-th order light, around 3.6% of the light is diffracted as each of ±1st order diffracted light, and 0% of the light is diffracted as each of ±2nd order diffracted light. When 0-th order light, ±1st order diffracted light, and ±2nd order diffracted light exiting from the diffractive optical element 3j are referred to as main beam, first sub beams, and second sub beams, respectively, each of the main beam and the first sub beams contains both light that transmits or is diffracted by the area 11q and light that transmits or is diffracted by the area 11r in the same rate. Each of the second sub beams contains only light diffracted by the area 11q. As a result, the distribution of the intensity of the main beam is the same as the distribution of the intensity of each of the first sub beams. In contrast, the distribution of the intensity of the main beam is different from the distribution of the intensity of each of the second sub beams. The intensity of the peripheral portion in the radial direction of each of the second sub beams is higher than the intensity of the peripheral portion in the radial direction of the main beam.

The positions of focused spots on the disk 7 according to the tenth embodiment are nearly the same as those shown in FIG. 15. However, since the intensity of the peripheral portion in the radial direction of each of the second sub beams is higher than the intensity of the peripheral portion in the radial direction of the main beam, the diameter in the radial direction of each of the focused spots as the second sub beams is smaller than the diameter in the radial direction of the focused spot of the main beam. Thus, the side lobe of the former is larger than the side lobe of the latter. In addition, the pattern of the light receiving portion of the photo detector 10a and the positions of the light spots on the photo detector 10a according to the tenth embodiment are nearly the same as those shown in FIG. 16.

According to the tenth embodiment of the present invention, in the same manner as the first embodiment, a focusing error signal, a tracking error signal, and an RF signal can be obtained.

With the same reason as the conventional optical head apparatus, according to the tenth embodiment, the focusing error signals and the tracking error signals do not have offsets. In the same manner as the optical head apparatus according to the first embodiment and the conventional optical head apparatus, according to the tenth embodiment, a deviation of the thickness of the substrate of the disk 7 and a radial tilt thereof can be detected, respectively.

(Eleventh Embodiment)

Figure 28:
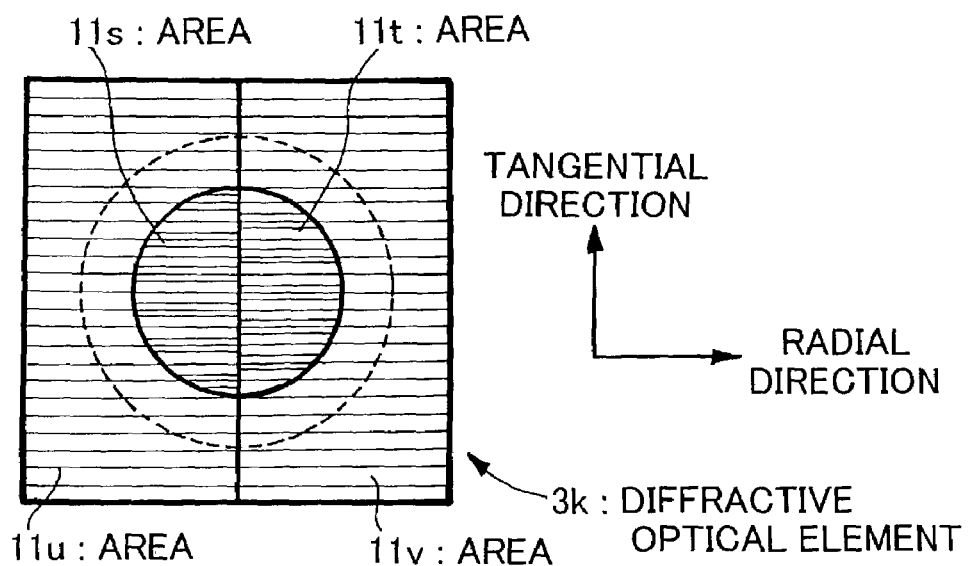
FIG. 28 is a plan view showing a diffractive optical element of an optical head apparatus according to an eleventh embodiment of the present invention.

An eleventh embodiment of the present invention is an optical head apparatus that is the same as the first embodiment except for the difference that the diffractive optical element 3a is substituted with a diffractive optical element 3k. FIG. 28 is a plan view showing the diffractive optical element 3k. A diffraction grating is formed in a first area and a second area of the diffractive optical element 3k. The first area is a circular area having a diameter that is smaller than the effective diameter (denoted by a dotted line in FIG. 28) of the objective lens 6. The first area is divided into an area 11s and an area 11t by a straight line that passes through the optical axis of the incident light and that parallels the tangential direction of the disk 7. The second area is outside the first area of the diffractive optical element 3k. The second area is divided into an area 11u and an area 11v by a straight line that passes through the optical axis of the incident light and that parallels the tangential direction of the disk 7. The direction of grating members of the diffraction grating of each area of the diffractive optical element 3k nearly parallels the radial direction of the disk 7. The grating members are linearly formed and equally spaced. The pitches of the grating members of the diffraction grating of each of the areas 11s and 11t are equal to the pitches of the grating members of the diffraction grating of each of the areas 11u and 11v. The phase of the grating of each of the areas 11s and 11u is different from the phase of the grating of each of the areas 11t and 11v by π [radian].

According to the eleventh embodiment, the diffractive optical element 3k has the same section as FIGS. 24A and 24B. The areas 11s and 11t correspond to FIG. 24A, whereas the areas 11u and 11v correspond to FIG. 24B. Assuming that $\phi1=0.295\pi$ [radian], $\phi2=0.194\pi$ [radian], and A= 0.142 P, then around 80.0% of light that enters each of the areas 11s and 11t transmits as 0-th order light, around 3.2% of the light is diffracted as each of ±1st order diffracted light, and around 3.0% of the light is diffracted as each of ±2nd order diffracted light. In contrast, around 91.0% of light that enters each of the areas 11u and 11v transmits as 0-th order light, around 3.6% of the light is diffracted as each of ±1st order diffracted light, and 0% of the light is diffracted as each of ±2nd order diffracted light. When 0-th order light, ±1st order diffracted light, and ±2nd order diffracted light exiting from the diffractive optical element 3k are referred to as main beam, first sub beams, and second sub beams, respectively, each of the main beam and the first sub beams contains both light that transmits or is diffracted by each of the areas 11s and 11t and light that transmits or is diffracted by each of the areas 11u and 11v in the same rate. Each of the second sub beams contains only light diffracted by each of the areas 11s and 11t. As a result, the distribution of the intensity of the main beam is the same as the distribution of the intensity of each of the first sub beams. In contrast, the distribution of the intensity of the main beam is different from the distribution of the intensity of each of the second sub beams. The intensity of the peripheral portion of each of the second sub beams is lower than the intensity of the peripheral portion of the main beam. The phase of +1st order diffracted light diffracted by each of the areas 11s and 11u is different from the phase of +1st order diffracted light diffracted by each of the areas 11t and 11v by π [radian]. Likewise, the phase of −1st order diffracted light diffracted by each of the areas 11s and 11u is different from the phase of −1st order diffracted light diffracted by each of the areas 11t and 11v by π [radian]. Since the phase of +2nd order diffracted light diffracted by each of the areas 11s and 11u is different from the phase of +2nd order diffracted light diffracted by each of the areas 11t and 11v by 2π [radian], substantially, their phases are the same. Likewise, since the phase of −2nd order diffracted light diffracted by each of the areas 11s and 11u is different from the phase of −2nd order diffracted light diffracted by each of the areas 11t and 11v by 2π [radian], substantially, their phases are the same.

According to the eleventh embodiment, the positions of the focused spots on the disk 7 are the same as those shown in FIG. 20. In addition, according to the eleventh embodiment, the pattern of the light receiving portion of the photo detector 10a and the positions of the light spots on the photo detector 10a are nearly the same as those shown in FIG. 12. According to the eleventh embodiment, in the same manner as the first embodiment, a focusing error signal, a tracking error signal, and an RF signal can be obtained.

The phase of the grating of each of the areas 11s and 11u of the diffractive optical element 3k is different from the phase of the grating of each of the areas 11t and 11v thereof by π [radian]. Thus, the phase of each of the first sub beams in the left side of a straight line that passes through the optical axis and that parallels the tangential direction of the disk 7 is different from that in the right side thereof by it [radian]. With respect to an error signal, that structure is equivalent to the case that focused spots of each of the first sub beams are placed on the disk 7 so that they shift in the radial direction of the disk 7 by ½ pitch of the groove of the disk 7 as described in for example Japanese Patent Laid-Open Publication No. 9-81942. Thus, with the same reason as the conventional optical head apparatus, according to the eleventh embodiment, the focusing error signals and the tracking error signals do not have offsets. In addition, in the same manner as the optical head apparatus according to the first embodiment and the conventional optical head apparatus, a deviation of the thickness of the substrate of the disk 7 and a radial tilt thereof can be detected, respectively. In addition, according to the eleventh embodiment of the present invention, the five focused spots are placed on the same track of the disk 7. Thus, the positions of the five focused spots do not vary on a disk having any track pitch. When the optical head apparatus according to the eleventh embodiment is used for a disk having any track pitch, the focusing error signals and tracking error signals do not have offsets. In addition, a deviation of the thickness of the substrate of the disk and a radial tilt thereof can be detected.

Figure 29:
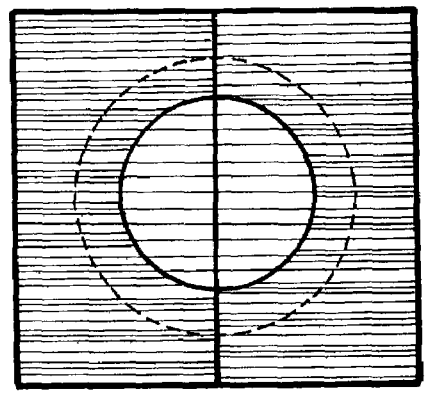
FIG. 29 is a plan view showing a diffractive optical element of an optical head apparatus according to a combination of the eighth embodiment and the eleventh embodiment of the present invention.
Figure 30:
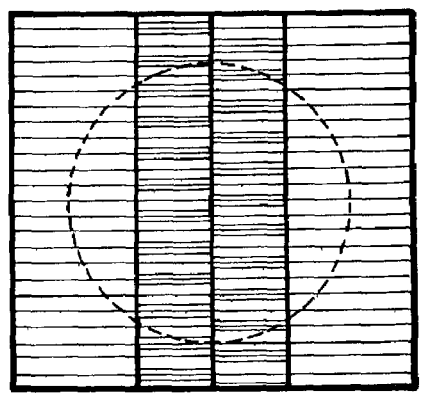
FIG. 30 is a plan view showing a diffractive optical element of an optical head apparatus according to a combination of the ninth embodiment and the eleventh embodiment of the present invention.
Figure 31:
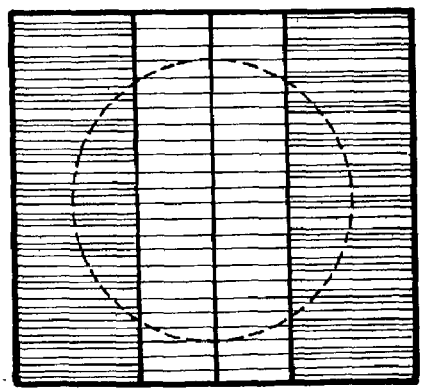
FIG. 31 is a plan view showing a diffractive optical element of an optical head apparatus according to a combination of the tenth embodiment and the eleventh embodiment of the present invention.

As further embodiments of the present invention, each of the diffractive optical element 3h of the eighth embodiment, the diffractive optical element 3i of the ninth embodiment, and the diffractive optical element 3j of the tenth embodiment may be modified in the same way as the diffractive optical element 3g of the seventh embodiment is modified to the diffractive optical element 3k of the eleventh embodiment. These further embodiments are the combination of the eighth embodiment and the eleventh embodiment, the combination of the ninth embodiment and the eleventh embodiment, and the combination of the tenth embodiment and the eleventh embodiment. In the combination of the eighth embodiment and the eleventh embodiment, the diffractive optical element has the pattern shown in FIG. 29. In the combination of the ninth embodiment and the eleventh embodiment, the diffractive optical element has the pattern shown in FIG. 30. In the combination of the tenth embodiment and the eleventh embodiment, the diffractive optical element has the pattern shown in FIG. 31. According to these further embodiments, with the same reason as the eleventh embodiment, when a disk having any track pitch is used, the focusing error signals and tracking error signals do not have offsets. In addition, a deviation of the thickness of the substrate of the disk and a radial tilt thereof can be detected.

(Twelfth Embodiment)

Figure 32:
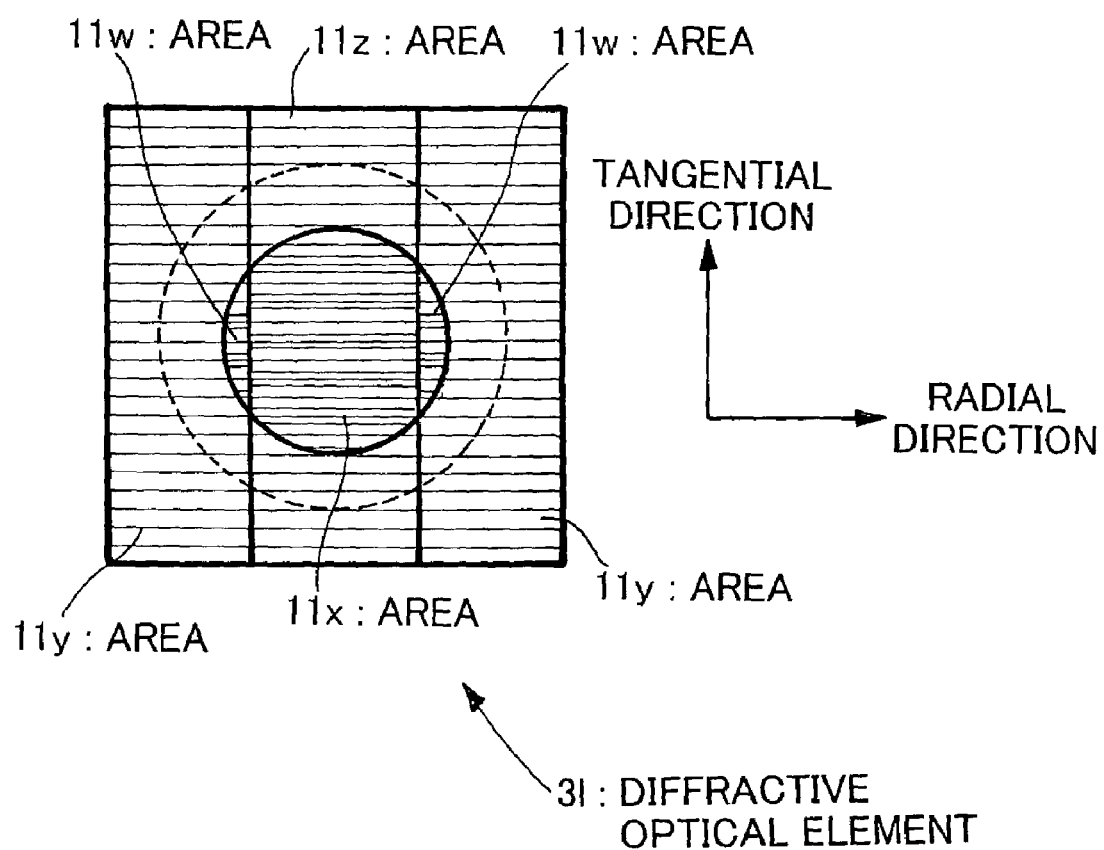
FIG. 32 is a plan view showing a diffractive optical element of an optical head apparatus according to a twelfth embodiment of the present invention.

A twelfth embodiment of the present invention is an optical head apparatus that is the same as the first embodiment except for the difference that the diffractive optical element 3a is substituted with a diffractive optical element 31. FIG. 32 is a plan view showing the diffractive optical element 31. A diffraction grating is formed in a first area and a second area of the diffractive optical element 31. The first area is a circular area having a diameter that is smaller than the effective diameter (denoted by a dotted line in FIG. 32) of the objective lens 6. The first area is divided into an area 11w (composed of two portions) and an area 11x by two straight lines that are symmetrical with respect to the optical axis of the incident light and that parallel the tangential direction of the disk 7. The second area is outside the first area of the diffractive optical element 31. The second area is divided into an area 11y and an area 11z by the two straight lines that are symmetrical with respect to the optical axis of the incident light and that parallel the tangential direction of the disk 7. The direction of grating members of the diffraction grating of each area of the diffractive optical element 31 parallels the radial direction of the disk 7. The grating members are linearly formed and equally spaced. The pitches of the grating members of the diffraction grating of each of the areas 11w and 11x are equal to the pitches of the grating members of the diffraction grating of each of the areas 11y and 11z. The phase of the grating of each of the areas 11w and 11y is different from the phase of the grating of each of the areas 11x and 11z by π [radian].

According to the twelfth embodiment, the diffractive optical element 31 has the same section as FIGS. 24A and 24B. The areas 11w and 11x correspond to FIG. 24A, whereas the areas 11y and 11z correspond to FIG. 24B. Assuming that φ1=0.295π [radian], φ2=0.194π [radian], and A= 0.142 P, then around 80.0% of light that enters each of the areas 11w and 11x transmits as 0-th order light, around 3.2% of the light is diffracted as each of ±1st order diffracted light, and around 3.0% of the light is diffracted as each of ±2nd order diffracted light. In contrast, around 91.0% of light that enters each of the areas 11y and 11z transmits as 0-th order light, around 3.6% of the light is diffracted as each of ±1st order diffracted light, and 0% of the light is diffracted as each of ±2nd order diffracted light. When 0-th order light, ±1st order diffracted light, and ±2nd order diffracted light exiting from the diffractive optical element 31 are referred to as main beam, first sub beams, and second sub beams, respectively, each of the main beam and the first sub beams contains both light that transmits or is diffracted by each of the areas 11w and 11x and light that transmits or is diffracted by each of the areas 11y and 11z in the same rate. Each of the second sub beams contains only light diffracted by each of the areas 11w and 11x. As a result, the distribution of the intensity of the main beam is the same as the distribution of the intensity of each of the first sub beams. In contrast, the distribution of the intensity of the main beam is different from the distribution of the intensity of each of the second sub beams. The intensity of the peripheral portion of each of the second sub beams is lower than the intensity of the peripheral portion of the main beam. The phase of +1st order diffracted light diffracted by each of the areas 11w and 11y is different from the phase of +1st order diffracted light diffracted by each of the areas 11x and 11z by $\pi$ [radian]. Likewise, the phase of −1st order diffracted light diffracted by each of the areas 11w and 11y is different from the phase of −1st order diffracted light diffracted by each of the areas 11x and 11z by $\pi$ [radian]. Since the phase of +2nd order diffracted light diffracted by each of the areas 11w and 11y is different from the phase of +2nd order diffracted light diffracted by each of the areas 11x and 11z by $2\pi$ [radian], substantially, their phases are the same. Likewise, since the phase of −2nd order diffracted light diffracted by each of the areas 11w and 11y is different from the phase of −2nd order diffracted light diffracted by each of the areas 11x and 11z by $2\pi$ [radian], substantially, their phases are the same.

According to the twelfth embodiment, the positions of the focused spots on the disk 7 are the same as those shown in FIG. 22. In addition, according to the twelfth embodiment, the pattern of the light receiving portion of the photo detector 10a and the positions of the light spots on the photo detector 10a are nearly the same as those shown in FIG. 12. According to the twelfth embodiment, in the same manner as the first embodiment, a focusing error signal, a tracking error signal, and an RF signal can be obtained.

The phase of the grating of each of the areas 11w and 11y of the diffractive optical element 31 is different from the phase of the grating of each of the areas 11x and 11z thereof by $\pi$ [radian]. Thus, the phase of each of the first sub beams in the outside of the two straight lines that are symmetrical with respect to the optical axis and that parallel the tangential direction of the disk 7 is different from that in the inside thereof by $\pi$ [radian]. With respect to an error signal, that structure is equivalent to the case that focused spots of each of the first sub beams are placed on the disk 7 so that they shift in the radial direction of the disk 7 by ½ pitch of the groove of the disk 7 as described in for example Japanese Patent Laid-Open Publication No. 11-296875. Thus, with the same reason as the conventional optical head apparatus, according to the twelfth embodiment, the focusing error signals and the tracking error signals do not have offsets. In addition, in the same manner as the optical head apparatus according to the first embodiment and the conventional optical head apparatus, a deviation of the thickness of the substrate of the disk 7 and a radial tilt thereof can be detected, respectively. In addition, according to the twelfth embodiment of the present invention, the five focused spots are placed on the same track of the disk 7. Thus, the positions of the five focused spots do not vary on a disk having any track pitch. Regardless of the track pitch of a disk which is subjected to the optical head apparatus according to the twelfth embodiment, the focusing error signals and tracking error signals do not have offsets, and a deviation of the thickness of the substrate of the disk and a radial tilt thereof can be detected.

Figure 33:
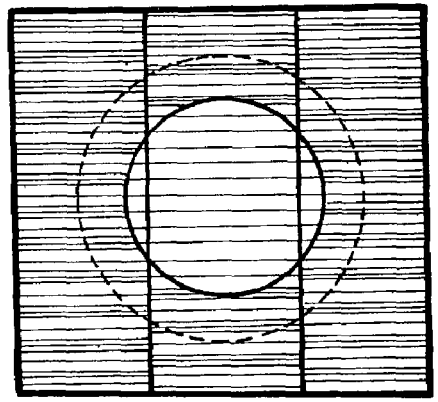
FIG. 33 is a plan view showing a diffractive optical element of an optical head apparatus according to a combination of the eighth embodiment and the twelfth embodiment of the present invention.
Figure 34:
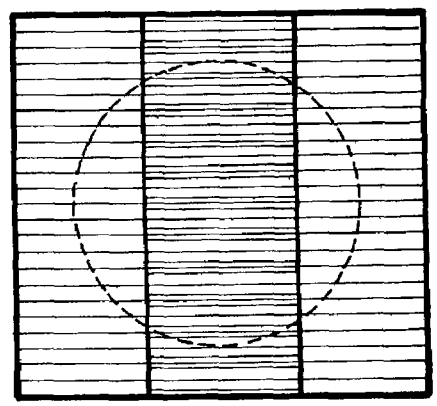
FIG. 34 is a plan view showing a first example of a diffractive optical element of an optical head apparatus according to a combination of the ninth embodiment and the twelfth embodiment of the present invention.
Figure 35:
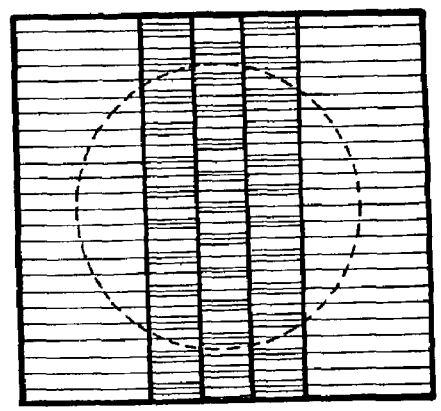
FIG. 35 is a plan view showing a second example of a diffractive optical element of an optical head apparatus according to the combination of the ninth embodiment and the twelfth embodiment of the present invention.
Figure 36:
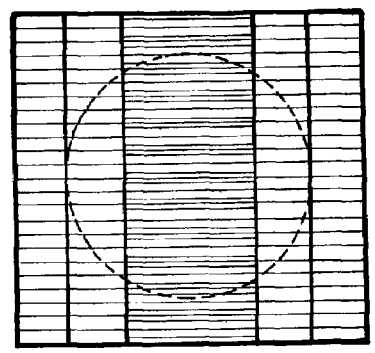
FIG. 36 is a plan view showing a third example of a diffractive optical element of an optical head apparatus according to the combination of the ninth embodiment and the twelfth embodiment of the present invention.
Figure 37:
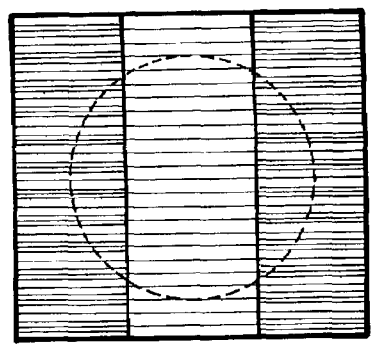
FIG. 37 is a plan view showing a first example of a diffractive optical element of an optical head apparatus according to a combination of the tenth embodiment and the twelfth embodiment of the present invention.
Figure 38:
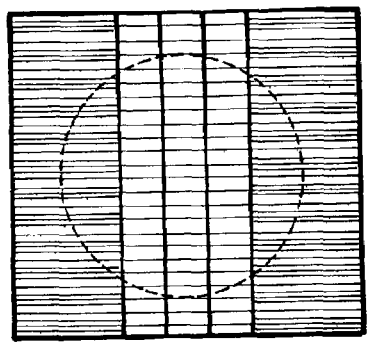
FIG. 38 is a plan view showing a second example of a diffractive optical element of an optical head apparatus according to the combination of the tenth embodiment and the twelfth embodiment of the present invention.
Figure 39:
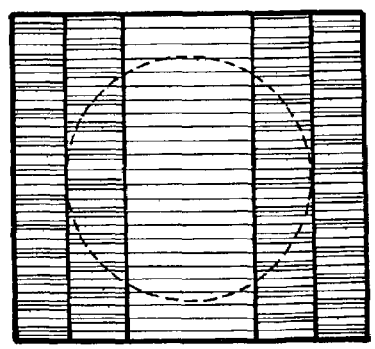
FIG. 39 is a plan view showing a third example of a diffractive optical element of an optical head apparatus according to the combination of the tenth embodiment and the twelfth embodiment of the present invention.

As further embodiments of the present invention, each of the diffractive optical element 3h of the eighth embodiment, the diffractive optical element 3i of the ninth embodiment, and the diffractive optical element 3j of the tenth embodiment may be modified in the same way as the diffractive optical element 3g of the seventh embodiment is modified to the diffractive optical element 3k of the twelfth embodiment. These further embodiments are the combination of the eighth embodiment and the twelfth embodiment, the combination of the ninth embodiment and the twelfth embodiment, and the combination of the tenth embodiment and the twelfth embodiment. In the combination of the eighth embodiment and the twelfth embodiment, the diffractive optical element has the pattern shown in FIG. 33. In the combination of the ninth embodiment and the twelfth embodiment, the diffractive optical element has the pattern shown in FIG. 34, 35 or 36. In the pattern shown in FIG. 34, the phase of the area in the rectangle is different from the phase of the area outside the rectangle by $\pi$ [radian]. In the pattern shown in FIG. 35, the area in the rectangle is divided into inner area and outer area, and the phase of the inner area is different from the phase of the outer area and the area outside the rectangle by $\pi$ [radian]. In the pattern shown in FIG. 36, the area outside the rectangle is divided into inner area and outer area, and the phase of the area in the rectangle and the inner area is different from the phase of the outer area by $\pi$ [radian]. In the combination of the tenth embodiment and the twelfth embodiment, the diffractive optical element has the patterns shown in FIG. 37, 38, or 39. In the pattern shown in FIG. 37, the phase of the area in the rectangle is different from the phase of the area outside the rectangle by $\pi$ [radian]. In the pattern shown in FIG. 38, the area in the rectangle is divided into inner area and outer area, and the phase of the inner area is different from the phase of the outer area and the area outside the rectangle by n [radian]. In the pattern shown in FIG. 39, the area outside the rectangle is divided into inner area and outer area, and the phase of the area in the rectangle and the inner area is different from the phase of the outer area by $\pi$ [radian]. According to these further embodiments, with the same reason as the twelfth embodiment, when a disk having any track pitch is used, the focusing error signals and tracking error signals do not have offsets. In addition, a deviation of the thickness of the substrate of the disk and a radial tilt thereof can be detected.

According to the first embodiment to the twelfth embodiment and the combinations thereof, the focusing error signal of each of the second sub beams when performing a focusing servo using the focusing error signal of the main beam is used as the substrate thickness deviation signal. Alternatively, the focusing error signal of each of the second sub beams when performing a focusing servo using the final focusing error signal that is the sum of the focusing error signal of the main beam and the focusing error signal of each of the first sub beams may be used as the substrate thickness deviation signal. According to these embodiments, a deviation of the thickness of the substrate can be detected without offsets of the focusing error signals due to groove traverse noise. However, the focusing error signal of each of the second sub beams as the substrate thickness deviation signal has an offset. When the difference between the focusing error signal of the main beam and the focusing error signal of each of the first sub beams is referred to as focus offset signal, components that represent focus errors of the focusing offset signal are cancelled. Thus, only components of offsets due to the groove traverse noise reside. Consequently, when a signal which is obtained by subtracting the focus offset signal from the focusing error signal of each of the second sub beams is used as the substrate thickness deviation signal, a deviation of the thickness of the substrate can be detected without an offset of the substrate thickness deviation signal due to the groove traverse noise. On the other hand, when the focusing error signal for a focusing servo has a residual error due to an axial-runout or the like of the disk 7, the focusing error signal of each of the second sub beams as the substrate thickness deviation signal has an offset due to the residual error. However, when a signal which is obtained by subtracting the focusing error signal for a focusing servo from the focusing error signal of each of the second sub beams is used as the substrate thickness deviation signal, a deviation of the thickness of the substrate can be detected without an offset of the substrate thickness deviation signal due to the residual error. When a signal which is obtained by subtracting both the focus offset signal and the focusing error signal for a focusing servo from the focusing error signal of each of the second sub beams is used as the substrate thickness deviation signal, a deviation of the thickness of the substrate can be detected without an offset of the substrate thickness deviation signal due to the groove traverse noise and an offset of the substrate thickness deviation signal due to the residual error.

According to the first embodiment to the twelfth embodiment and the combinations thereof, the tracking error signal of each of the second sub beams when performing a tracking servo using the tracking error signal of the main beam is used as the radial tilt signal. Alternatively, the tracking error signal of each of the second sub beams when performing a tracking servo using the final tracking error signal that is the difference between the tracking error signal of the main beam and the tracking error signal of each of the first sub beams, may be used as the radial tilt signal. According to these embodiments, a radial tilt can be detected without offsets of the tracking error signals due to lens shift. However, the tracking error signal of each of the second sub beams as the radial tilt signal has an offset due to lens shift. When the sum of the tracking error signal of the main beam and the tracking error signal of each of the first sub beams is referred to as track offset signal, components that represent track errors of the track offset signal are cancelled. Thus, only components of offsets due to the lens shift reside. Consequently, when a signal, which is obtained by subtracting the track offset signal from the tracking error signal of each of the second sub beams, is used as the radial tilt signal, a radial tilt can be detected without an offset of the radial tilt signal due to the lens shift. On the other hand, when the tracking error signal for a tracking servo has a residual error due to eccentricity of the disk 7, the tracking error signal of each of the second sub beams as the radial tilt signal has an offset due to the residual error. However, when a signal, which is obtained by subtracting the tracking error signal for a tracking servo from the tracking error signal of each of the second sub beams, is used as the radial tilt signal, a radial tilt can be detected without an offset of the radial tilt signal due to the residual error. When a signal, which is obtained by subtracting both the track offset signal and the tracking error signal for a tracking servo from the tracking error signal of each of the second sub beams, is used as the radial tilt signal, a radial tilt can be detected without an offset of the radial tilt signal due to the lens shift and an offset of the radial tilt signal due to the residual error.

(Thirteenth Embodiment)

Figure 40:
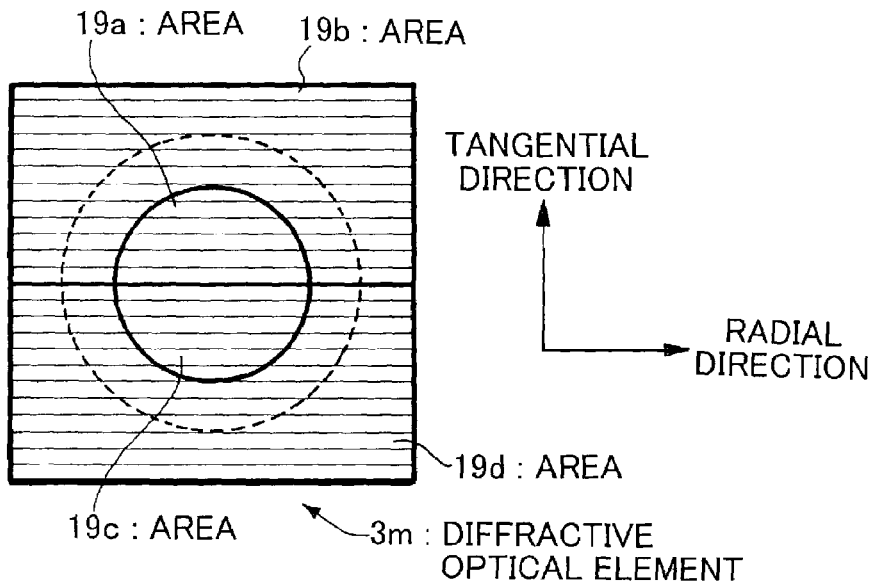
FIG. 40 is a plan view showing a diffractive optical element of an optical head apparatus according to a thirteenth embodiment of the present invention.

A thirteenth embodiment of the present invention is an optical head apparatus that is the same as the first embodiment except that the diffractive optical element 3a is substituted with a diffractive optical element 3m. FIG. 40 is a plan view showing the diffractive optical element 3m. As shown in FIG. 40, the diffractive optical element 3m has a circular area and a non-circular area. The non-circular area is an area outside the circular area. A diffraction grating is formed in the circular area having a diameter smaller than the effective diameter of the objective lens 6 denoted by a dotted line of FIG. 40. The diffraction grating is divided into two areas 19a and 19c by a straight line that passes through the optical axis of the incident light and that parallels the radial direction of the disk 7. In addition, a diffraction grating is formed in the non-circular area. The diffraction grating is divided into two areas 19b and 19d by a straight line that passes through the optical axis of the incident light and that parallels the radial direction of the disk 7. The direction of the grating members of the diffraction grating nearly parallels the radial direction of the disk 7. The grating members are equally spaced and linearly formed. The pitches of the grating members of the diffraction grating of each of the areas 19a, 19b, 19c, and 19d are the same.

Figure 41A:
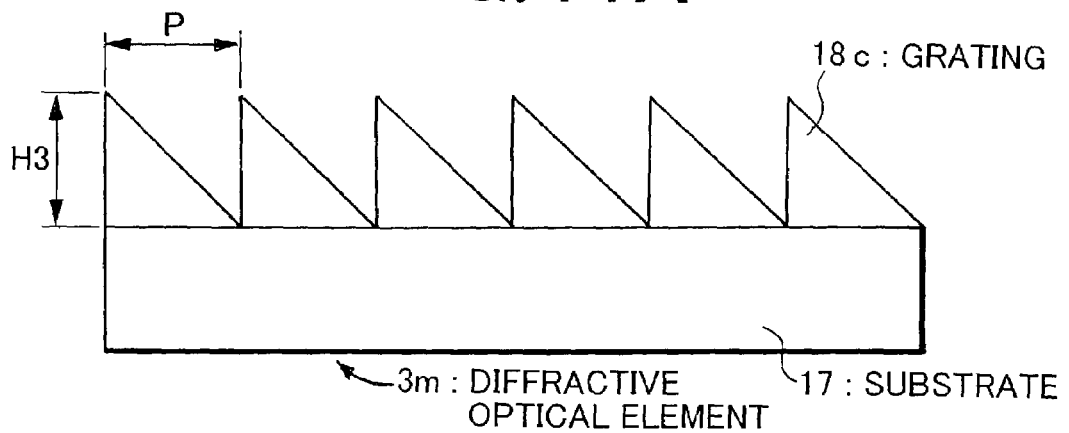
FIGS. 41A and 41B are sectional views showing the diffractive optical element of the optical head apparatus according to the thirteenth embodiment of the present invention.
Figure 41B:
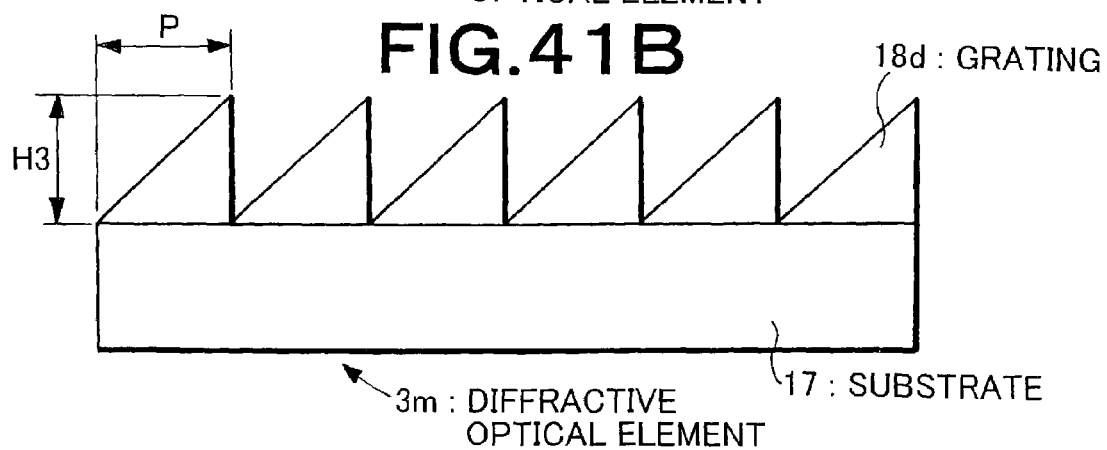

FIGS. 41A and 41B are sectional views showing the diffractive optical element 3m. In the areas 19a and 19d, as shown in FIG. 41A, saw tooth shaped grating members 18c are formed on the substrate 17. In the areas 19b and 19c, as shown in FIG. 41B, saw tooth shaped grating members 18d are formed on the substrate 17. In the areas 19a and 19d, the saw tooth shaped grating members are oriented so that +1st order diffracted light is deflected in the upper direction of FIG. 40. In the areas 19b and 19c, the saw tooth shaped grating members are oriented so that −1st order diffracted light is deflected in the lower direction of FIG. 40. The pitches of the grating members 18c and the pitches of the grating members 18d are the same and denoted by P. The height of the grating members 18c and the grating members 18d is denoted by H3. When the wavelength of the semiconductor laser 1 is denoted by $\lambda$, the refractive index of each of the grating members 18c and 18d is denoted by n, and the relation of $H3=\lambda/2(n-1)$ is satisfied, the transmissivity, +1st order diffraction efficiency, and −1st order diffraction efficiency of the grating members 18c become around 40.5%, around 40.5%, and around 4.5%, respectively. In other words, around 40.5% of light that enters the areas 19a and 19d transmits as 0-th order light, around 40.5% of the light is diffracted as +1st order diffracted light, and around 4.5% of the light is diffracted as −1st order diffracted light. In contrast, around 40.5% of light that enters the areas 19b and 19c transmits as 0-th order light, around 40.5% of the light is diffracted as −1st order diffracted light, and around 4.5% of the light is diffracted as +1st order diffracted light. When 0-th order light, +1st order diffracted light, and −1st order diffracted light that exits from the diffractive optical element 3m are referred to as main beam, sub beam 1, and sub beam 2, respectively, the main beam contains light that transmits by the areas 19a, 19b, 19c, and 19d in the same rate. The sub beam 1 contains only light diffracted by the areas 19a and 19d. The sub beam 2 contains only light diffracted by the areas 19b and 19c. As a result, the distribution of the intensity of the main beam that enters the objective lens 6 is different from the distribution of the intensity of each of the sub beam 1 and the sub beam 2 that enter the objective lens 6. The intensity of the peripheral portion of the upper half of the sub beam 1 is lower than the intensity of the peripheral portion of the upper half of the main beam. In contrast, the intensity of the peripheral portion of the lower half of the sub beam 1 is higher than the intensity of the peripheral portion of the lower half of the main beam. On the other hand, the intensity of the peripheral portion of the upper half of the sub beam 2 is higher than the intensity of the peripheral portion of the upper half of the main beam. In contrast, the intensity of the peripheral portion of the lower half of the sub beam 2 is lower than the intensity of the peripheral portion of the lower half of the main beam. The sum of the distribution of the intensity of the sub beam 1 and the distribution of the intensity of the sub beam 2 is the same as the distribution of the intensity of the main beam.

Figure 42:
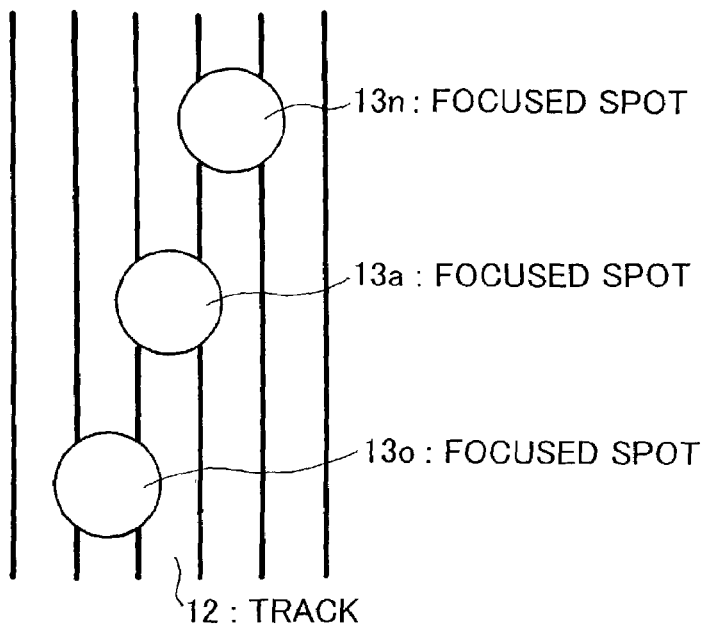
FIG. 42 is a schematic diagram showing the positions of focused spots on a disk by the optical head apparatus according to the thirteenth embodiment of the present invention.

FIG. 42 shows the positions of focused spots on the disk 7. Focused spots 13a, 13n, and 13o correspond to light that exits from the diffractive optical element 3m as +0-th order light, −1st order diffracted light, and 1st order diffracted light, respectively. The focused spot 13a is placed on a track 12 (land portion or groove portion). The focused spot 13n is placed on a track (groove portion or land portion) at the immediately right position of the track 12. The focused spot 13o is placed on a track (groove portion or land portion) at the immediately left position of the track 12.

Figure 43:
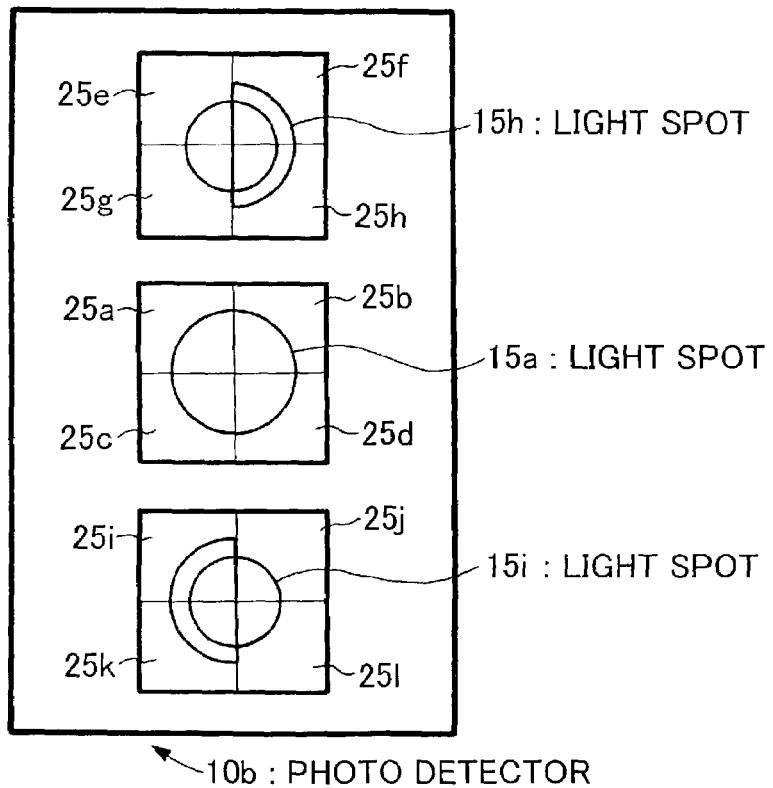
FIG. 43 is a schematic diagram showing the pattern of a light receiving portion of a photo detector and the positions of focused spots on the photo detector according to the thirteenth embodiment of the present invention.

FIG. 43 shows the pattern of the light receiving portion of the photo detector 10b and the positions of light spots on the photo detector 10b. A light spot 15a corresponds to 0-th order light that exits the diffractive optical element 3m. The light spot 15a is received by light receiving portions 25a to 25d divided by a division line that passes through the optical axis and that parallels the tangential direction of the disk 7 and a division line that parallels the radial direction thereof. A light spot 15h corresponds to light that exits the diffractive optical element 3m as +1st order diffracted light. The light spot 15h is received by light receiving portions 25e to 25h divided by a division line that passes through the optical axis and that parallels the tangential direction of the disk 7 and a division line that parallels the radial direction thereof. A light spot 15i corresponds to light that exits the diffractive optical element 3m as −1st order diffracted light. The light spot 15i is received by light receiving portions 25i to 25l divided by a division line that passes through the optical axis and that parallels the tangential direction of the disk 7 and a division line that parallels the radial direction thereof. The focused spots 13a, 13n, and 13o on the disk 7 are trained nearly in the tangential direction. However, due to the operations of the cylindrical lens 8 and the lens 9, the light spots 15a, 15h, and 15i on the photo detector 10b are trained nearly in the radial direction.

When outputs of the light receiving portions 25a to 25l are denoted by V25a to V25l, respectively, focusing error signals of the focused spot 13a as the main beam and the focused spots 13n and 13o as the sub beams are obtained by astigmatism method as (V25a+V25d)−(V25b+V25c) and (V25e+V25h+V25i+V25l)−(V25f+V25g+V25j+V25k), respectively. The final focusing error signal is obtained by differential astigmatism method as (V25a+V25d)−(V25b+V25c)+K {(V25e+V25h+V25i+V25l)−(V25f+V25g+V25j+V25k)} (where K is constant). On the other hand, tracking error signals of the focused spot 13a as the main beam and the focused spots 13n and 13o as the sub beams are obtained by push-pull method as (V25a+V25b)−(V25c+V25d) and (V25e+V25f+V25i+V25j)−(V25g+V25h+V25k+V25l), respectively. The final tracking error signal is obtained by differential push-pull method as (V25a+V25b)−(V25c+V25d)−K {(V25e+V25f+V25i+V25j)−(V25g+V25h+V25k+V25l)}. In addition, the RF signal of the focused spot 13a as the main beam is obtained as V25a+V25b+V25c+V25d.

The focusing error signal of the focused spot 13a as the main beam is the same as each of the focusing error signal 26a shown in FIG. 4A and the focusing error signal 26c shown in FIG. 4B. In addition, the sum of the distribution of the intensity of the sub beam 1 and the distribution of the intensity of the sub beam 2 is equal to the distribution of the intensity of the main beam. Thus, the focusing error signals of the focused spots 13n and 13o as sub beams are the same as the focusing error signal 26b shown in FIG. 4A and the focusing error signal 26d shown in FIG. 4B. Consequently, the final focusing error signal that is the sum of the focusing error signal of the focused spot 13a and the focusing error signals of the focused spots 13n and 13o is the same as the focusing error signal 26e shown in FIG. 4C. In other words, according to the thirteenth embodiment of the present invention, the focusing error signals do not have offsets.

Figure 5A:
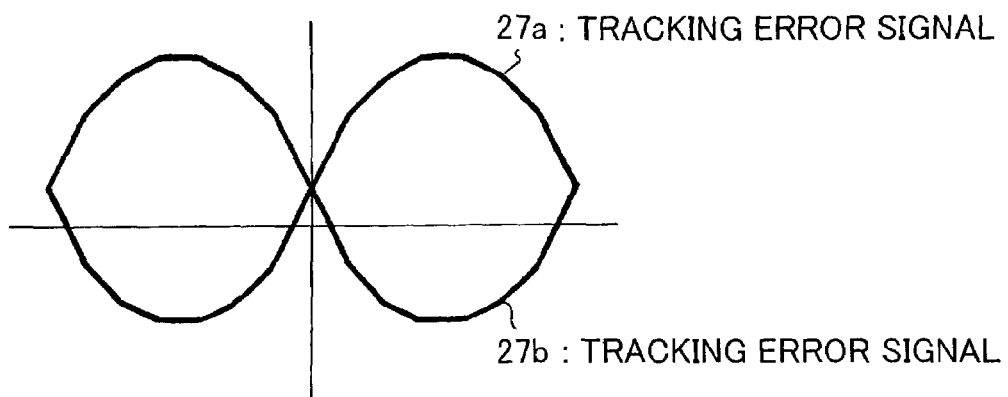
FIGS. 5A, 5B, and 5C are schematic diagrams showing various types of tracking error signals.
Figure 5B:
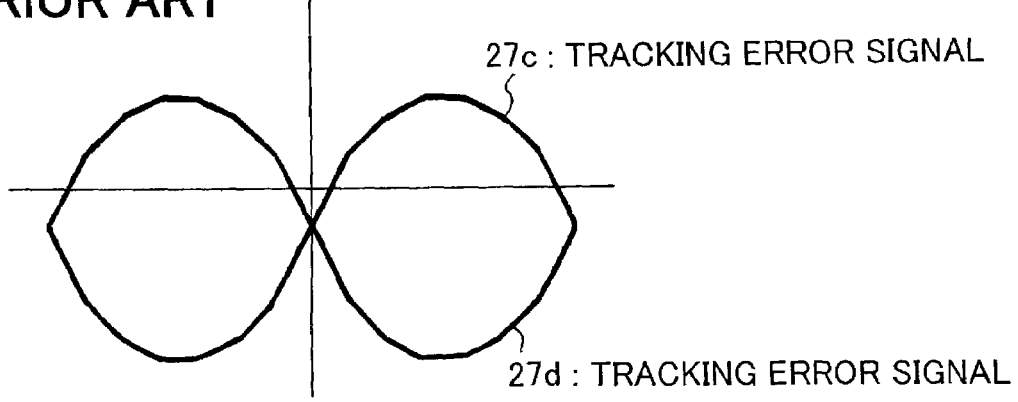
Figure 5C:
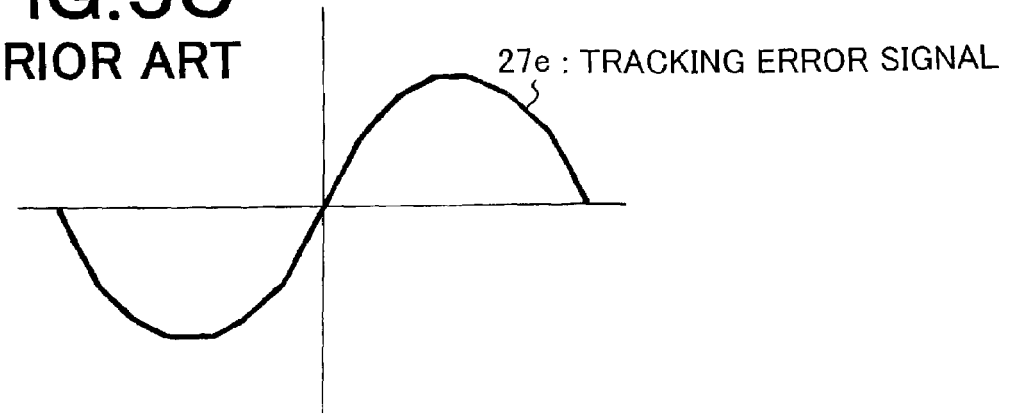
Figure 6:
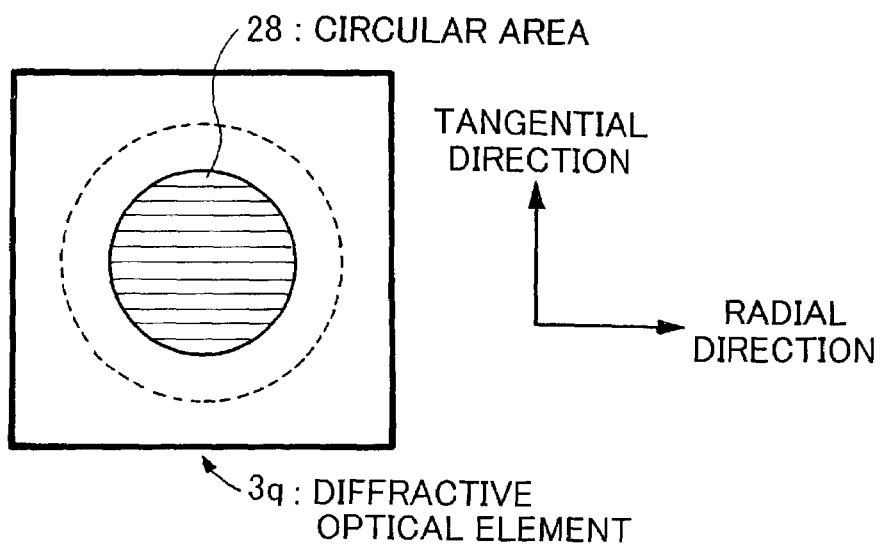
FIG. 6 is a plan view showing a diffractive optical element of another conventional optical head apparatus.
Figure 7:
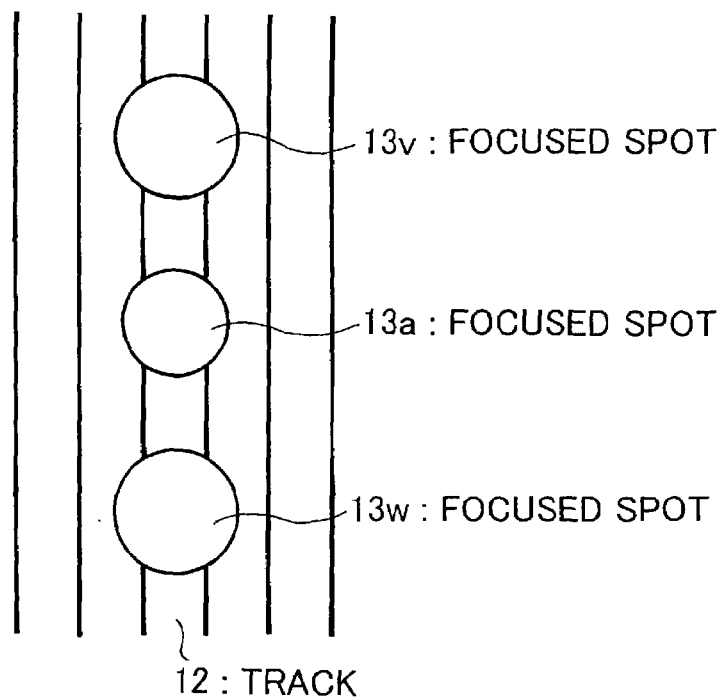
FIG. 7 is a schematic diagram showing the positions of focused spots on a disk by the other conventional optical head apparatus.

The tracking error signal of the focused spot 13a as the main beam is the same as each of the tracking error signal 27a shown in FIG. 5A and the tracking error signal 27c shown in FIG. 5B. In addition, the sum of the distribution of the intensity of the sub beam 1 and the distribution of the intensity of the sub beam 2 is the same as the distribution of the intensity of the main beam. Thus, the tracking error signal of each of the focused spots 13n and 13o as sub beams is the same as each of the tracking error signal 27b shown in FIG. 5A and the tracking error signal 27d shown in FIG. 5B. Consequently, the final tracking error signal that is the difference between the tracking error signal of the focused spot 13a and each of the tracking error signals of the focused spots 13n and 13o is the same as the tracking error signal 27e shown in FIG. 5C. In other words, according to the thirteenth embodiment of the present invention, the tracking error signals do not have offsets.

When the disk 7 does not have a deviation of the thickness of the substrate, the focusing error signal of the focused spots 13a as the main beam is the same as the focusing error signal 16a shown in FIG. 13A. When the disk 7 has a positive deviation of the thickness of the substrate, the focusing error signal of the focused spot 13a as the main beam is the same as the focusing error signal 16b shown in FIG. 13B. When the disk 7 has a negative deviation of the thickness of the substrate, the focusing error signal of the focused spot 13a as the main beam is the same as the focusing error signal 16d shown in FIG. 13C. When the disk 7 does not have a deviation of the thickness of the substrate, a focusing error signal (upper half) 25e–25g of light diffracted by the area 19a of the diffractive optical element 3m in the focused spot 13n as the sub beam 1 and a focusing error signal (lower half) 25l–25j of light diffracted by the area 19c of the diffractive optical element 3m in the focused spot 13o of the sub beam 2 are the same as the focusing error signal 16a shown in FIG. 13A. When the disk 7 has a positive deviation of the thickness of the substrate, the focusing error signals are the same as the focusing error signal 16c shown in FIG. 13B. When the disk 7 has a negative deviation of the thickness of the substrate, the focusing error signals are the same as the focusing error signal 16e shown in FIG. 13C. When the disk 7 does not have a deviation of the thickness of the substrate, a focusing error signal (lower half 25h–25f of light diffracted by the area 19d of the diffractive optical element 3m in the focused spot 13n as the sub beam 1 and a focusing error signal (upper half) 25i–25k of light diffracted by the area 19b of the diffractive optical element 3m in the focused spot 13o as the sub beam 2 are the same as the focusing error signal 16a shown in FIG. 13A. When the disk 7 has a positive deviation of the thickness of the substrate, the focusing error signals are the same as the focusing error signal 16e shown in FIG. 13C. When the disk 7 has a negative deviation of the thickness of the substrate, the focusing error signals are the same as the focusing error signal 16c shown in FIG. 13B. When the disk 7 does not have a deviation of the thickness of the substrate, at a just focus position, the difference between focusing error signals of the upper half of the sub beam 1 and the lower half of the sub beam 2 and focusing error signals of the lower half of the sub beam 1 and the upper half of the sub beam 2 $(25e+25f+25k+25l)-(25g+25h+25i+25j)$ is 0. When the disk 7 has a positive deviation of the thickness of the substrate at a just focus position, the difference is positive. When the disk 7 has a negative deviation of the thickness of the substrate at a just focus position, the difference is negative. In other words, when a focusing servo is performed using the focusing error signal of the main beam, the difference between focusing error signals of the upper half of the sub beam 1 and the lower half of the sub beam 2 and focusing error signals of the lower half of the sub beam 1 and the upper half of the sub beam 2 can be used as a substrate thickness deviation signal.

When the disk 7 does not have a radial tilt, the tracking error signal of the focused spot 13a as the main beam is the same as the tracking error signal 29a shown in FIG. 8A. When the disk 7 has a positive radial tilt, the tracking error signal of the focused spot 13a as the main beam is the same as the tracking error signal 29b shown in FIG. 8B. When the disk 7 has a negative radial tilt, the tracking error signal of the focused spot 13a as the main beam is the same as the tracking error signal 29d shown in FIG. 8C. When the disk 7 does not have a radial tilt, a tracking error signal (upper half) 25e–25g of light diffracted by the area 19a of the diffractive optical element 3m in the focused spot 13n as the sub beam 1 and a tracking error signal (lower half) 25j–25l of light diffracted by the area 19c of the diffractive optical element 3m in the focused spot 13o as the sub beam 2 are the same as the tracking error signal 29a shown in FIG. 8A. When the disk 7 has a positive radial tilt, the tracking error signals are the same as the tracking error signal 29c shown in FIG. 8B. When the disk 7 has a negative radial tilt, the tracking error signals are the same as the tracking error signal 29e shown in FIG. 8C. When the disk 7 does not have a radial tilt, a tracking error signal (lower half) 25f–25h of light diffracted by the area 19d of the diffractive optical element 3m in the focused spot 13n as the sub beam 1 and a tracking error signal (upper half 25i–25k of light diffracted by the area 19b of the diffractive optical element 3m in the focused spot 13o as the sub beam 2 are the same as the tracking error signal 29a shown in FIG. 8A. When the disk 7 has a positive radial tilt, the tracking error signals are the same as the tracking error signal 29e shown in FIG. 8C. When the disk 7 has a negative radial tilt, the tracking error signals are the same as the tracking error signal 29c shown in FIG. 8B. Thus, when the disk 7 does not have a radial tilt, regardless whether the track is a land portion or a groove portion, the difference between tracking error signals of the upper half of the sub beam 1 and the lower half of the sub beam 2 and tracking error signals of the lower half of the sub beam 1 and the upper half of the sub beam 2 $(25e+25h+25j+25k)-(25f+25g+25i+25l)$ is 0. When the disk 7 has a positive radial tilt and the track is a land portion, the difference is positive. When the disk 7 has a positive radial tilt and the track is a groove portion, the difference is negative. When the disk 7 has a negative radial tilt and the track is a land portion, the difference is negative. When the disk 7 has a positive radial tilt and the track is a groove portion, the difference is positive. In other words, when a tracking servo is performed using the tracking servo signal of the main beam, the difference between the tracking error signals of the upper half of the sub beam I and the lower half of the sub beam 2 and the tracking error signals of the lower half of the sub beam 1 and the upper half of the sub beam 2 can be used a radial tilt signal.

(Fourteenth Embodiment)

Figure 44:
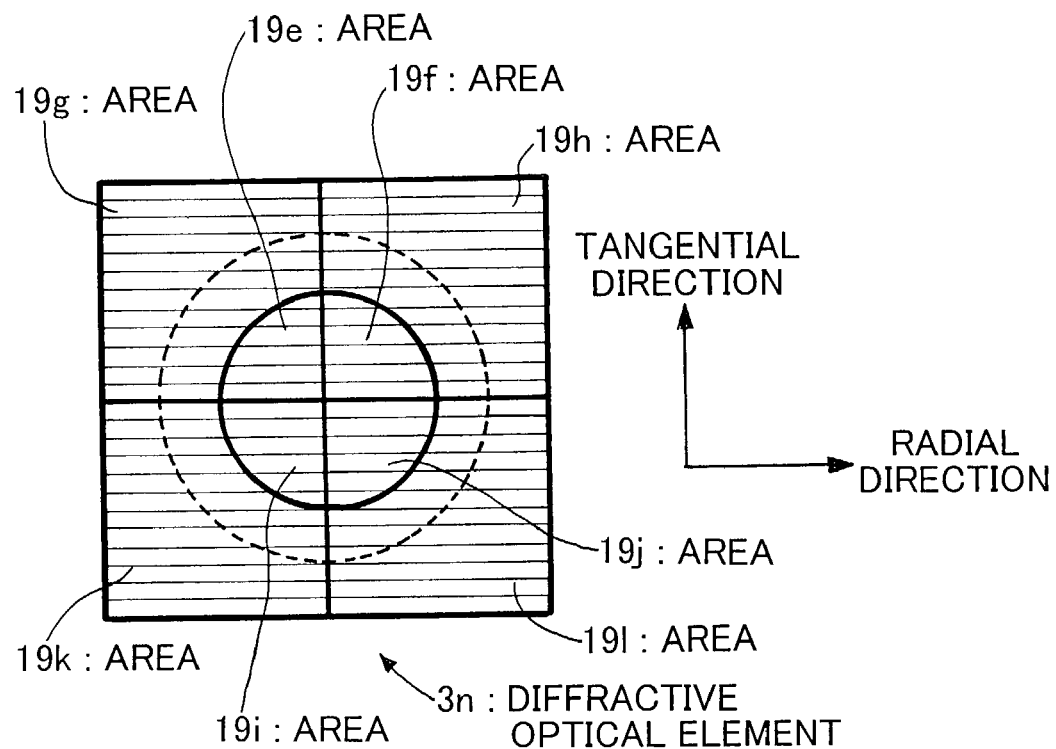
FIG. 44 is a plan view showing a diffractive optical element of an optical head apparatus according to a fourteenth embodiment of the present invention.

A fourteenth embodiment of the present invention is an optical head apparatus that is the same as the first embodiment except that the diffractive optical element 3a is substituted with a diffractive optical element 3n. FIG. 44 is a plan view showing the diffractive optical element 3n. The diffractive optical element 3n has a circular area and a non-circular area. The non-circular area is an area outside the circular area. A diffraction grating is formed in the circular area having a diameter smaller than the effective diameter of the objective lens 6 denoted by a dotted line in FIG. 44. The diffraction grating is divided into four areas 19e, 19f, 19i, and 19j by a straight line that passes through the optical axis of incident light and that parallels the radial direction of the disk 7 and a straight line that parallels the tangential direction thereof. In addition, a diffraction grating is formed in the non-circular area. The diffraction grating is divided into four areas 19g, 19h, 19k, and 19l by a straight line that passes through the optical axis of the incident light and that parallels the radial direction of the disk 7 and a straight line that parallels the tangential direction thereof. The direction of grating members of the diffraction grating in each area of the diffractive optical element 3n nearly parallels the radial direction of the disk 7. The grating members are equally spaced and linearly formed. The pitches of the grating members of the diffraction grating of each of the areas 19e, 19f, 19g, 19h, 19i, 19j, 19k, and 19l are equal. The phase of the grating of each of the areas 19e, 19g, 19i, and 19k is different from the phase of the grating of each of the areas 19f, 19h, 19j, and 19l by $\pi$ [radian].

The diffractive optical element 3n according to the fourteenth embodiment of the present invention has the same section as that shown in FIGS. 41A and 41B. The areas 19e, 19f, 19k, and 19l correspond to FIG. 41A, whereas the areas 19g, 19h, 19i, and 19j correspond to FIG. 41B. Around 40.5% of light that enters each of the areas 19e, 19f, 19k, and 19l transmits as 0-th order light, around 40.5% of the light is diffracted as +1st order diffracted light, and around 4.5% of the light is diffracted as –1st order diffracted light. In contrast, around 40.5% of light that enters each of the areas 19g, 19h, 19i, and 19j transmits as 0-th order light, around 40.5% of the light is diffracted as –1st order diffracted light, and around 4.5% of the light is diffracted as +1st order diffracted light. When 0-th order light, +1st order diffracted light, and 1st order diffracted light exiting from the diffractive optical element 3n are referred to as main beam, sub beam 1, and sub beam 2, the main beam contains light that transmits by each of the areas 19e, 19f, 19g, 19h, 19i, 19j, 19k, and 19l in the same rate. The sub beam 1 contains light that is diffracted by only the areas 19e, 19f, 19k, and 19l. The sub beam 2 contains light that is diffracted by only the areas 19g, 19h, 19i, and 19j. As a result, the distribution of the intensity of each of the main beam, the sub beam 1, and the sub beam 2 that enters the objective lens 6 is different from each other. The intensity of the peripheral portion of the upper half of the sub beam 1 is lower than the intensity of the peripheral portion of the upper half of the main beam. The intensity of the peripheral portion of the lower half of the sub beam 1 is higher than the intensity of the peripheral portion of the lower half of the main beam. The intensity of the peripheral portion of the upper half of the sub beam 2 is higher than the intensity of the peripheral portion of the upper half of the main beam. The intensity of the peripheral portion of the lower half of the sub beam 2 is lower than the intensity of the peripheral portion of the lower half of the main beam. The sum of the distribution of the intensity of the sub beam 1 and the distribution of the intensity of the sub beam 2 is the same as the distribution of the intensity of the main beam. The phase of +1st order diffracted light diffracted by each of the areas 19e and 19k is different from the phase of +1st order diffracted light diffracted by each of the areas 19f and 19l by π [radian]. Likewise, the phase of −1st order diffracted light diffracted by each of the areas 19g and 19i is different from the phase of −1st order diffracted light diffracted by each of the areas 19h and 19j by π [radian].

Figure 45:
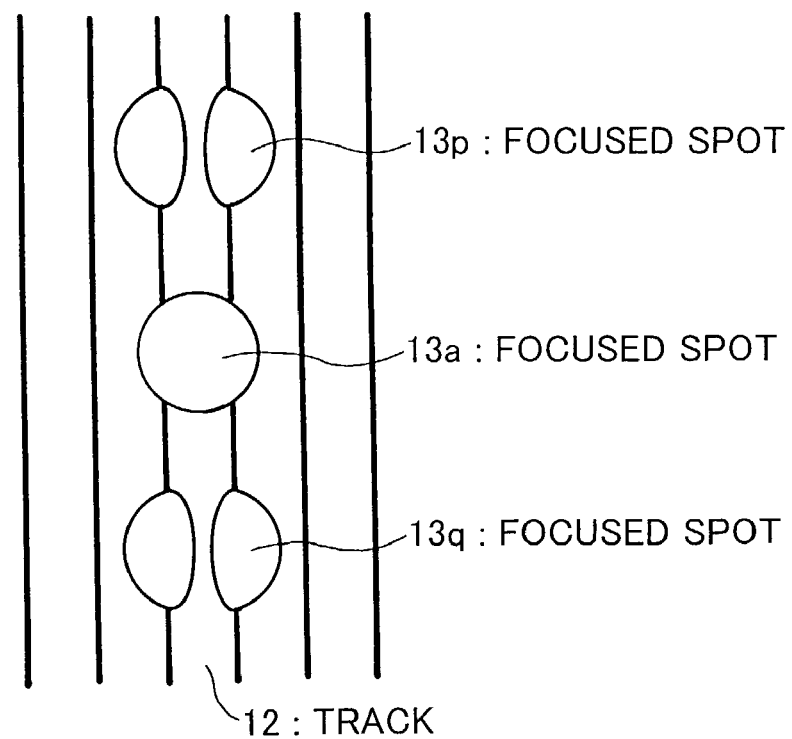
FIG. 45 is a schematic diagram showing the positions of focused spots on a disk by the optical head apparatus according to the fourteenth embodiment of the present invention.

FIG. 45 shows the positions of focused spots on the disk 7. Focused spots 13a, 13p, and 13q correspond to 0-th order light, +1st order diffracted light, and −1st order diffracted light that transmit and are diffracted by the diffractive optical element 3n. The three focused spots 13a, 13p, and 13q are placed on the same track 12 (land portion or groove portion). Each of sub beam is divided into a left portion and right portion by a straight line that passes through the optical axis and that parallels the tangential direction of the disk 7, since the phase of the left portion is different from the phase of the right portion by π [radian]. Thus, each of the focused spots 13p and 13q as sub beams has two peaks having the same intensity on the left side and the right side in the radial direction of the disk 7.

The pattern of the light receiving portion of the photo detector 10b and the positions of the light spots on the photo detector 10b according to the fourteenth embodiment are nearly the same as those shown in FIG. 43. According to the fourteenth embodiment, in the same manner as the thirteenth embodiment, a focusing error signal, a tracking error signal, and an RF signal can be obtained.

Because the phase of the grating of each of the areas 19e, 19g, 19i, and 19k is shifted from the phase of the grating of each of the areas 19f, 19h, 19j, and 19l by π [radian], the phase of the left side of each of the sub beams is different from the phase of the right side thereof by π [radian], the left side and the right side being divided by the straight line that passes through the optical axis and that parallels the tangential direction of the disk 7. With respect to an error signal, that structure is equivalent to the case that focused spots of the sub beams are placed on the disk 7 so that they shift in the radial direction of the disk 7 by ½ pitch of a groove of the disk 7 as described in for example Japanese Patent Laid-Open Publication No. 9-81942. Thus, with the same reason as the thirteenth embodiment, according to the fourteenth embodiment of the present invention, the focusing error signals and the tracking error signals do not have offsets. In addition, according to the fourteenth embodiment, in the same manner as the thirteenth embodiment, a deviation of the thickness of the substrate of the disk 7 and a radial tilt thereof can be detected. In addition, according to the fourteenth embodiment of the present invention, three focused spots are placed on the same track of the disk 7. Thus, the positions of the three focused spots do not vary for a disk having any track pitch. Regardless of the track pitch of a disk, the focusing error signals and the tracking error signals do not have offsets. In addition, a deviation of the thickness of the substrate of the disk and a radial tilt thereof can be detected.

(Fifteenth Embodiment)

Figure 46:
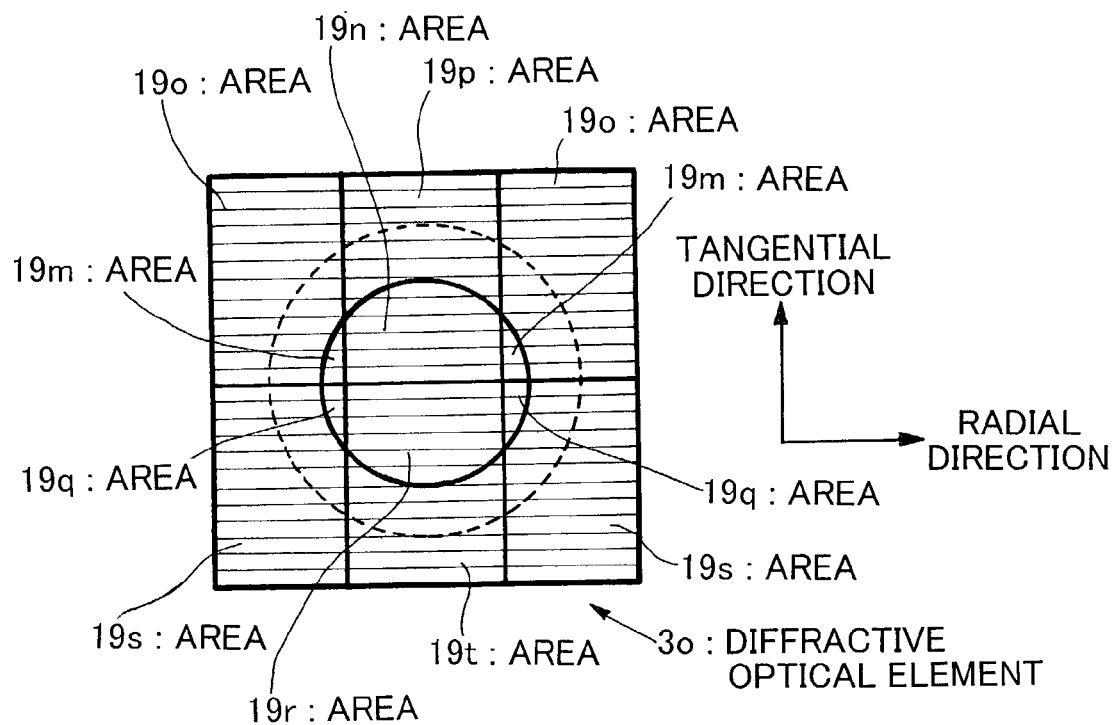
FIG. 46 is a plan view showing a diffractive optical element of an optical head apparatus according to a fifteenth embodiment of the present invention.

A fifteenth embodiment of the present invention is an optical head apparatus that is the same as the first embodiment except that the diffractive optical element 3a is substituted with a diffractive optical element 3o. FIG. 46 is a plan view showing the diffractive optical element 3o. The diffractive optical element 3o has a circular area and a non-circular area. The non-circular area is an area outside the circular area. A diffraction grating is formed in the circular area having a diameter smaller than the effective diameter of the objective lens 6 denoted by a dotted line of FIG. 46. The diffraction grating is divided into areas 19m, 19n, 19q, and 19r by a straight line that passes through the optical axis of incident light and that parallels the radial direction thereof and two straight lines that are symmetrical with respect to the optical axis of the incident light and that parallel the tangential direction of the disk 7. A diffraction grating is formed in the non-circular area. In addition, a diffraction grating is divided into four areas 19o, 19p, 19s, and 19t by a straight line that passes through the optical axis of the incident light and that parallels the radial direction of the disk 7 and two straight lines that are symmetrical with respect to the optical axis of the incident light and that parallel the tangential direction of the disk 7. The direction of the grating members of the diffraction grating in each area nearly parallels the radial direction of the disk 7. The grating members are equally spaced and linearly formed. The pitches of the grating members of each of the areas 19m, 19n, 19o, 19p, 19q, 19r, 19s, and 19t are equal. The phase of the grating of each of the areas 19m, 19o, 19q, and 19s is different from the phase of the grating of each of the areas 19n, 19p, 19r, and 19t by π [radian].

The diffractive optical element 3o according to the fifteenth embodiment has the same section as FIGS. 41A and 41B. The areas 19m, 19n, 19s, and 19t correspond to FIG. 41A, whereas the areas 19o, 19p, 19q, and 19r correspond to FIG. 41B. In other words, around 40.5% of light that enters each of the areas 19m, 19n, 19s, and 19t transmits as 0-th order light, around 40.5% of the light is diffracted as +1st order diffracted light, and around 4.5% of the light is diffracted as −1st order diffracted light. In contrast, around 40.5% of light that enters the areas 19o, 19p, 19q, and 19r transmits as 0-th order light, around 40.5% of the light is diffracted as −1st order diffracted light, and around 4.5% of the light is diffracted as +1st order diffracted light. When 0-th order light, +1st order diffracted light, and −1st order diffracted light that exit from the diffractive optical element 3o are referred to as main beam, sub beam 1, and sub beam 2, respectively, the main beam contains light that transmits by each of the areas 19m, 19n, 19o, 19p, 19q, 19r, 19s, and 19t in the same rate. The sub beam 1 contains light diffracted by each of the areas 19m, 19n, 19s, and 19t. The sub beam 2 contains light diffracted by each of the areas 19o, 19p, 19q, and 19r. As a result, the distribution of the intensity of the main beam that enters the objective lens 6 is different from the distribution of the intensity of each of the sub beam 1 and the sub beam 2 that enter the objective lens 6. The intensity of the peripheral portion of the upper half of the sub beam 1 is lower than the intensity of the peripheral portion of the upper half of the main beam. The intensity of the peripheral portion of the lower half of the sub beam 1 is higher than the intensity of the peripheral portion of the lower half of the main beam. The intensity of the peripheral portion of the upper half of the sub beam 2 is higher than the intensity of the peripheral portion of the upper half of the main beam. The intensity of the peripheral portion of the lower half of the sub beam 2 is lower than the intensity of the peripheral portion of the lower half of the main beam. The sum of the distribution of the intensity of the sub beam 1 and the distribution of the intensity of the sub beam 2 is the same as the distribution of the intensity of the main beam. The phase of +1st order diffracted light diffracted by each of the areas 19m and 19s is different from the phase of −1st order diffracted light diffracted by each of the areas 19n and 19t by π [radian]. Likewise, the phase of −1st order diffracted light diffracted by each of the areas 19o and 19q is different from the phase of −1st order diffracted light diffracted by each of the areas 19*p* and 19*r* by π [radian].

Figure 47:
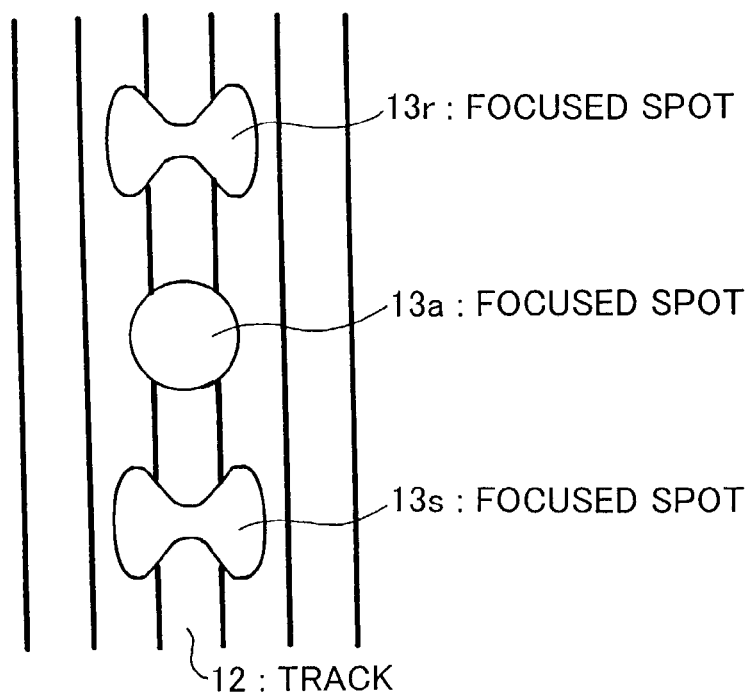
FIG. 47 is a schematic diagram showing the positions of focused spots on a disk by the optical head apparatus according to the fifteenth embodiment of the present invention.

FIG. 47 shows the positions of focused spots on the disk 7. Focused spots 13*a*, 13*r*, and 13*s* correspond to 0-th order light, +1st order diffracted light, and −1st order diffracted light that exit from the diffractive optical element 3*o*. The three focused spots 13*a*, 13*r*, and 13*s* are placed on the same track 12 (land portion or groove portion). Since the phase of an outside portion of each of the sub beams is different from the phase of an inside portion thereof by π [radian], the inside portion being a portion between two straight lines that are symmetrical with respect to the optical axis and that parallel the tangential direction of the disk 7, the outside portion being other than the inside portion, each of the focused spots 13*r* and 13*s* as sub beams has two peaks having the same intensity on the left side and the right side in the radial direction of the disk 7.

The pattern of the light receiving portion of the photo detector 10*b* and the positions of the light spots on the photo detector 10*b* according to the fifteenth embodiment are nearly the same as those shown in FIG. 43. According to the fifteenth embodiment, in the same manner as the thirteenth embodiment, a focusing error signal, a tracking error signal, and an RF signal can be obtained.

When the phase of the grating of each of the areas 19*m*, 19*o*, 19*q*, and 19*s* is shifted from the phase of the grating of each of the areas 19*n*, 19*p*, 19*r*, and 19*t* by π [radian], the phase of the outside portion of each of the sub beams is different from the phase of the inside portion thereof by π [radian], the inside portion being a portion between two straight lines that are symmetrical with respect to the optical axis and that parallel the tangential direction of the disk 7, the outside portion being other than the inside portion. With respect to an error signal, that structure is equivalent to the case that focused spots of the sub beams are placed on the disk 7 so that they shift in the radial direction of the disk 7 by ½ pitch of a groove of the disk 7 as described in for example Japanese Patent Laid-Open Publication No. 11-296875. Thus, with the same reason as the thirteenth embodiment, according to the fifteenth embodiment of the present invention, the focusing error signals and the tracking error signals do not have offsets. In addition, according to the fifteenth embodiment, in the same manner as the thirteenth embodiment, a deviation of the thickness of the substrate of the disk 7 and a radial tilt thereof can be detected. In addition, according to the fifteenth embodiment of the present invention, three focused spots are placed on the same track of the disk 7. Thus, the positions of the three focused spots do not vary for a disk having any track pitch. Regardless of the track pitch of a disk, the focusing error signals and the tracking error signals do not have offsets. In addition, a deviation of the thickness of the substrate of the disk and a radial tilt thereof can be detected.

A variation of the thirteenth embodiment of the present invention is an optical head apparatus that is the same as the thirteenth embodiment except that the diffractive optical element 3*m* is substituted with another diffractive optical element. The other diffractive optical element has a stripe area and a non-stripe area. The non-stripe area is an area outside the stripe area. A diffraction grating is formed in the stripe area having a width smaller than the effective diameter of the objective lens 6. The diffraction grating is divided into two areas by a straight line that passes through the optical axis of incident light and that parallels the radial direction of the disk 7. A diffraction grating is formed in the non-stripe area. The diffraction grating is divided into two areas by a straight line that passes through the optical axis of the incident light and that parallels the radial direction of the disk 7. According to the variation of the thirteenth embodiment, with the same reason as the thirteenth embodiment, the focusing error signals and tracking error signals do not have offsets. According to the variation of the thirteenth embodiment, in the same manner as the thirteenth embodiment, a deviation of the thickness of the substrate of the disk 7 and a radial tilt thereof can be detected.

A variation of the fourteenth embodiment of the present invention is an optical head apparatus that is the same as the fourteenth embodiment except that the diffractive optical element 3*n* is substituted with another diffractive optical element. The other diffractive optical element has a stripe area and a non-stripe area. The non-stripe area is an area outside the stripe area. A diffraction grating is formed in the stripe area having a width smaller than the effective diameter of the objective lens 6. The diffraction grating is divided into four areas by a straight line that passes through the optical axis of incident light and that parallels the radial direction of the disk 7 and a straight line that parallels the tangential direction thereof. A diffraction grating is formed in the non-stripe area divided into four areas by a straight line that passes through the optical axis of the incident light and that parallels the radial direction of the disk 7 and a straight line that parallels the tangential direction thereof. According to the variation of the fourteenth embodiment, with the same reason as the fourteenth embodiment, regardless of the track pitch of a disk that is subjected to the optical head apparatus according to the fourteenth embodiment, the focusing error signals and tracking error signals do not have offsets. According to the variation of the fourteenth embodiment, in the same manner as the fourteenth embodiment, regardless of the track pitch of a disk, a deviation of the thickness of the substrate of the disk 7 and a radial tilt thereof can be detected.

A variation of the fifteenth embodiment of the present invention is an optical head apparatus that is the same as the fifteenth embodiment except that the diffractive optical element 3*o* is substituted with another diffractive optical element. The other diffractive optical element has a stripe area and a non-stripe area. The non-stripe area is an area outside the stripe area. A diffraction grating is formed in the stripe area having a width smaller than the effective diameter of the objective lens 6. The diffraction grating is divided into four areas by a straight line that passes through the optical axis of incident light and that parallels the radial direction of the disk 7 and two straight lines that are symmetrical with respect to the optical axis of the incident light and that parallel the tangential direction of the disk 7. A diffraction grating is formed in the non-stripe area divided into four areas by a straight line that passes through the optical axis of the incident light and that parallels the radial direction of the disk 7 and two straight lines that are symmetrical with respect to the optical axis of the incident light and that parallel the tangential direction of the disk 7. According to the variation of the fifteenth embodiment, with the same reason as the fifteenth embodiment, regardless of the track pitch of a disk, the focusing error signals and tracking error signals do not have offsets. According to the variation of the fifteenth embodiment, in the same manner as the fifteenth embodiment, regardless of the track pitch of a disk, a deviation of the thickness of the substrate of the disk 7 and a radial tilt thereof can be detected.

According to the thirteenth to fifteenth embodiments of the present invention, when a focusing servo is performed using a focusing error signal of the main beam, the difference between focusing error signals of the upper half of the sub beam 1 and the lower half of the sub beam 2 and focusing error signals of the lower half of the sub beam 1 and the upper half of the sub beam 2 is used as a substrate thickness deviation signal. In contrast, according to variations of the thirteenth to fifteenth embodiments, when a focusing servo is performed using a final focusing error signal that is the sum of a focusing error signal of the main beam and focusing error signals of sub beams, the difference between focusing error signals of the upper half of the sub beam 1 and the lower half of the sub beam 2 and focusing error signals of the lower half of the sub beam 1 and the upper half of the sub beam 2 is used as a substrate thickness deviation signal. According to the variations of the thirteenth to fifteenth embodiments, a deviation of the thickness of the substrate can be detected without an offset due to groove traverse noise in the focusing error signal. However, a substrate thickness deviation signal has an offset due to groove traverse noise. At that point, when the difference between a focusing error signal of the main beam and focusing error signals of sub beams is referred to as focus offset signal, a component that represents the focus error in the focusing error signal is offset. As a result, a component of the offset due to the groove traverse noise is left. Thus, when a signal obtained by subtracting a focus offset signal from the difference between focusing error signals of the upper half of the sub beam 1 and the lower half of the sub beam 2 and focusing error signals of the lower half of the sub beam 1 and the upper half of the sub beam 2 is used as a substrate thickness deviation signal, a deviation of the thickness of the substrate can be detected without an offset due to groove traverse noise in the substrate thickness deviation signal.

According to the thirteenth to fifteenth embodiments, when a tracking servo is performed using a tracking error signal of the main beam, the difference between tracking error signals of the upper half of the sub beam 1 and the lower half of the sub beam 2 and tracking error signals of the lower half of the sub beam 1 and the upper half of the sub beam 2 is used as a radial tilt signal. In contrast, according to the variations of the thirteenth to fifteenth embodiments of the present invention, when a tracking servo is performed using a final tracking error signal that is the difference between a tracking error signal of the main beam and tracking error signals of sub beams, the difference between tracking error signals of the upper half of the sub beam 1 and the lower half of the sub beam 2 and tracking error signals of the lower half of the sub beam 1 and the upper half of the sub beam 2 is used as a radial tilt signal. According to the variations of the thirteenth to fifteenth embodiments, a radial tilt can be detected without an offset due to a lens shift in a tracking error signal. However, a radial tilt signal has an offset due to a lens shift. When the sum of a tracking error signal of the main beam and tracking error signal of the sub beams is referred to as tracking offset signal, a component representing the track error in the tracking offset signal is offset. As a result, only a component of the offset due to a lens shift is left. Thus, when a signal obtained by subtracting the track offset signal from the difference between tracking error signals of the upper half of the sub beam 1 and the lower half of the sub beam 2 and tracking error signals of the lower half of the sub beam 1 and the upper half of the sub beam 2 is used as a radial tilt signal, a radial tilt can be detected without an offset due to the lens shift in the radial tilt signal.

(Sixteenth Embodiment)

Figure 48:
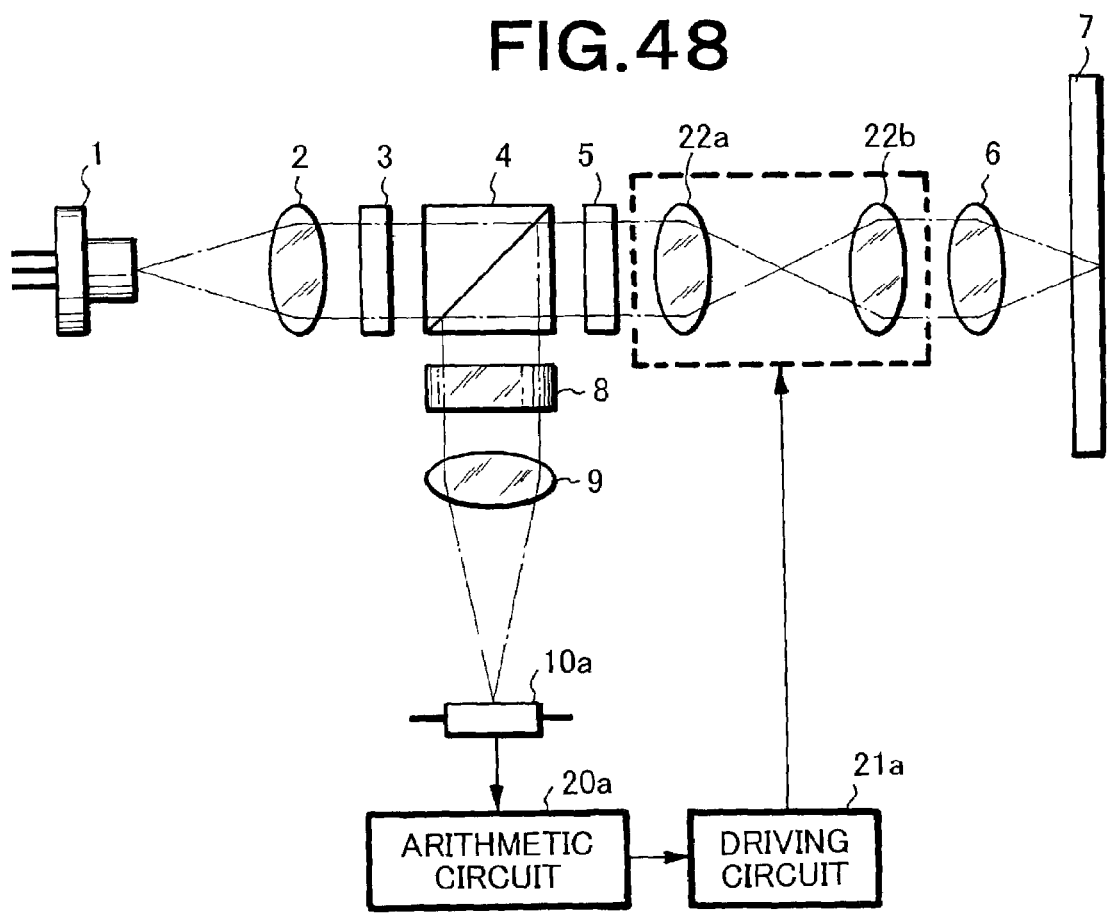
FIG. 48 is a schematic diagram showing an optical information recording and reproducing apparatus according to a sixteenth embodiment of the present invention.

FIG. 48 shows an optical information recording and reproducing apparatus according to a sixteenth embodiment of the present invention. The optical information recording and reproducing apparatus according to the sixteenth embodiment comprises an arithmetic circuit 20a, a driving circuit 21a, relay lenses 22a and 22b, and the optical head apparatus according to the first embodiment shown in FIG. 9. The arithmetic circuit 20a calculates a substrate thickness deviation signal corresponding to outputs of the individual light receiving portions of the photo detector 10a. The driving circuit 21a causes an actuator (not shown) to move one of the relay lenses 22a and 22b surrounded by dotted lines in FIG. 48 in the direction of the optical axis so that the substrate thickness deviation signal becomes zero. When one of the relay lenses 22a and 22b is moved in the direction of the optical axis, the magnification of the objective lens 6 varies. As a result, the spherical aberration varies. Thus, the position of one of the relay lenses 22a and 22b is adjusted in the direction of the optical axis so that the objective lens 6 has a spherical aberration that cancels a spherical aberration due to the deviation of the thickness of the substrate of the disk 7. As a result, the deviation of the thickness of the substrate of the disk 7 is compensated, whereby the recording and reproduction characteristics are prevented from being adversely affected.

(Seventeenth Embodiment)

Figure 49:
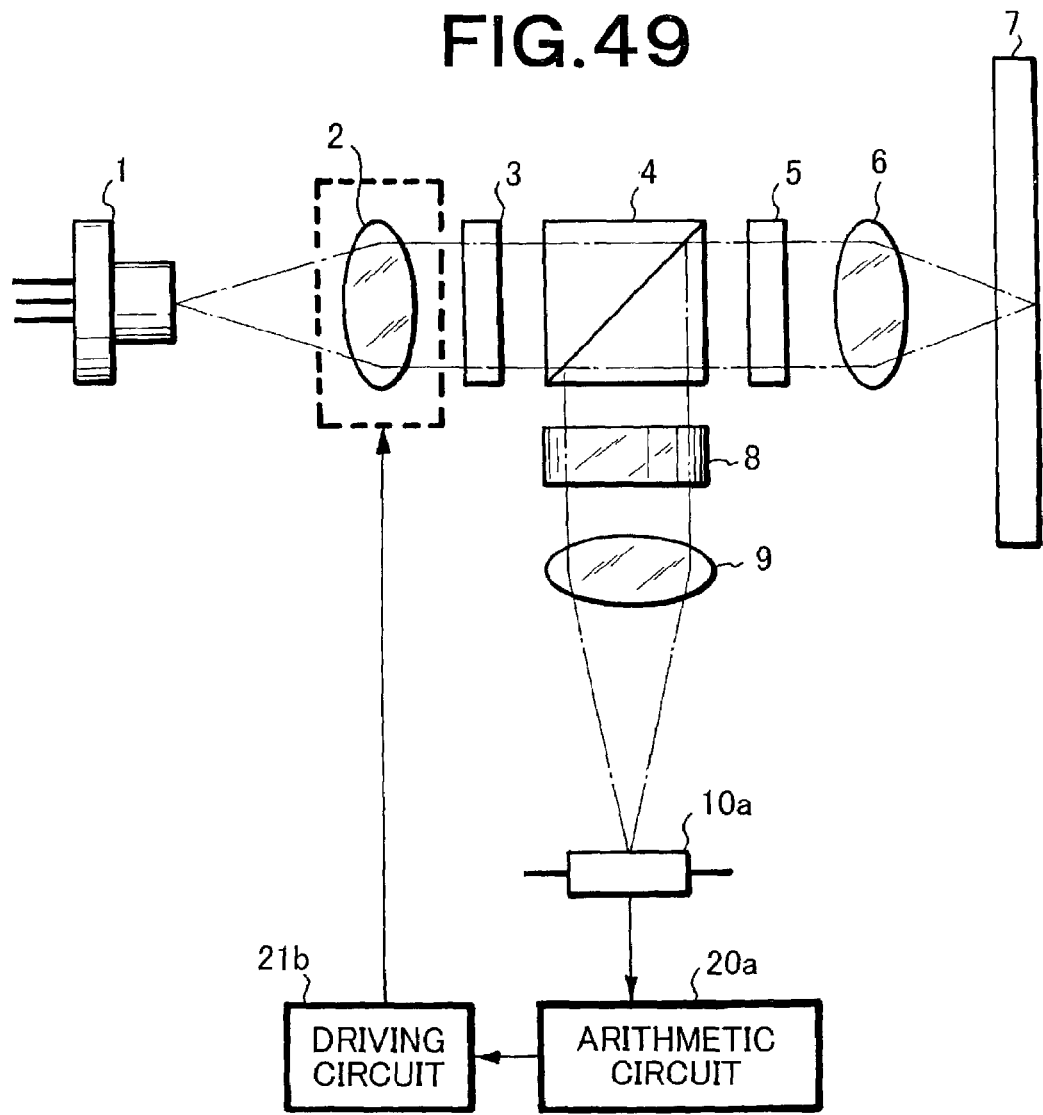
FIG. 49 is a schematic diagram showing an optical information recording and reproducing apparatus according to a seventeenth embodiment of the present invention.

FIG. 49 shows an optical information recording and reproducing apparatus according to a seventeenth embodiment of the present invention. The optical information recording and reproducing apparatus according to the seventeenth embodiment comprises an arithmetic circuit 20a, a driving circuit 21b, and the optical head apparatus according to the first embodiment shown in FIG. 9. The arithmetic circuit 20a calculates a substrate thickness deviation signal corresponding to outputs of the individual light receiving portions of the photo detector 10a. The driving circuit 21b causes an actuator (not shown) to move a collimator lens 2 surrounded by dotted lines in FIG. 49 in the direction of the optical axial so that the substrate thickness deviation signal becomes zero. When the collimator lens 2 is moved in the direction of the optical axis, the magnification of the objective lens 6 varies. As a result, the spherical aberration varies. Thus, the position of the collimator lens 2 is adjusted in the direction of the optical axis so that the objective lens 6 has a spherical aberration that cancels a spherical aberration due to the deviation of the thickness of the substrate of the disk 7. As a result, the deviation of the thickness of the substrate of the disk 7 is compensated, whereby the recording and reproduction characteristics are prevented from being adversely affected.

(Eighteenth Embodiment)

Figure 50:
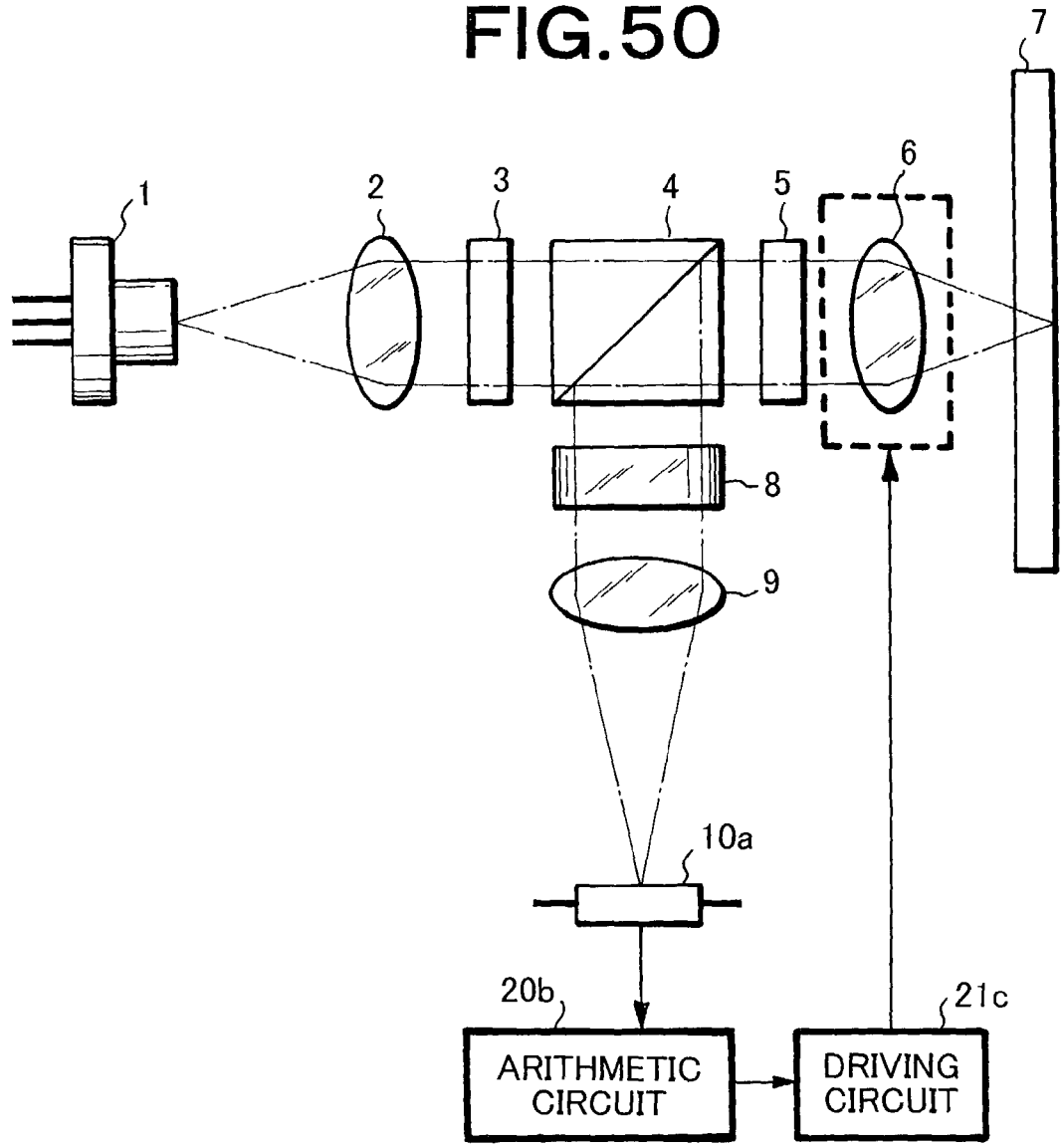
FIG. 50 is a schematic diagram showing an optical information recording and reproducing apparatus according to a eighteenth embodiment of the present invention.

FIG. 50 shows an optical information recording and reproducing apparatus according to an eighteenth embodiment of the present invention. The optical information recording and reproducing apparatus according to the eighteenth embodiment comprises an arithmetic circuit 20b, a driving circuit 21c, and the optical head apparatus according to the first embodiment shown in FIG. 9. The arithmetic circuit 20b calculates a radial tilt signal corresponding to outputs of the individual light receiving portions of the photo detector 10a. The driving circuit 21c causes an actuator (not shown) to tilt an objective lens 6 surrounded by dotted lines in FIG. 50 in the radial direction of the disk 7 so that the radial tilt signal becomes zero. As a result, the radial tilt of the disk 7 is compensated, whereby the recording and reproduction characteristics are prevented from being adversely affected.

(Nineteenth Embodiment)

Figure 51:
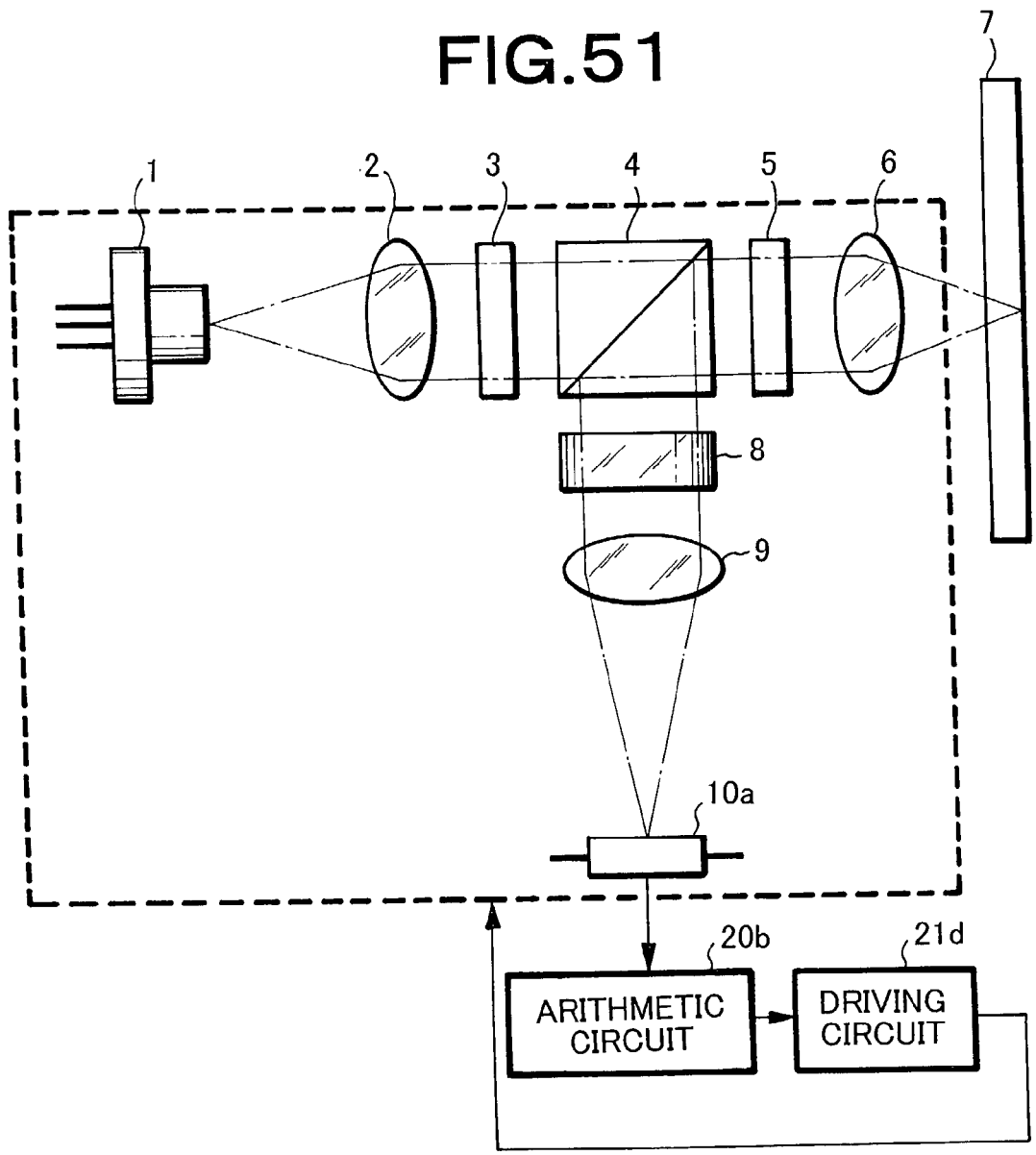
FIG. 51 is a schematic diagram showing an optical information recording and reproducing apparatus according to a nineteenth embodiment of the present invention.

FIG. 51 shows an optical information recording and reproducing apparatus according to a nineteenth embodiment of the present invention. The optical information recording and reproducing apparatus according to the nineteenth embodiment comprises an arithmetic circuit 20b, a driving circuit 21d, and the optical head apparatus according to the first embodiment shown in FIG. 9. The arithmetic circuit 20b calculates a radial tilt signal corresponding to outputs of the individual light receiving portions of the photo detector 10a. The driving circuit 21d causes an actuator (not shown) to tilt the entire optical head apparatus surrounded by dotted lines in FIG. 51 in the radial direction of the disk 7 so that the radial tilt signal becomes zero. As a result, the radial tilt of the disk 7 is compensated, whereby the recording and reproduction characteristics are prevented from being adversely affected.

A further embodiment of the present invention is an optical information recording and reproducing apparatus in which the sixteenth embodiment or the seventeenth embodiment and the eighteenth embodiment or the nineteenth embodiment are combined According to this embodiment, both a deviation of the thickness of the substrate of the disk 7 and a radial tilt thereof are compensated.

(Twentieth Embodiment)

Figure 52:
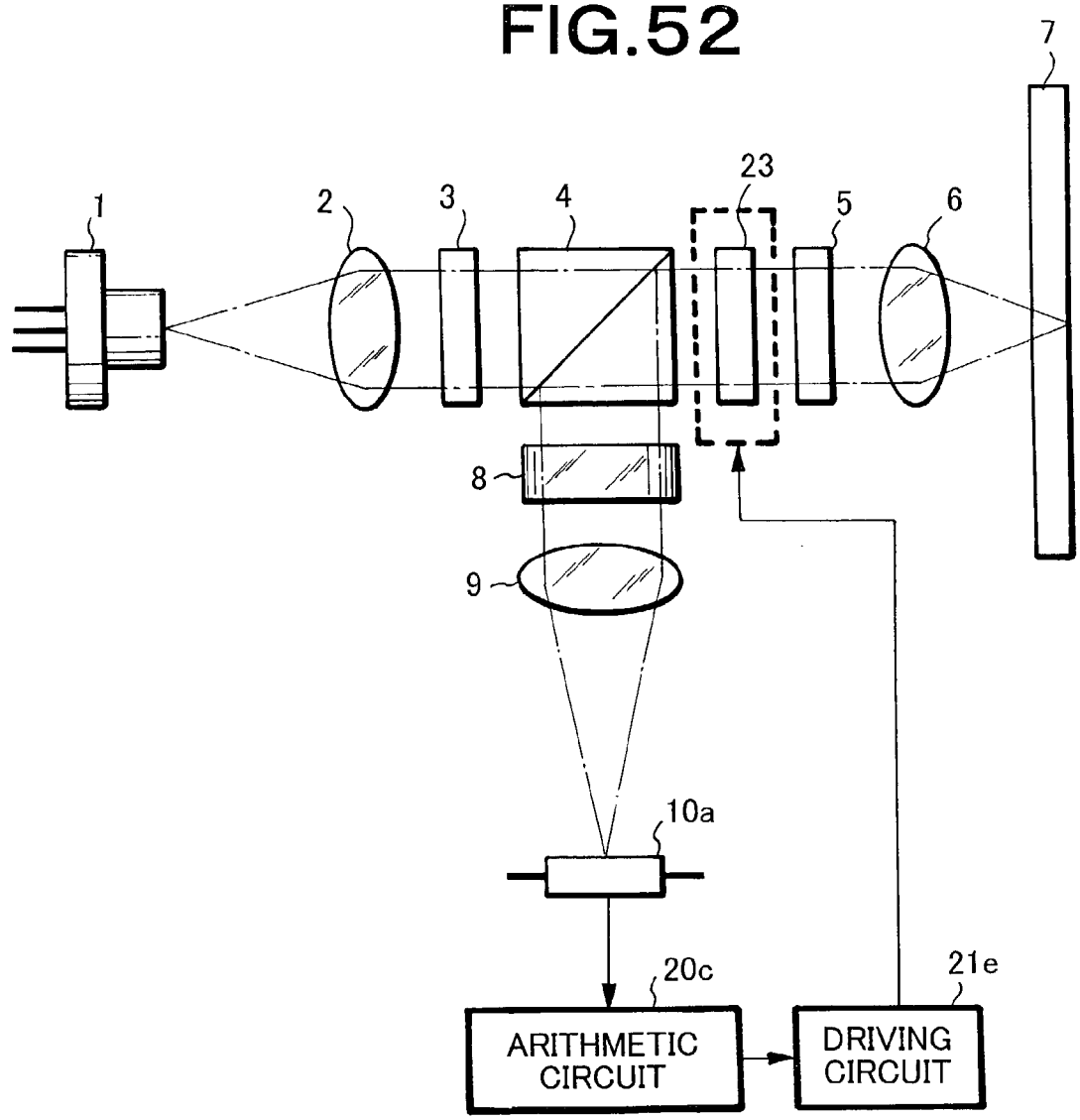
FIG. 52 is a schematic diagram showing an optical information recording and reproducing apparatus according to a twentieth embodiment of the present invention.

FIG. 52 shows an optical information recording and reproducing apparatus according to a twentieth embodiment of the present invention. The optical information recording and reproducing apparatus according to the twentieth embodiment of the present invention comprises an arithmetic circuit 20c, a driving circuit 21e, a liquid crystal optical element 23, and the optical head apparatus according to the first embodiment shown in FIG. 9. The arithmetic circuit 20c calculates a substrate thickness deviation signal and a radial tilt signal corresponding to outputs of the individual light receiving portions of the photo detector 10a. The driving circuit 21e applies a voltage to the liquid crystal optical element 23 surrounded by dotted lines in FIG. 52 so that the substrate thickness deviation signal and the radial tilt signal become zero. The liquid crystal optical element 23 is divided into a plurality of areas. When the voltage applied to each area is varied, a spherical aberration and a comatic aberration of the liquid crystal optical element 23 against transmitted light vary. Thus, the voltage applied to the liquid crystal optical element 23 is adjusted so that the liquid crystal optical element 23 has both a spherical aberration that cancels a spherical aberration due to the deviation of the thickness of the substrate of the disk 7 and a comatic aberration that cancels a comatic aberration due to the radial tilt thereof As a result, the deviation of the thickness of the substrate of the disk 7 and the radial tilt thereof are compensated, whereby the recording and reproduction characteristics are prevented from being adversely affected.

According to the eighteenth embodiment to the twentieth embodiment, the sign of the radial tilt signal in the case that a tracking servo is performed for a land portion is reverse of that in the case that a tracking servo is performed for a groove portion. Thus, depending on whether the tracking servo is performed for a land portion or a groove portion, the polarity of the circuit comprising the arithmetic circuit 20b or 20c and the driving circuit 21d, 21d or 21e that compensate a radial tilt is changed.

In further embodiments of the present invention, an optical information recording and reproducing apparatus comprises the arithmetic circuit, the driving circuit, and the optical head apparatus according to one of the second embodiment to the fifteenth embodiment.

The present invention is an optical head apparatus having a light source, an objective lens that focuses light emitted from the light source on an optical recording medium, and a photo detector that receives reflected light from the optical recording medium. The apparatus comprises means for detecting a focusing error signal or a tracking error signal from each of a main beam, a first sub beam, and a second sub beam. The distribution of the intensity of the main beam is the same as the distribution of the intensity of the first sub beam. The distribution of the intensity of the main beam is different from the distribution of the intensity of the second sub beam. A focusing error signal and a tracking error signal are detected from the main beam, the first sub beam and the second sub beam. The sum of the focusing error signal of the main beam and the focusing error signal of the first sub beam is treated as a final focusing error signal. The difference between the tracking error signal of the main beam and the tracking error signal of the first sub beam is treated as a final tracking error signal. The deviation of the thickness of the substrate of the optical recording medium is detected on the basis of the deviation between the zero crossing point of the focusing error signal of the main beam and the zero crossing point of the focusing error signal of the second sub beam. The radial tilt of the optical recording medium is detected on the basis of the deviation between the zero crossing point of the tracking error signal of the main beam and the zero crossing point of the tracking error signal of the second sub beam.

The present invention is an optical information recording and reproducing apparatus, comprising the optical head apparatus of the present invention and means for compensating the deviation of the thickness of the substrate of the optical recording medium or the radial tilt thereof.

The effect of the optical head apparatus and the optical information recording and reproducing apparatus according to the present invention is in that the focusing error signal and the tracking error signal do not have an offset and that a deviation of the thickness of the substrate of the optical recording medium and a radial tilt thereof are detected. The reason for the former effect is as follows: Since the distribution of the intensity of the main beam is the same as the distribution of the intensity of each of the first sub beams, assuming that the sum of the focusing error signal of the main beam and the focusing error signal of each of the first sub beams is the final focusing error signal and that the difference between the tracking error signal of the main beam and the tracking error signal of each of the first sub beams is the final tracking error signal, then the offsets of the focusing error signal and the tracking error signal of the main beam and the offsets of the focusing error signal and the tracking error signal of each of the first sub beams are cancelled. The reason for the latter effect is as follows: When the optical recording medium has a deviation of the thickness of the substrate or a radial tilt thereof, the zero crossing point of the focusing error signal or the tracking error signal shifts due to the spherical aberration or comatic aberration. Since the distribution of the intensity of the main beam is different from the distribution of the intensity of each of the second sub beams, the amount of the above-mentioned shift relating to the main beam is different from the amount of the above-mentioned shift relating to the second sub beams. Thus, the zero crossing point of the focusing error signal or the zero crossing point of the tracking error signal relating to the main beam deviates from that relating to the second sub beams.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. An optical head apparatus comprising:

a light source;

means for generating a main beam, first sub beams and second sub beams from incident light emitted from said light source;

an objective lens which focuses said main beam, said first sub beams and said second sub beams on an optical recording medium;

a photo detector which receives said main beam, said first sub beams and said second sub beams reflected from the optical recording medium;

means for detecting a focusing error signal or a tracking error signal from each of said main beam, said first sub beams, and said second sub beams, the distribution of the intensity of the main beam being the same as the distribution of the intensity of the first sub beams, the distribution of the intensity of the main beam being different from the distribution of the intensity of the second sub beams.

2. The optical head apparatus as set forth in claim 1, wherein a sum of a focusing error signal relating to the main beam and a focusing error signal relating to the first sub beams is used as a final focusing error signal.

3. The optical head apparatus as set forth in claim 1, wherein a difference between a tracking error signal relating to the main beam and a tracking error signal relating to the first sub beam is used as a final tracking error signal.

4. The optical head apparatus as set forth in claim 1, wherein a deviation of a thickness of a substrate of the optical recording medium is detected on the basis of a deviation between a zero crossing point of a focusing error signal relating to the main beam and a zero crossing point of a focusing error signal relating to the second sub beams.

5. The optical head apparatus as set forth in claim 1, wherein a radial tilt of the optical recording medium is detected on the basis of a deviation between a zero crossing point of a tracking error signal relating to the main beam and a zero crossing point of a tracking error signal relating to the second sub beams.

6. The optical head apparatus as set forth in claim 1, wherein a diffractive optical element is disposed between the light source and the objective lens, the diffractive optical element separating the light emitted from the light source into the main beam, the first sub beams, and the second sub beams.

7. The optical head apparatus as set forth in claim 6, wherein the diffractive optical element has two planes, a diffraction grating being formed on an entire surface of one of the two planes, a diffraction grating being formed in a circular area of the other of the two planes, a diameter of the circular area being smaller than an effective diameter of the objective lens.

8. The optical head apparatus as set forth in claim 6, wherein the diffractive optical element has two planes, a diffraction grating being formed on an entire surface of one of the two planes, a diffraction grating being formed in an outer area of a circular area of the other of the two planes, a diameter of the circular area being smaller than an effective diameter of the objective lens.

9. The optical head apparatus as set forth in claim 6, wherein the diffractive optical element has two planes, a diffraction grating being formed on an entire surface of one of the two planes, a diffraction grating being formed in a rectangular area of the other of the two planes, a width of the rectangular area being smaller than an effective diameter of the objective lens.

10. The optical head apparatus as set forth in claim 6, wherein the diffractive optical element has two planes, a diffraction grating being formed on an entire surface of one of the two planes, a diffraction grating being formed in an outer area of a rectangular area of the other of the two planes, a width of the rectangular area being smaller than an effective diameter of the objective lens.

11. The optical head apparatus as set forth in one of claims 7 to 10, wherein the main beam comprises light which exits the former plane as 0-th order light and exits the latter plane as 0-th order light, wherein the first sub beams comprise light which exits the former plane as ±1st order diffracted light and exits the latter plane as 0th order light, and wherein the second sub beams comprise light which exits the former plane as 0-th order light and exits the latter plane as ±1st order diffracted light.

12. The optical head apparatus as set forth in claim 11, wherein focused spots of the first sub beams are apart from a focused spot of the main beam by around ½ pitch of a groove of the optical recording medium in radial direction of the optical recording medium, and wherein focused spots of the second sub beams are apart from a focused spot of the main beam by around one pitch of the groove of the optical recording medium in radial direction of the optical recording medium.

13. The optical head apparatus as set forth in claim 6, wherein the diffractive optical element has two planes, a diffraction grating being formed on an entire surface of one of the two planes, the diffraction grating being divided into two areas which are a left area and a right area by a straight line which passes through an optical axis of incident light and which parallels a tangential direction of the optical recording medium, wherein a diffraction grating is formed in a circular area of the other of the two planes, a diameter of the circular area being smaller than an effective diameter of the objective lens, and wherein a phase of the grating of the left area is different from the phase of the grating of the right area by around π [radian].

14. The optical head apparatus as set forth in claim 6, wherein the diffractive optical element has two planes, a diffraction grating being formed on an entire surface of one of the two planes, the diffraction grating being divided into two areas which are a left area and a right area by a straight line which passes through an optical axis of incident light and which parallels a tangential direction of the optical recording medium, wherein a diffraction grating is formed in an outer area of a circular area of the other of the two planes, a diameter of the circular area being smaller than an effective diameter of the objective lens, and wherein a phase of the grating of the left area is different from a phase of the grating of the right area by around π [radian].

15. The optical head apparatus as set forth in claim 6,
wherein the diffractive optical element has two planes, a diffraction grating being formed on an entire surface of one of the two planes, the diffraction grating being divided into two areas which are a left area and a right area by a straight line which passes through an optical axis of incident light and which parallels a tangential direction of the optical recording medium, wherein a diffraction grating is formed in a rectangular area of the other of the two planes, a width of the rectangular area being smaller than an effective diameter of the objective lens, and wherein a phase of the grating of the left area is different from a phase of the grating of the right area by around π [radian].

16. The optical head apparatus as set forth in claim 6,
wherein the diffractive optical element has two planes, a diffraction grating being formed on an entire surface of one of the two planes, the diffraction grating being divided into two areas which are a left area and a right area by a straight line which passes through an optical axis of incident light and which parallels a tangential direction of the optical recording medium, wherein a diffraction grating is formed in an outer area of a rectangular area of the other of the two planes, a width of the rectangular area being smaller than an effective diameter of the objective lens, and wherein a phase of the grating of the left area is different from a phase of the grating of the right area by around π [radian].

17. The optical head apparatus as set forth in claim 6,
wherein the diffractive optical element has two planes, a diffraction grating being formed on an entire surface of one of the two planes, the diffraction grating being divided into two areas which are an outer area and an inner area by two straight lines which are symmetrical with respect to an optical axis of incident light and which parallel a tangential direction of the optical recording medium, wherein a diffraction grating is formed in a circular area of the other of the two planes, a diameter of the circular area being smaller than an effective diameter of the objective lens, and wherein a phase of the grating of the outer area is different from a phase of the grating of the inner area by around π [radian].

18. The optical head apparatus as set forth in claim 6,
wherein the diffractive optical element has two planes, a diffraction grating being formed on an entire surface of one of the two planes, the diffraction grating being divided into two areas which are an outer area and an inner area by two straight lines which are symmetrical with respect to an optical axis of incident light and which parallel a tangential direction of the optical recording medium, wherein a diffraction grating is formed in an outer area of a circular area of the other of the two planes, a diameter of the circular area being smaller than an effective diameter of the objective lens, and wherein a phase of the grating of the outer area is different from a phase of the grating of the inner area by around π [radian].

19. The optical head apparatus as set forth in claim 6,
wherein the diffractive optical element has two planes, a diffraction grating being formed on an entire surface of one of the two planes, the diffraction grating being divided into two areas which are an outer area and an inner area by two straight lines which are symmetrical with respect to an optical axis of incident light and which parallel a tangential direction of the optical recording medium, wherein a diffraction grating is formed in a rectangular area of the other of the two planes, a width of the rectangular area being smaller than an effective diameter of the objective lens, and wherein a phase of the grating of the outer area is different from a phase of the grating of the inner area by around π [radian].

20. The optical head apparatus as set forth in claim 6,
wherein the diffractive optical element has two planes, a diffraction grating being formed on an entire surface of one of the two planes, the diffraction grating being divided into two areas which are an outer area and an inner area by two straight lines which are symmetrical with respect to an optical axis of incident light and which parallel a tangential direction of the optical recording medium, wherein a diffraction grating is formed in an outer area of a rectangular area of the other of the two planes, a width of the rectangular area being smaller than an effective diameter of the objective lens, and wherein a phase of the grating of the outer area is different from a phase of the grating of the inner area by around π [radian].

21. The optical head apparatus as set forth in one of claims 13 to 20,
wherein the main beam comprises light which exits the former plane as 0-th order light and exits the latter plane as 0-th order light, wherein the first sub beams comprise light which exits the former plane as ±1st order diffracted light and exits the latter plane as 0-th order light, and wherein the second sub beams comprise light which exits the former plane as 0-th order light and exits the latter plane as ±1st order diffracted light.

22. The optical head apparatus as set forth in claim 21,
wherein focused spots of the main beam, the first sub beams, and the second sub beams are placed on a same track of the optical recording medium.

23. The optical head apparatus as set forth in claim 6,
wherein the diffractive optical element comprises a first grating area and a second grating area, the first grating area being inside of a circle of which diameter is smaller than an effective diameter of the objective lens, the second grating area being outside of the circle.

24. The optical head apparatus as set forth in claim 6,
wherein the diffractive optical element comprises a first grating area and a second grating area, the first grating area being outside of a circle of which diameter is smaller than an effective diameter of the objective lens, the second grating area being inside of the circle.

25. The optical head apparatus as set forth in claim 6,
wherein the diffractive optical element comprises a first grating area and a second grating area, the first grating area being a rectangle of which width is smaller than an effective diameter of the objective lens, the second grating area being outside of the rectangle.

26. The optical head apparatus as set forth in claim 6,
wherein the diffractive optical element comprises a first grating area and a second grating area, the first grating area being outside of a rectangle of which width is smaller than an effective diameter of the objective lens, the second grating area being the rectangle.

27. The optical head apparatus as set forth in one of claims 23 to 26,
- wherein the main beam comprises light which exits the first and second grating areas as 0-th order light,
- wherein the first sub beams comprise light which exits the first and second grating areas as ±1st order diffracted light, and
- wherein the second sub beams comprise light which exits the first grating area as ±2nd order diffracted light.

28. The optical head apparatus as set forth in claim 27, wherein a ratio of a transmissivity of the first grating area to a transmissivity of the second grating area is nearly the same as a ratio of a ±1st order diffraction efficiency of the first grating area to a ±1st order diffraction efficiency of the second grating area.

29. The optical head apparatus as set forth in claim 28,
- wherein a line portion having a first width, a space portion having a second width, a line portion having the second width and a space portion having the first width are repeated in this order on cross section of the first grating area,
- wherein a line portion having a third width and a space portion having the third width are repeated in this order on cross section of the second grating area, and
- wherein the sum of the first width and the second width is equal to the third width.

30. The optical head apparatus as set forth in claim 27,
- wherein focused spots of the first sub beams are apart from a focused spot of the main beam by around ½ pitch of a groove of the optical recording medium in radial direction of the optical recording medium, and
- wherein focused spots of the second sub beams are apart from the focused spot of the main beam by around one pitch of the groove of the optical recording medium in radial direction of the optical recording medium.

31. The optical head apparatus as set forth in claim 6,
- wherein a diffraction grating is formed in a circular area of the diffractive optical element, the circular area being divided into a first left area and a first right area by a straight line which passes through the optical axis of incident light and which parallels a tangential direction of the optical recording medium, a diameter of the circular area being smaller than an effective diameter of the objective lens,
- wherein a diffraction grating is formed in an outer area of the circular area, the outer area being divided into a second left area and a second right area by the straight line, and
- wherein a phase of the grating of each of the first left area and the second left area is different from a phase of the grating of each of the first right area and the second right area by around π [radian].

32. The optical head apparatus as set forth in claim 6,
- wherein a diffraction grating is formed in an outer area of a circular area of the diffractive optical element, the outer area being divided into a first left area and a first right area by a straight line which passes through an optical axis of incident light and which parallels a tangential direction of the optical recording medium, a diameter of the circular area being smaller than an effective diameter of the objective lens,
- wherein a diffraction grating is formed in the circular area, the circular area being divided into a second left area and a second right area by the straight line, and
- wherein a phase of the grating of each of the first left area and the second left area is different from a phase of the grating of each of the first right area and the second right area by around π [radian].

33. The optical head apparatus as set forth in claim 6,
- wherein a diffraction grating is formed in a rectangular area of the diffractive optical element, the rectangular area being divided into a first left area and a first right area by a straight line which passes through an optical axis of incident light and which parallels a tangential direction of the optical recording medium, a width of the rectangular area being smaller than an effective diameter of the objective lens,
- wherein a diffraction grating is formed in an outer area of the rectangular area, the outer area being divided into a second left area and a second right area by the straight line, and
- wherein a phase of the grating of each of the first left area and the second left area is different from a phase of the grating of each of the first right area and the second right area by around π [radian].

34. The optical head apparatus as set forth in claim 6,
- wherein a diffraction grating is formed in an outer area of a rectangular area of the diffractive optical element, the outer area being divided into a first left area and a first right area by a straight line which passes through an optical axis of incident light and which parallels a tangential direction of the optical recording medium, a width of the rectangular area being smaller than an effective diameter of the objective lens,
- wherein a diffraction grating is formed in the rectangular area, the rectangular area being divided into a second left area and a second right area by the straight line, and
- wherein a phase of the grating of each of the first left area and the second left area is different from a phase of the grating of each of the first right area and the second right area by around π [radian].

35. The optical head apparatus as set forth in claim 6,
- wherein a diffraction grating is formed in a circular area of the diffractive optical element, the circular area being divided into a first outer area and a first inner area by two straight lines which are symmetrical with respect to an optical axis of incident light and which parallel a tangential direction of the optical recording medium, a diameter of the circular area being smaller than an effective diameter of the objective lens,
- wherein a diffraction grating is formed in an outer area of the circular area, the outer area being divided into a second outer area and a second inner area by the two straight lines, and
- wherein a phase of the grating of each of the first outer area and the second outer area is different from a phase of the grating of each of the first inner area and the second inner area by around π [radian].

36. The optical head apparatus as set forth in claim 6,
- wherein a diffraction grating is formed in an outer area of a circular area of the diffractive optical element, the outer area being divided into a first outer area and a first inner area by two straight lines which are symmetrical with respect to an optical axis of incident light and which parallel a tangential direction of the optical recording medium, a diameter of the circular area being smaller than an effective diameter of the objective lens,
- wherein a diffraction grating is formed in the circular area, the circular area being divided into a second outer area and a second inner area by the two straight lines, and
- wherein a phase of the grating of each of the first outer area and the second outer area is different from a phase of the grating of each of the first inner area and the second inner area by around π [radian].

37. The optical apparatus as set forth in claim 6,
wherein the diffractive optical element comprises a first grating area which is a first inner area and a second grating area which is a second outer area, the first grating area being a rectangle of which width is smaller than an effective diameter of the objective lens, the second grating area being outside of the rectangle, and
wherein a phase of the first grating area is different from a phase of the second grating area by around π [radian].

38. The optical head apparatus as set forth in claim 6,
wherein the diffractive optical element comprises a first grating area and a second grating area which is a second outer area, the first grating area being a rectangle of which width is smaller than an effective diameter of the objective lens, the second grating area being outside of the rectangle,
wherein the first grating area is divided into an inner area which is a first inner area and an outer area which is a first outer area by two straight lines which are symmetrical with respect to an optical axis of incident light and which parallel a tangential direction of the optical recording medium, and
wherein a phase of the inner area is different from a phase of the outer area and the second grating area by around π [radian].

39. The optical head apparatus as set forth in claim 6,
wherein the diffractive optical element comprises a first grating area which is a first inner area and a second grating area, the first grating area being a rectangle of which width is smaller than an effective diameter of the objective lens, the second grating area being outside of the rectangle,
wherein the second grating area is divided into an inner area which is a second inner area and an outer area which is a second outer area by two straight lines which are symmetrical with respect to an optical axis of incident light and which parallel a tangential direction of the optical recording medium, and
wherein a phase of the first grating area and the inner area is different from a phase of the outer area by around π [radian].

40. The optical head apparatus as set forth in claim 6,
wherein the diffractive optical element comprises a first grating area which is a first outer area and a second grating area which is a second inner area, the first grating area being outside of a rectangle of which width is smaller than an effective diameter of the objective lens, the second grating area being the rectangle, and
wherein a phase of the first grating area is different from a phase of the second grating area by around π [radian].

41. The optical head apparatus as set forth in claim 6,
wherein the diffractive optical element comprises a first grating area which is a first outer area and a second grating area, the first grating area being outside of a rectangle of which width is smaller than an effective diameter of the objective lens, the second grating area being the rectangle,
wherein the second grating area is divided into an inner area which is a second inner area and an outer area which is a second outer area by two straight lines which are symmetrical with respect to an optical axis of incident light and which parallel a tangential direction of the optical recording medium, and
wherein a phase of the inner area is different from a phase of the outer area and the first grating area by around π [radian].

42. The optical head apparatus as set forth in claim 6,
wherein the diffractive optical element comprises a first grating area and a second grating area which is a second inner area, the first grating area being outside of a rectangle of which width is smaller than an effective diameter of the objective lens, the second grating area being the rectangle,
wherein the first grating area is divided into an inner area which is a first inner area and an outer area which is a first outer area by two straight lines which are symmetrical with respect to an optical axis of incident light and which parallel a tangential direction of the optical recording medium, and
wherein a phase of the second grating area and the inner area is different from a phase of the outer area by around π [radian].

43. The optical head apparatus as set forth in one of claims 31 to 34,
wherein the main beam comprises light which exits the first left area, the second left area, the first right area and the second right area as 0-th order light,
wherein the first sub beams comprise light which exits the first left area, the second left area, the first right area and the second right area as ±1st order diffracted light, and
wherein the second sub beams comprise light which exits the first left area and the first right area as ±2nd order diffracted light.

44. The optical head apparatus as set forth in claim 43,
wherein a ratio of a transmissivity of each of the first left area and the first right area to a transmissivity of each of the second left area and the second right area is nearly equal to a ratio of ±1st order diffraction efficiency of each of the first left area and the first right area to ±1st order diffraction efficiency of each of the second left area and the second right area.

45. The optical head apparatus as set forth in claim 44,
wherein a line portion having a first width, a space portion having a second width, a line portion having the second width and a space portion having the first width are repeated in this order on cross section of the first left area and the first right area,
wherein a line portion having a third width and a space portion having the third width are repeated in this order on cross section of the second left area and the second right area, and
wherein the sum of the first width and the second width is equal to the third width.

46. The optical head apparatus as set forth in claim 43,
wherein focused spots of the main beam, the first sub beam, and the second sub beam are placed on the same track of the optical recording medium.

47. The optical head apparatus as set forth in one of claims 35 to 42,
wherein the main beam comprises light which exits the first outer area, the second outer area, the first inner area and the second inner area as 0-th order light,
wherein the first sub beams comprise light which exits the first outer area, the second outer area, the first inner area and the second inner area as ±1st order diffracted light, and
wherein the second sub beams comprise light which exits the first outer area and the first inner area as ±2nd order diffracted light.

48. The optical head apparatus as set forth in claim 47, wherein a ratio of a transmissivity of each of the first outer area and the first inner area to a transmissivity of each of the second outer area and the second inner area is nearly equal to a ratio of ±1st order diffraction efficiency of each of the first outer area and the first inner area to ±1st order diffraction efficiency of each of the second outer area and the second inner area.

49. The optical head apparatus as set forth in claim 48, wherein a line portion having a first width, a space portion having a second width, a line portion having the second width and a space portion having the first width are repeated in this order on cross section of the first outer area and the first inner area, wherein a line portion having a third width and a space portion having the third width are repeated in this order on cross section of the second outer area and the second inner area, and wherein the sum of the first width and the second width is equal to the third width.

50. The optical head apparatus as set forth in claim 47, wherein focused spots of the main beam, the first sub beam, and the second sub beam are placed on the same track of the optical recording medium.

51. The optical head apparatus as set forth in claim 4, wherein the deviation of the thickness of the substrate of the optical recording medium is detected on the basis of a focusing error signal relating to the second sub beam when performing a focusing servo using the focusing error signal relating to the main beam.

52. The optical head apparatus as set forth in claim 4, wherein the deviation of the thickness of the substrate of the optical recording medium is detected on the basis of a focusing error signal relating to the second sub beam when performing a focusing servo using a focusing error signal which is a sum of a focusing error signal relating to the main beam and a focusing error signal relating to the first sub beam.

53. The optical head apparatus as set forth in one of claims 51 and 52, wherein the focusing error signal relating to the second sub beam is used as a signal representing the deviation of the thickness of the substrate of the optical recording medium.

54. The optical head apparatus as set forth in one of claims 51 and 52, wherein a signal which is obtained by subtracting a focus offset signal from the focusing error signal relating to the second sub beam is used as a signal representing the deviation of the thickness of the substrate of the optical recording medium, the focus offset signal being a difference between the focusing error signal relating to the main beam and the focusing error signal relating to the first sub beams.

55. The optical head apparatus as set forth in one of claims 51 and 52, wherein a signal which is obtained by subtracting a focusing error signal from the focusing error signal relating to the second sub beam is used as a signal representing the deviation of the thickness of the substrate of the optical recording medium, the focusing error signal being used when performing the focusing servo.

56. The optical head apparatus as set forth in one of claims 51 and 52, wherein a signal which is obtained by subtracting a focus offset signal and a focusing error signal from the focusing error signal relating to the second sub beam is used as a signal representing the deviation of the thickness of the substrate of the optical recording medium, the focus offset signal being a difference between the focusing error signal relating to the main beam and the focusing error signal relating to the first sub beams, and the focusing error signal being used when performing the focusing servo.

57. The optical head apparatus as set forth in claim 5, wherein the radial tilt of the optical recording medium is detected on the basis of a tracking error signal relating to the second sub beam when performing a tracking servo using the tracking error signal relating to the main beam.

58. The optical head apparatus as set forth in claim 5, wherein the radial tilt of the optical recording medium is detected on the basis of a tracking error signal relating to the second sub beam when performing a tracking servo using a tracking error signal which is a difference between a tracking error signal relating to the main beam and a tracking error signal relating to the first sub beam.

59. The optical head apparatus as set forth in one of claims 57 and 58, wherein the tracking error signal relating to the second sub beam is used as a signal representing the radial tilt of the optical recording medium.

60. The optical head apparatus as set forth in one of claims 57 and 58, wherein a signal which is obtained by subtracting a track offset signal from the tracking error signal relating to the second sub beam is used as a signal representing the radial tilt of the optical recording medium, the track offset signal being a sum of the tracking error signal relating to the main beam and the tracking error signal relating to the first sub beams.

61. The optical head apparatus as set forth in one of claims 57 and 58, wherein a signal which is obtained by subtracting a tracking error signal from the tracking error signal relating to the second sub beam is used as a signal representing the radial tilt of the optical recording medium, the tracking error signal being used when performing the tracking servo.

62. The optical head apparatus as set forth in one of claims 57 and 58, wherein a signal which is obtained by subtracting a track offset signal and a tracking error signal from the tracking error signal relating to the second sub beam is used as a signal representing the radial tilt of the optical recording medium, the track offset signal being a sum of the tracking error signal relating to the main beam and the tracking error signal relating to the first sub beams, and the tracking error signal being used when performing the tracking servo.

63. An optical information recording and reproducing apparatus, comprising:

the optical head apparatus as set forth in claim 1, and means for compensating a deviation of a thickness of a substrate of the optical recording medium or a radial tilt of the optical recording medium.

64. The optical information recording and reproducing apparatus as set forth in claim 63, wherein two relay lenses are disposed between the light source and the objective lens, and wherein the deviation of the thickness of the substrate of the optical recording medium is compensated by moving one of the relay lenses in the direction of the optical axis.

65. The optical information recording and reproducing apparatus as set forth in claim 63,
wherein a collimator lens is disposed between the light source and the objective lens, and
wherein the deviation of the thickness of the substrate of the optical recording medium is compensated by moving the collimator lens in the direction of the optical axis.

66. The optical information recording and reproducing apparatus as set forth in claim 63,
wherein the radial tilt of the optical recording medium is compensated by tilting the objective lens in the radial direction of the optical recording medium.

67. The optical information recording and reproducing apparatus as set forth in claim 63,
wherein the radial tilt of the optical recording medium is compensated by tilting the entire optical head apparatus in the radial direction of the optical recording medium.

68. The optical information recording and reproducing apparatus as set forth in claim 63,
wherein a liquid crystal optical element is disposed between the light source and the objective lens, and
wherein the deviation of the thickness of the substrate of the optical recording medium or the radial tilt of the optical recording medium is compensated by applying a voltage to the liquid crystal optical element.

69. The optical information recording and reproducing apparatus as set forth in one of claims 66 to 68,
wherein a polarity of a circuit which compensates the radial tilt of the optical recording medium is switched depending on whether a land portion or a groove portion of the optical recording medium is related.

70. An optical head apparatus, comprising:
a light source;
means for generating a main beam and a plurality of sub beams from incident light emitted from said light source;
an objective lens which focuses said main beam and said plurality of sub beams on an optical recording medium;
a photo detector which receives said main beam and said plurality of sub beams reflected from the optical recording medium; and
means for detecting one of a focusing error signal and a tracking error signal from said main beam and each of a pair of said plurality of sub beams, distribution of intensity of each of the pair of sub beams being different from distribution of intensity of the main beam, a sum of the distribution of the intensity of the pair of sub beams being the same as the distribution of the intensity of the main beam.

71. The optical head apparatus as set forth in claim 70,
wherein the pair of sub beams is composed of a first sub beam and a second sub beam, the first sub beam being divided into a first area and a second area, the second sub beam being divided into a third area and a fourth area.

72. The optical head apparatus as set forth in claim 71,
wherein a sum of the focusing error signal relating to the main beam and the focusing error signals relating to the pair of sub beams is used as a final focusing error signal.

73. The optical head apparatus as set forth in claim 71,
wherein a difference between the tracking error signal relating to the main beam and the tracking error signals relating to the pair of sub beams is used as a final tracking error signal.

74. The optical head apparatus as set forth in claim 71,
wherein a deviation of a thickness of a substrate of the optical recording medium is detected on the basis of a deviation between a zero crossing point of each of the focusing error signals relating to the first area of the first sub beam and the third area of the second sub beam and the focusing error signals relating to the second area of the first sub beam and the fourth area of the second sub beam and a zero crossing point of the focusing error signal relating to the main beam.

75. The optical head apparatus as set forth in claim 71,
wherein a radial tilt of the optical recording medium is detected on the basis of a deviation between a zero crossing point of each of the tracking error signals relating to the first area of the first sub beam and the third area of the second sub beam and the tracking error signals relating to the second area of the first sub beam and the fourth area of the second sub beam and a zero crossing point of the tracking error signal relating to the main beam.

76. The optical head apparatus as set forth in claim 71,
wherein a diffractive optical element is disposed between the light source and the objective lens, the diffractive optical element separating the light emitted from the light source into the main beam and the pair of sub beams.

77. The optical head apparatus as set forth in claim 76,
wherein the diffractive optical element has a circular area and a non-circular area, the non-circular area being an area outside the circular area, the circular area having a diameter smaller than an effective diameter of the objective lens, a diffraction grating being formed in the circular area divided into two areas by a straight line which passes through an optical axis of incident light and which parallels a radial direction of the optical recording medium, the two areas corresponding to the first area and the third area, a diffraction grating being formed in the non-circular area divided into two areas by a straight line which passes through the optical axis of the incident light and which parallels the radial direction of the optical recording medium, the two areas corresponding to the second area and the fourth area.

78. The optical head apparatus as set forth in claim 76,
wherein the diffractive optical element has a stripe area and a non-stripe area, the non-stripe area being an area outside the stripe area, the stripe area having a width smaller than an effective diameter of the objective lens, a diffraction grating being formed in the stripe area divided into two areas by a straight line which passes through an optical axis of incident light and which parallels a radial direction of the optical recording medium, the two areas corresponding to the first area and the third area, a diffraction grating being formed in the non-stripe area divided into two areas by a straight line which passes through the optical axis of the incident light and which parallels the radial direction of the optical recording medium, the two areas corresponding to the second area and the fourth area.

79. The optical head apparatus as set forth in one of claims 77 and 78,
wherein the main beam comprises light which exits from the first area, the second area, the third area, and the fourth area as 0-th order light,
wherein the first sub beam comprises light which exits from the first area and the second area as +1st order diffracted light, and
wherein the second sub beam comprises light which exits from the third area and the fourth area as −1st order diffracted light.

80. The optical head apparatus as set forth in claim 79, wherein the grating formed in the first area and the second area has a saw tooth shaped section so that +1st order diffraction efficiency is higher than −1st order diffraction efficiency, and
wherein the grating formed in the third area and the fourth area has a saw tooth shaped section so that −1st order diffraction efficiency is higher than +1st order diffraction efficiency.

81. The optical head apparatus as set forth in claim 79, wherein a focused spot of each of the first sub beam and the second sub beam is apart from a focused spot of the main beam by around ½ pitch of a groove of the optical recording medium in the radial direction of the optical recording medium.

82. The optical head apparatus as set forth in claim 76, wherein the diffractive optical element has a circular area and a non-circular area, the non-circular area being an area outside the circular area, the circular area having a diameter smaller than an effective diameter of the objective lens, a diffraction grating being formed in the circular area divided into two areas by a straight line which passes through an optical axis of incident light and which parallels a radial direction of the optical recording medium, the two areas corresponding to the first area and the third area, the first area and the third area being divided into a first left area, a third left area, a first right area, and a third right area by a straight line which parallels a tangential direction of the optical recording medium, a diffraction grating being formed in the non-circular area divided into two areas by a straight line which passes through the optical axis of the incident light and which parallels the radial direction of the optical recording medium, the two areas corresponding to the second area and the fourth area, the second area and the fourth area being divided into a second left area, a fourth left area, a second right area and a fourth right area by a straight line which parallels the tangential direction of the optical recording medium, a phase of the grating of each of the first left area, the second left area, the third left area, and the fourth left area is different from the phase of the grating of each of the first right area, the second right area, the third right area, and the fourth right area by π [radian].

83. The optical head apparatus as set forth in claim 76, wherein the diffractive optical element has a stripe area and a non-stripe area, the non-stripe area being an area outside the stripe area, the stripe area having a width smaller than an effective diameter of the objective lens, a diffraction grating being formed in the stripe area divided into two areas by a straight line which passes through an optical axis of incident light and which parallels a radial direction of the optical recording medium, the two areas corresponding to the first area and the third area, the first area and the third area being divided into a first left area, a third left area, a first right area, and a third right area by a straight line which parallels a tangential direction of the optical recording medium, a diffraction grating being formed in the non-stripe area divided into two areas by a straight line which passes through the optical axis of the incident light and which parallels the radial direction of the optical recording medium, the two areas corresponding to the second area and the fourth area, the second area and the fourth area being divided into a second left area, a fourth left area, a second right area, and a fourth right area by a straight line which parallels the tangential direction of the optical recording medium, a phase of the grating of each of the first left area, the second left area, the third left area, and the fourth left area is different from the phase of the grating of each of the first right area, the second right area, the third right area, and the fourth right area by π [radian].

84. The optical head apparatus as set forth in claim 76, wherein the diffractive optical element has a circular area and a non-circular area, the non-circular area being an area outside the circular area, the circular area having a diameter smaller than an effective diameter of the objective lens, a diffraction grating being formed in the circular area divided into two areas by a straight line which passes through an optical axis of incident light and which parallels a radial direction of the optical recording medium, the two areas corresponding to the first area and the third area, the first area and the third area being divided into a first outer area, a third outer area, a first inner area, and a third inner area by two straight lines which are symmetrical with respect to the optical axis of the incident light and which parallels a tangential direction of the optical recording medium, a diffraction grating being formed in the non-circular area divided into two areas by a straight line which passes through the optical axis of the incident light and which parallels the radial direction of the optical recording medium, the two areas corresponding to the second area and the fourth area, the second area and the fourth area being divided into a second outer area, a fourth outer area, a second inner area and a fourth inner area by two straight lines which are symmetrical with respect to the optical axis of the incident light and which parallel the tangential direction of the optical recording medium, a phase of the grating of each of the first outer area, the second outer area, the third outer area, and the fourth outer area is different from the phase of the grating of each of the first inner area, the second inner area, the third inner area, and the fourth inner area by π [radian].

85. The optical head apparatus as set forth in claim 76, wherein the diffractive optical element has a stripe area and a non-stripe area, the non-stripe area being an area outside the stripe area, the stripe area having a width smaller than an effective diameter of the objective lens, a diffraction grating being formed in the stripe area divided into two areas by a straight line which passes through an optical axis of incident light and which parallels a radial direction of the optical recording medium, the two areas corresponding to the first area and the third area, the first area and the third area being divided into a first outer area, a third outer area, a first inner area, and a third inner area by two straight lines which are symmetrical with respect to the optical axis of the incident light and which parallel a tangential direction of the optical recording medium, a diffraction grating being formed in the non-stripe area divided into two areas by a straight line which passes through the optical axis of the incident light and which parallels the radial direction of the optical recording medium, the two areas corresponding to the second area and the fourth area, the second area and the fourth area being divided into a second outer area, a fourth outer area, a second inner area, and a fourth inner area by two straight lines which are symmetrical with respect to the optical axis of the incident light and which parallel the tangential direction of the optical recording medium, a phase of the grating of each of the first outer area, the second outer area, the third outer area, and the fourth outer area is different from the phase of the grating of each of the first inner area, the second inner area, the third inner area, and the fourth inner area by $\pi$ [radian].

86. The optical head apparatus as set forth in one of claims 82 to 85,
wherein the main beam comprises light which exits from the first area, the second area, the third area, and the fourth area as 0-th order light,
wherein the first sub beam comprises light which exits from the first area and the second area as +1st order diffracted light, and
wherein the second sub beam comprises light which exits from the third area and the fourth area as −1st order diffracted light.

87. The optical head apparatus as set forth in claim 86,
wherein the grating formed in the first area and the second area has a saw tooth shaped section so that +1st order diffraction efficiency is higher than −1st order diffraction efficiency, and
wherein the grating formed in the third area and the fourth area has a saw tooth shaped section so that −1st order diffraction efficiency is higher than +1st order diffraction efficiency.

88. The optical head apparatus as set forth in claim 86,
wherein focused spots of the first sub beam and the second sub beam are placed on the same track of the optical recording medium as a focused spot of the main beam.

89. The optical head apparatus as set forth in claim 74,
wherein the deviation of the thickness of the optical recording medium is detected on the basis of a difference between the focusing error signals relating to the first area of the first sub beam and the third area of the second sub beam and the focusing error signals relating to the second area of the first sub beam and the fourth area of the second sub beam when a focusing servo is performed using the focusing error signal relating to the main beam.

90. The optical head apparatus as set forth in claim 74,
wherein the deviation of the thickness of the optical recording medium is detected on the basis of a difference between the focusing error signals relating to the first area of the first sub beam and the third area of the second sub beam and the focusing error signals relating to the second area of the first sub beam and the fourth area of the second sub beam when a focusing servo is performed using the final focusing error signal which is a sum of the focusing error signal relating to the main beam and the focusing error signals relating to the pair of sub beams.

91. The optical head apparatus as set forth in one of claims 89 and 90,
wherein a difference between the focusing error signals relating to the first area of the first sub beam and the third area of the second sub beam and the focusing error signals relating to the second area of the first sub beam and the fourth area of the second sub beam is used as a signal representing the deviation of the thickness of the substrate of the optical recording medium.

92. The optical head apparatus as set forth in one of claims 89 and 90,
wherein a signal which is obtained by subtracting a focus offset signal from the difference between the focusing error signals relating to the first area of the first sub beam and the third area of the second sub beam and the focusing error signals relating to the second area of the first sub beam and the fourth area of the second sub beam is used as a signal representing the deviation of the thickness of the substrate of the optical recording medium, the focus offset signal being a difference between the focusing error signal relating to the main beam and the focusing error signals relating to the pair of sub beams.

93. The optical head apparatus as set forth in claim 75,
wherein the radial tilt of the optical recording medium is detected on the basis of a difference between tracking error signals relating to the first area of the first sub beam and the third area of the second sub beam and tracking error signals relating to the second area of the first sub beam and the fourth area of the second sub beam when a tracking servo is performed using the tracking error signal relating to the main beam.

94. The optical head apparatus as set forth in claim 75,
wherein the radial tilt of the optical recording medium is detected on the basis of a difference between tracking error signals relating to the first area of the first sub beam and the third area of the second sub beam and tracking error signals relating to the second area of the first sub beam and the fourth area of the second sub beam when a tracking servo is performed using a final tracking error signal which is a difference of the tracking error signal relating to the main beam and the tracking error signals relating to the pair of sub beams.

95. The optical head apparatus as set forth in one of claims 93 and 94,
wherein the difference between the tracking error signals relating to the first area of the first sub beam and the third area of the second sub beam and the tracking error signals relating to the second area of the first sub beam and the fourth area of the second sub beam is used as a signal representing the radial tilt of the optical recording medium.

96. The optical head apparatus as set forth in one of claims 93 and 94,
wherein a signal which is obtained by subtracting a track offset signal from the difference between the tracking error signals relating to the first area of the first sub beam and the third area of the second sub beam and the tracking error signals relating to the second area of the first sub beam and the fourth area of the second sub beam is used as a signal representing the radial tilt of the optical recording medium, the track offset signal being a sum of the tracking error signal relating to the main beam and the tracking error signals relating to the pair of sub beams.

97. An optical information recording and reproducing apparatus, comprising:
the optical head apparatus as set forth in claim 70, and
means for compensating a deviation of a thickness of a substrate of the optical recording medium or a radial tilt of the optical recording medium.

98. The optical information recording and reproducing apparatus as set forth in claim 97,
wherein two relay lenses are disposed between the light source and the objective lens, and
wherein the deviation of the thickness of the substrate of the optical recording medium is compensated by moving one of the relay lenses in the direction of the optical axis.

99. The optical information recording and reproducing apparatus as set forth in claim 97,
wherein a collimator lens is disposed between the light source and the objective lens, and
wherein the deviation of the thickness of the substrate of the optical recording medium is compensated by moving the collimator lens in the direction of the optical axis.

100. The optical information recording and reproducing apparatus as set forth in claim 97,
wherein the radial tilt of the optical recording medium is compensated by tilting the objective lens in the radial direction of the optical recording medium.

101. The optical information recording and reproducing apparatus as set forth in claim 97,
wherein the radial tilt of the optical recording medium is compensated by tilting the entire optical head apparatus in the radial direction of the optical recording medium.

102. The optical information recording and reproducing apparatus as set forth in claim 97,
wherein a liquid crystal optical element is disposed between the light source and the objective lens, and
wherein the deviation of the thickness of the substrate of the optical recording medium or the radial tilt of the optical recording medium is compensated by applying a voltage to the liquid crystal optical element.

103. The optical information recording and reproducing apparatus as set forth in one of claims 100 to 102,
wherein a polarity of a circuit which compensates the radial tilt of the optical recording medium is switched depending on whether a land portion or a groove portion of the optical recording medium is related.

* * * * *